US010684477B2

(12) United States Patent
Liu et al.

(10) Patent No.: US 10,684,477 B2
(45) Date of Patent: Jun. 16, 2020

(54) NEAR-EYE DISPLAY DEVICE AND METHODS WITH COAXIAL EYE IMAGING

(71) Applicant: OmniVision Technologies, Inc., Santa Clara, CA (US)

(72) Inventors: Yi-Wei Liu, New Taipei (TW); Jau-Jan Deng, Taipei (TW); Regis Fan, Saint Paul, MN (US)

(73) Assignee: OmniVision Technologies, Inc., Santa Clara, CA (US)

( * ) Notice: Subject to any disclaimer, the term of this patent is extended or adjusted under 35 U.S.C. 154(b) by 386 days.

(21) Appl. No.: 15/097,137

(22) Filed: Apr. 12, 2016

(65) Prior Publication Data
US 2016/0223819 A1 Aug. 4, 2016

Related U.S. Application Data

(63) Continuation-in-part of application No. 14/869,067, filed on Sep. 29, 2015, now Pat. No. 9,958,680, which
(Continued)

(30) Foreign Application Priority Data

Sep. 30, 2014 (CN) .......................... 2014 1 0522328

(51) Int. Cl.
G02B 27/01 (2006.01)
G02B 27/42 (2006.01)
(Continued)

(52) U.S. Cl.
CPC ........... *G02B 27/0172* (2013.01); *G02B 5/12* (2013.01); *G02B 5/3083* (2013.01);
(Continued)

(58) Field of Classification Search
CPC ...... G02B 26/08–0891; G02B 27/0172; G02B 27/141; G02B 5/3083; G02B 5/12;
(Continued)

(56) References Cited

U.S. PATENT DOCUMENTS 8,913,789 B1    12/2014  Starner et al.
8,971,570 B1    3/2015   Raffle et al.
(Continued)

OTHER PUBLICATIONS

Non-Final Rejection corresponding to U.S. Appl. No. 14/869,067, dated Sep. 28, 2017, 23 pages.
(Continued)

Primary Examiner — Roberto W Flores
(74) Attorney, Agent, or Firm — Lathrop GPM LLP

(57) ABSTRACT

A near-eye display device includes (a) a display unit for displaying a display image, (b) a viewing unit for presenting the display image to the eye and transmitting ambient light from an ambient scene toward the eye, and (c) an eye imaging unit including (i) an illumination module for generating at least three infrared light beams propagating along at least three different, non-coplanar directions, respectively, (ii) a first beamsplitter interface, disposed between the display unit and the viewing unit, for merging at least a portion of each of the infrared light beams with visible display light to direct each portion toward the eye via the viewing unit, and (iii) a camera for imaging, via the viewing unit and the first beamsplitter interface, pupil of the eye and reflections of the infrared light beams incident on the eye, to form one or more images indicative of gaze direction of the eye.

15 Claims, 31 Drawing Sheets

Related U.S. Application Data is a continuation-in-part of application No. 14/794,725, filed on Jul. 8, 2015, now abandoned.

(51) Int. Cl.
| | |
|---|---|
| *G02B 27/28* | (2006.01) |
| *G02B 27/10* | (2006.01) |
| *G06F 3/01* | (2006.01) |
| *G02B 27/14* | (2006.01) |
| *G02B 5/30* | (2006.01) |
| *G02B 5/12* | (2006.01) |
| *H04N 5/33* | (2006.01) |
| *G02B 27/00* | (2006.01) |

(52) U.S. Cl.
CPC ....... *G02B 27/1006* (2013.01); *G02B 27/141* (2013.01); *G02B 27/283* (2013.01); *G02B 27/425* (2013.01); *G02B 27/4272* (2013.01); *G06F 3/013* (2013.01); *G02B 27/0093* (2013.01); *G02B 2027/014* (2013.01); *G02B 2027/0112* (2013.01); *G02B 2027/0138* (2013.01); *G02B 2027/0178* (2013.01); *G02B 2027/0181* (2013.01); *G02B 2027/0187* (2013.01); *H04N 5/332* (2013.01)

(58) Field of Classification Search
CPC .............. G02B 27/425; G02B 27/4272; G02B 27/283; G02B 27/1006; G02B 2027/0178; G02B 2027/0187; G02B 27/0093; G02B 2027/0112; G02B 2027/0181; G02B 2027/0138; G02B 2027/014; G06F 3/011–013; H04N 9/31–3197; H04N 5/7458; H04N 13/0427; H04N 5/332

USPC .................. 359/13, 618–640, 614; 345/7–9; 348/115

See application file for complete search history.

(56) References Cited

U.S. PATENT DOCUMENTS

| | | |
|---|---|---|
| 8,982,471 B1 | 3/2015 | Starner et al. |
| 9,116,337 B1* | 8/2015 | Miao .................. G02B 27/0172 |
| 9,223,152 B1 | 12/2015 | Kress et al. |
| 9,519,092 B1 | 12/2016 | Miao et al. |
| 2010/0060551 A1* | 3/2010 | Sugiyama .............. G02B 26/06 345/8 |
| 2011/0213664 A1 | 9/2011 | Osterhout et al. |
| 2012/0075452 A1* | 3/2012 | Ferren ................ G02B 13/0065 348/78 |
| 2013/0016292 A1* | 1/2013 | Miao .................... G02B 27/283 349/11 |
| 2013/0021658 A1 | 1/2013 | Miao et al. |
| 2013/0077049 A1* | 3/2013 | Bohn ...................... G02B 5/20 351/210 |
| 2015/0177831 A1 | 6/2015 | Chan et al. |
| 2015/0301593 A1 | 10/2015 | Border et al. |
| 2016/0085300 A1* | 3/2016 | Robbins .................. G06F 3/013 345/633 |
| 2016/0091722 A1 | 3/2016 | Liu et al. |
| 2016/0173864 A1 | 6/2016 | Yu et al. |

OTHER PUBLICATIONS

Hua, H. et al. Video-based eyetracking methods and algorithms in head-mounted displays, Optics Express, vol. 14, No. 10, May 15, 2006, pp. 4328-4350.

Taiwan Application No. 104132153, English translation of the First Office Action dated Feb. 20, 2017, 4 pages.

\* cited by examiner

1200

```
┌─────────────────────────────────────────────────────────────────┐
│ SEPARATING INFRARED LIGHT, AND OPTIONALLY VISIBLE LIGHT,        │
│ REFLECTED BY THE EYE FROM THE AMBIENT SCENE LIGHT USING         │
│ THE SECOND BEAMSPLITTER INTERFACE                               │
│ 1210                                                            │
└─────────────────────────────────────────────────────────────────┘
                              │
                              ▼
┌─────────────────────────────────────────────────────────────────┐
│ SEPARATING THE INFRARED LIGHT, AND OPTIONALLY VISIBLE LIGHT,    │
│ REFLECTED BY THE EYE FROM THE VISIBLE DISPLAY LIGHT USING       │
│ THE FIRST BEAMSPLITTER INTERFACE                                │
│ 1220                                                            │
└─────────────────────────────────────────────────────────────────┘
```

```
┌─────────────────────────────────────────────────────────────────┐
│ GENERATE VISIBLE ILLUMINATION LIGHT                             │
│ 1310                                                            │
└─────────────────────────────────────────────────────────────────┘
                              │
                              ▼
┌─────────────────────────────────────────────────────────────────┐
│ USING A POLARIZING BEAMSPLITTER INTERFACE TO REFLECT ONLY A     │
│ FIRST POLARIZATION COMPONENT OF THE VISIBLE ILLUMINATION LIGHT  │
│ TOWARD THE DISPLAY TO ILLUMINATE THE DISPLAY WITH POLARIZED     │
│ VISIBLE ILLUMINATION LIGHT                                      │
│ 1320                                                            │
└─────────────────────────────────────────────────────────────────┘
                              │
                              ▼
┌─────────────────────────────────────────────────────────────────┐
│ EMIT VISIBLE DISPLAY LIGHT FROM THE DISPLAY                     │
│ 1330                                                            │
└─────────────────────────────────────────────────────────────────┘
                              │
                              ▼
┌─────────────────────────────────────────────────────────────────┐
│ TRANSMIT ONLY A SECOND POLARIZATION COMPONENT OF THE VISIBLE    │
│ DISPLAY LIGHT THROUGH THE POLARIZING BEAMSPLITTER INTERFACE     │
│ 1340                                                            │
└─────────────────────────────────────────────────────────────────┘
```

```
┌─────────────────────────────────────────────────────┐   ┌─────────────────────────────────┐
│ GENERATE INFRARED LIGHT USING A LIGHT SOURCE        │   │ ILLUMINATE THE DISPLAY          │
│ MECHANICALLY COUPLED WITH THE FIRST                 │   │ AND GENERATE POLARIZED          │
│ POLARIZING BEAMSPLITTER OR A LIGHT TUNNEL           │   │ DISPLAY LIGHT                   │
│ CONNECTING THE FIRST POLARIZING BEAMSPLITTER        │   │ 1404                            │
│ WITH THE SECOND POLARIZING BEAMSPLITTER             │   │                                 │
│ 1402                                                │   │                                 │
└─────────────────────────────────────────────────────┘   └─────────────────────────────────┘
```

USE A FIRST POLARIZING BEAMSPLITTER INTERFACE TO MERGE POLARIZED INFRARED LIGHT WITH POLARIZED VISIBLE DISPLAY LIGHT FROM A DISPLAY
1410

REFLECT ONLY ONE POLARIZATION COMPONENT OF THE INFRARED LIGHT RECEIVED FROM THE INFRARED LIGHT SOURCE
1412

USE A SECOND POLARIZING BEAMSPLITTER INTERFACE TO SUPERIMPOSE THE POLARIZED INFRARED LIGHT AND THE POLARIZED VISIBLE DISPLAY LIGHT ON LIGHT FROM AN AMBIENT SCENE
1420

IMAGE THE EYE THROUGH THE SECOND POLARIZING BEAMSPLITTER AND THE FIRST POLARIZING BEAMSPLITTER BASED UPON A PORTION OF THE POLARIZED INFRARED LIGHT REFLECTED BY THE EYE, AND OPTIONALLY ON A PORTION OF VISIBLE LIGHT REFLECTED BY THE EYE
1430

USE CAMERA MECHANICALLY COUPLED WITH THE BEAMSPLITTER CUBE AND/OR THE LIGHT TUNNEL
1432

USE THE SECOND POLARIZING BEAMSPLITTER INTERFACE TO REFLECT, TOWARD AMBIENT SCENE, THE POLARIZED INFRARED LIGHT RECEIVED FROM THE FIRST POLARIZING BEAMSPLITTER INTERFACE
1510

RETRO-REFLECT AND ROTATE POLARIZATION OF THE POLARIZED INFRARED LIGHT TO PRODUCE ORTHOGONALLY POLARIZED INFRARED LIGHT
1520

PASS THE POLARIZED INFRARED LIGHT THROUGH A QUARTERWAVE PLATE TOWARD THE AMBIENT SCENE
1522

RETRO-REFLECT THE POLARIZED INFRARED LIGHT ON A MIRROR
1524

PASS THE POLARIZED INFRARED LIGHT THROUGH THE QUARTERWAVE PLATE TOWARD THE SECOND POLARIZING BEAMSPLITTER INTERFACE
1526

TRANSMIT THE ORTHOGONALLY POLARIZED INFRARED LIGHT THROUGH THE SECOND POLARIZING BEAMSPLITTER INTERFACE TOWARD THE EYE TO ILLUMINATE THE EYE
1530

TRANSMIT THROUGH THE SECOND POLARIZING BEAMSPLITTER INTERFACE THE POLARIZED VISIBLE LIGHT RECEIVED FROM THE FIRST POLARIZING BEAMSPLITTER INTERFACE
1610

RETRO-REFLECT, FOCUS, AND ROTATE POLARIZATION OF THE POLARIZED VISIBLE LIGHT TO PRODUCE ORTHOGONALLY POLARIZED VISIBLE LIGHT
1620

PASS THE POLARIZED VISIBLE LIGHT THROUGH A QUARTER-WAVE PLATE
1622

RETRO-REFLECT THE POLARIZED VISIBLE LIGHT ON A CURVED MIRROR
1624

PASS THE POLARIZED VISIBLE LIGHT THROUGH THE QUARTER-WAVE PLATE TOWARD THE SECOND POLARIZING BEAMSPLITTER INTERFACE
1626

USE THE SECOND POLARIZING BEAMSPLITTER INTERFACE TO REFLECT THE ORTHOGONALLY POLARIZED VISIBLE LIGHT TOWARD THE EYE TO PRESENT IMAGE OF THE DISPLAY TO THE EYE
1630

```
┌─────────────────────────────────────────────────────────────────────────┐
│  VIA SECOND BEAMSPLITTER INTERFACE AND FIRST BEAMSPLITTER INTERFACE,    │
│  IMAGE PUPIL OF EYE AND INFRARED LIGHT BEAMS AS INCIDENT ON EYE TO      │
│  FORM ONE OR MORE IMAGES INDICATIVE OF GAZE DIRECTION                   │
│  2610                                                                   │
│  ┌───────────────────────────────────────────────────────────────────┐  │
│  │ USE SECOND BEAMSPLITTER INTERFACE TO SEPARATE, FROM AMBIENT       │  │
│  │ LIGHT, (A) A PORTION OF EACH INFRARED LIGHT BEAM REFLECTED BY     │  │
│  │ EYE AND (B) A PORTION OF VISIBLE LIGHT REFLECTED BY THE EYE       │  │
│  │ 2612                                                              │  │
│  └───────────────────────────────────────────────────────────────────┘  │
│                                   │                                     │
│                                   ▼                                     │
│  ┌───────────────────────────────────────────────────────────────────┐  │
│  │ USE FIRST BEAMSPLITTER INTERFACE TO SEPARATE, FROM DISPLAY LIGHT, │  │
│  │ (A) PORTION OF EACH INFRARED LIGHT BEAM REFLECTED BY EYE AND      │  │
│  │ (B) A PORTION OF VISIBLE LIGHT REFLECTED BY THE EYE               │  │
│  │ 2614                                                              │  │
│  └───────────────────────────────────────────────────────────────────┘  │
│                                   │                                     │
│                                   ▼                                     │
│  ┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐  │
│    SPECTRALLY FILTER LIGHT TO IMAGE REFLECTIONS OF IR LIGHT BEAMS       │
│  │ AND ONLY A RED PORTION OF VISIBLE SPECTRUM                        │  │
│    2616                                                                 │
│  └ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘  │
│                                   │                                     │
│                                   ▼                                     │
│  ┌───────────────────────────────────────────────────────────────────┐  │
│  │ FORM IMAGE OF INFRARED LIGHT BEAMS AS INCIDENT ON EYE AND FORM    │  │
│  │ IMAGE OF PUPIL                                                    │  │
│  │ 2618                                                              │  │
│  └───────────────────────────────────────────────────────────────────┘  │
│                                                                         │
│  ┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐  │
│    USE CAMERA MECHANICALLY COUPLED WITH (A) BEAMSPLITTER CUBE           │
│  │ IMPLEMENTING SECOND BEAMSPLITTER INTERFACE AND/OR (B) LIGHT       │  │
│    TUNNEL                                                               │
│  │ 2542                                                              │  │
│  └ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘  │
└─────────────────────────────────────────────────────────────────────────┘
```

FIG. 26

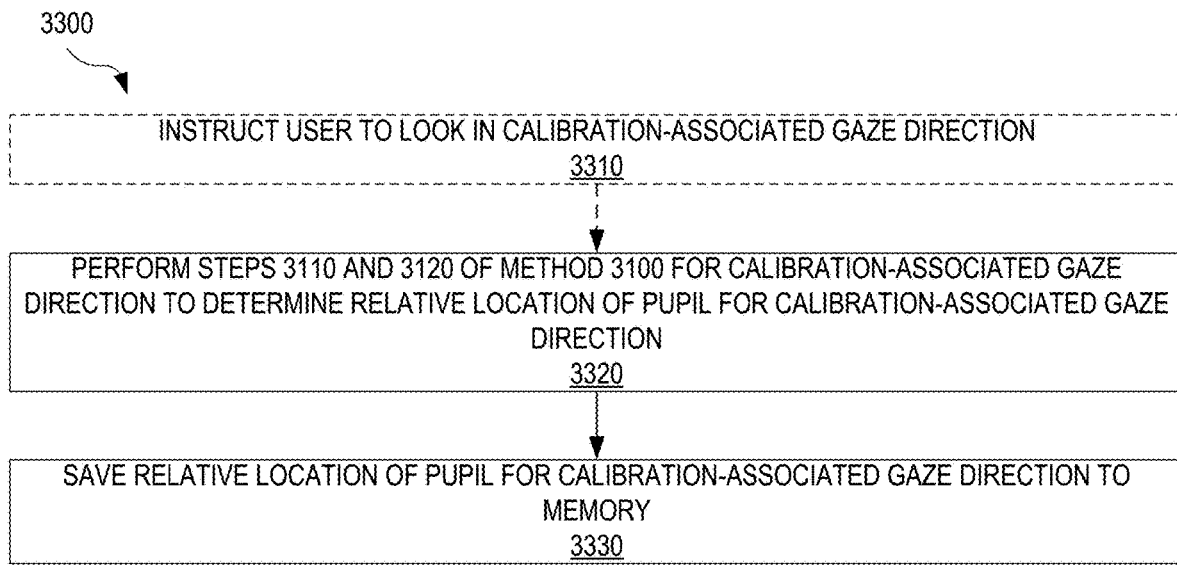
FIG. 33
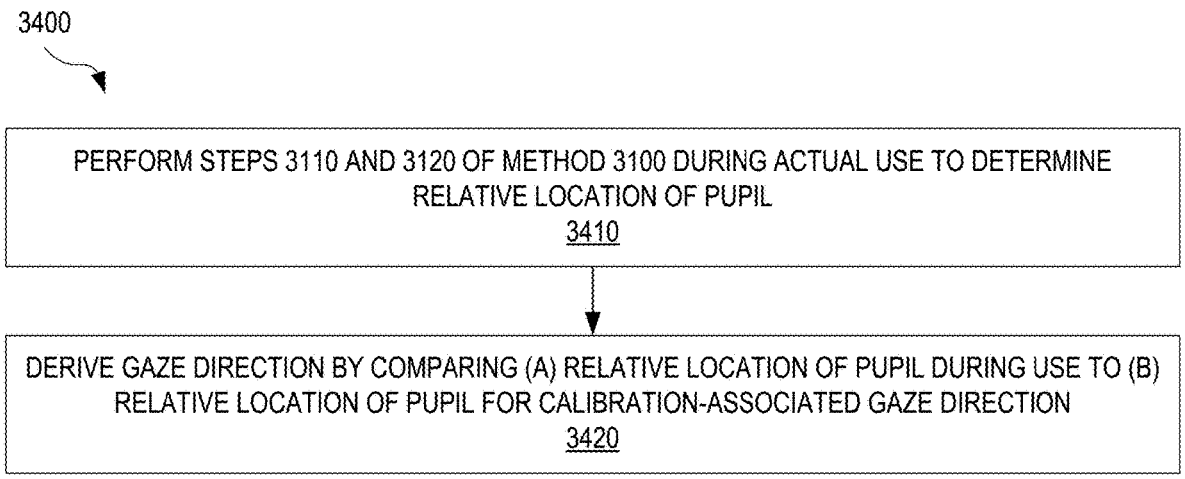
FIG. 34
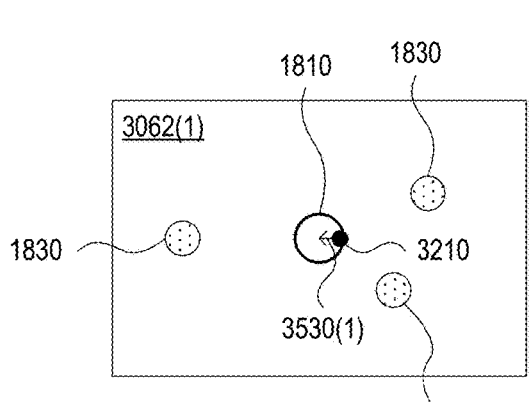 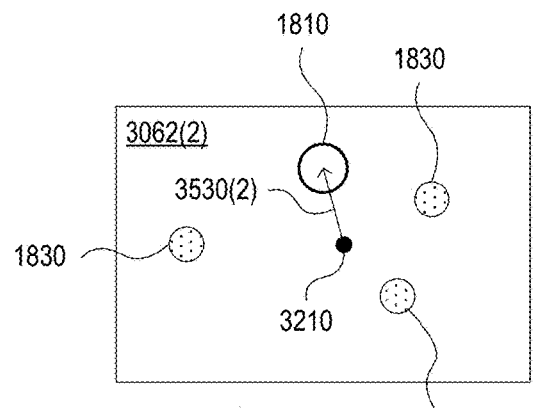
FIG. 35A    FIG. 35B

NEAR-EYE DISPLAY DEVICE AND METHODS WITH COAXIAL EYE IMAGING

CROSS-REFERENCE TO RELATED APPLICATIONS

This application is a continuation in part of U.S. patent application Ser. No. 14/869,067, filed Sep. 29, 2015, which is a continuation in part of U.S. patent application Ser. No. 14/794,725, filed Jul. 8, 2015, which claims priority to Chinese Patent Application No. 201410522328.X, filed Sep. 30, 2014. All of the aforementioned references are incorporated herein by reference in their entireties.

BACKGROUND

Head-mounted display systems mount to the head of a user and allow the user to view the display or an image thereof. Generally, the display functions as a conveniently located interface with a computer, which may be included in the head-mounted display system. For example, a head-mounted display system may provide an aircraft pilot with maps and other information related to the real scene viewed by the pilot. Some head-mounted display systems allow the user to view a display image at the same time as viewing a real scene. See-through head-mounted display systems overlay a display image on a real scene viewed by the user. Recent advances in micro-optics manufacturing have resulted in the development of see-through head-mounted display systems targeted for the consumer market, where the display system may provide functionality similar to that of a smartphone. For example, U.S. Patent Application Publication No. US 2013/0021658 discusses a see-through head-mounted display system. Conventional head-mounted display systems are controlled by the user through a touch and/or voice control interface.

SUMMARY

In an embodiment, a near-eye display device for mounting in field of view of an eye of a user is configured with coaxial eye tracking functionality. The near-eye display device includes a display unit for displaying a display image, a viewing unit for presenting the display image to the eye, and an eye imaging unit. The viewing unit displays the display image based upon visible display light received from the display unit. The viewing unit also transmits ambient light from an ambient scene toward the eye. The eye imaging unit includes (a) an illumination module for generating at least three infrared light beams propagating along at least three different, non-coplanar directions, respectively, (b) a first beamsplitter interface, disposed between the display unit and the viewing unit, for merging at least a portion of each of the infrared light beams with the visible light to direct each portion toward the eye via the viewing unit, and (c) a camera for imaging, via the viewing unit and the first beamsplitter interface, pupil of the eye and reflections of the infrared light beams incident on the eye, to form one or more images indicative of gaze direction of the eye.

In an embodiment, a method for coaxial eye tracking in a near-eye display device mounted in field of view of an eye of a user includes generating infrared light using a single light source and diffracting the infrared light to generate at least three infrared light beams propagating along at least three different, non-coplanar directions, respectively. The method further includes (a) on a first beamsplitter interface, merging the infrared light beams with visible display light from a display, (b) on a second beamsplitter interface, superimposing the infrared light beams and the visible display light on ambient light from an ambient scene to illuminate the eye with the infrared light beams and present an image of the display to the eye while allowing the eye to view the ambient scene, and (c) via second beamsplitter interface and the first beamsplitter interface, imaging pupil of the eye and reflections of the infrared light beams incident on the eye, to form one or more images indicative of gaze direction of the eye.

BRIEF DESCRIPTION OF THE DRAWINGS

The foregoing and other features and advantages of the disclosure will be apparent from the more particular description of embodiments, as illustrated in the accompanying drawings, in which like reference characters refer to the same parts throughout the different figures. The drawings are not necessarily to scale, emphasis instead being placed upon illustrating the principles of the disclosure.

FIG. 12 illustrates a method for directing light, reflected by an eye, through a near-eye display device to a camera, according to an embodiment.

FIG. 13 illustrates a method for illuminating a display and generating associated display light, according to an embodiment.

FIG. 14 illustrates a polarization-based method for performing coaxial eye imaging in a near-eye display device, according to an embodiment.

FIG. 15 illustrates a method for directing polarized IR light through a near-eye display device toward an eye to illuminate the eye, according to an embodiment.

FIG. 16 illustrates a method for directing polarized visible display light through a near-eye display device toward an eye to present a display image to the eye, according to an embodiment.

FIG. 26 illustrates a method for using a near-eye display device to coaxially image an eye, to form one or more images indicative of the gaze direction of the eye, according to an embodiment.

FIG. 33 illustrates a method for calibrating gaze evaluation by a near-eye display device, according to an embodiment.

FIG. 34 illustrates a method for determining the gaze direction of an eye, using a near-eye display device and based in part on a gaze direction calibration, according to an embodiment.

FIGS. 35A and 35B show two exemplary images of an eye, captured by a near-eye display device, when the eye is in a gaze-associated calibration direction and during actual use of the near-eye display device, respectively.

DETAILED DESCRIPTION OF THE EMBODIMENTS

Figure 1:
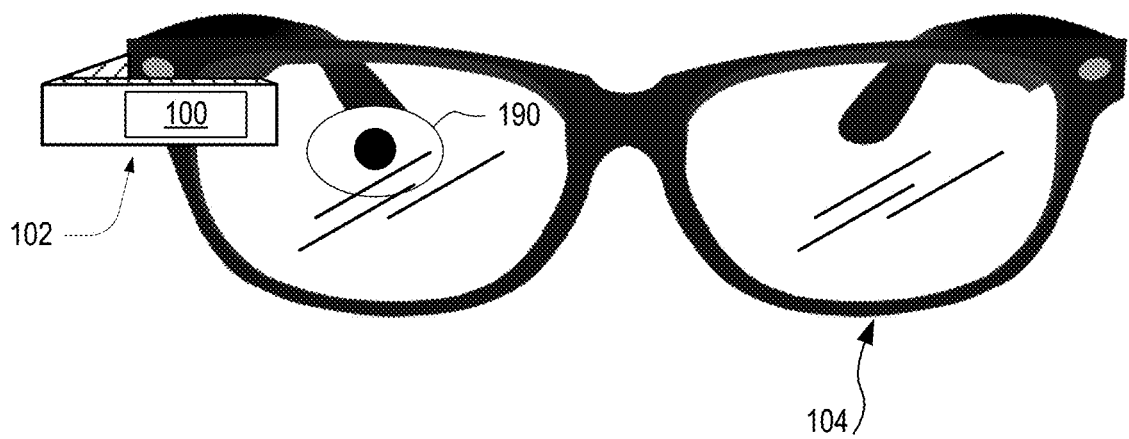
FIG. 1 illustrates a near-eye display device with coaxial eye imaging, according to an embodiment.

FIG. 1 illustrates one exemplary near-eye display device 100 with coaxial eye imaging. Display device 100 is implemented in a near-eye display system 102 configured to position display device 100 near eye 190 of a user. In the example illustrated in FIG. 1, near-eye display system 102 mounts to a glasses frame 104 worn by the user. Alternatively, near-eye display system 102 is mounted to a helmet worn by the user, the head or shoulder of a user, or otherwise placed such that near-eye display device 100 is in the field of view of one eye of the user. Display device 100 is a see-through display device that superimposes a display image on an ambient scene viewed by the user.

Display device 100 is capable of imaging eye 190. In one exemplary use scenario, display device 100 images eye 190 to track the movement of eye 190. In this scenario, display device 100 may display different display images based upon the movement of eye 190 or gaze direction of eye 190 such that the user may control display device 100 through movement or gaze direction of eye 190. In another exemplary use scenario, display device 100 captures an image of eye 190, which includes the iris of eye 190. Display device 100 may utilize such an image of the iris of eye 190 for biometric identification of the user, for example to ensure that the user is authorized to use display device 100. Alternatively, or in combination therewith, display device 100 may utilize an image of the iris of eye 190 to assess certain health related parameters of the user, such as blood sugar, blood alcohol, and/or blood pressure.

Figure 2:
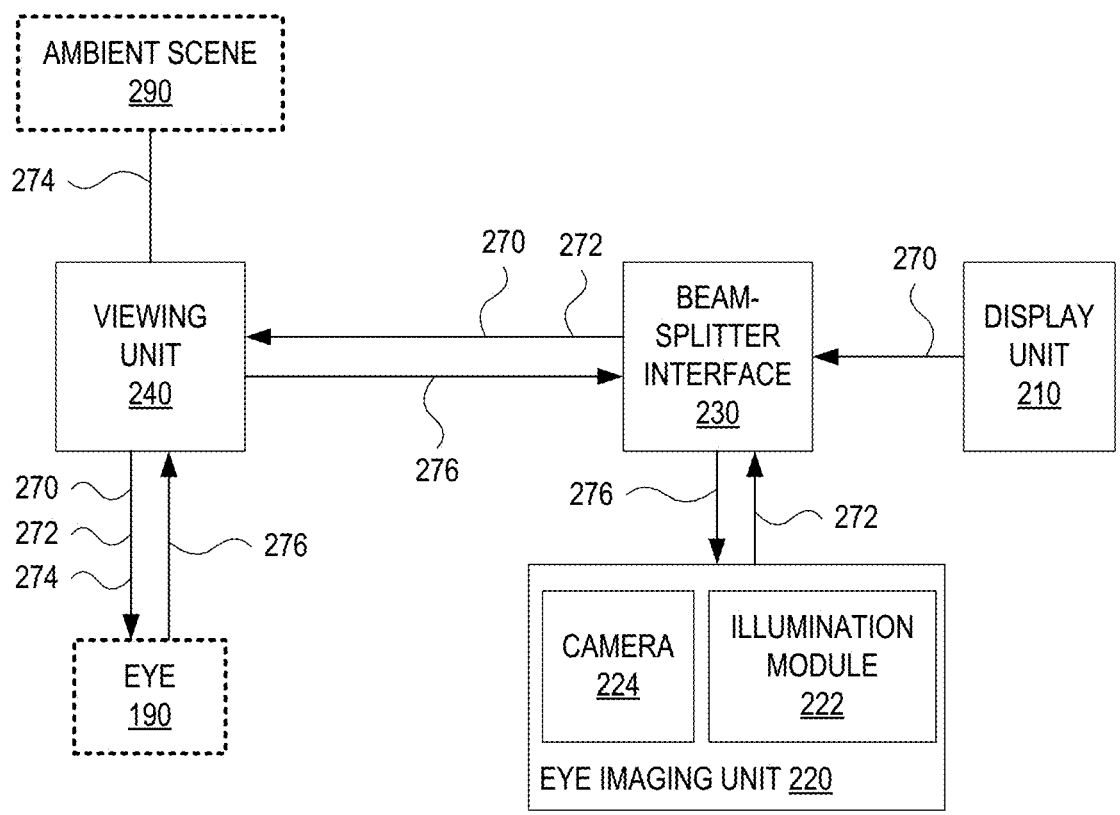
FIG. 2 is a block diagram illustrating the near-eye display device of FIG. 1 in further detail, according to an embodiment.

FIG. 2 is a block diagram illustrating near-eye display device 100 in further detail. Display device 100 includes a display unit 210, an eye imaging unit 220, a beamsplitter interface 230, and a viewing unit 240. Display device 100 implements eye imaging unit 220 such that light associated with imaging of eye 190 propagates coaxially with display light used to present a display image to eye 190. This coaxial propagation simplifies alignment of the eye imaging unit with eye 190, as compared to prior art systems where illumination and/or imaging of eye 190 takes place along an optical path separate from the optical path associated with presenting a display image to the eye. By virtue of the coaxial propagation in display device 100, proper alignment of display light from display unit 210 relative to eye 190 automatically ensures proper alignment of eye imaging unit 220 relative to eye 190. In certain embodiments, the positions of all of display unit 210, eye imaging unit 220, beamsplitter interface 230, and viewing unit 240 are fixed with respect to each other such that the user need only adjust the position of a single physical device, namely display device 100, to achieve proper alignment of both (a) the display image provided by display unit 210 and (b) the eye imaging capability provided by eye imaging unit 220. Beamsplitter interface 230 may be polarizing, non-polarizing, or partially polarizing.

Display unit 210 displays an image and emits visible display light 270, associated with this image, toward beamsplitter interface 230. Visible display light 270 further propagates from beamsplitter interface 230 to viewing unit 240. Viewing unit 240 propagates visible display light 270 to eye 190 in a manner that presents the display image to eye 190. Viewing unit 240 transmits ambient light 274 from an ambient scene 290 such that eye 190 may view ambient scene 290 through viewing unit 240. Accordingly, viewing unit 240 superimposes the display image on ambient scene 290.

Eye imaging unit 220 includes an infrared (IR) illumination module 222 and a camera 224. IR illumination module 222 emits IR light 272, for example in the near-IR spectral range, such as in the range from about 800 nanometers (nm) to about 1000 nm. IR illumination module 222 may include one or more light-emitting diodes and, optionally, other optical components such as one or more lenses and/or optical filters. Camera 224 is configured to image infrared light at least in a spectral range that overlaps with the spectral range of IR light 272. Camera 224 may include an IR-sensitive image sensor and an imaging objective. Camera 224 may further include a spectral filter that filters out unwanted spectral components. In one example, camera 224 includes a spectral filter that blocks visible light.

In certain embodiments, camera 224 is further configured to image a red portion of the visible spectrum such that camera 224 is sensitive to red light reflected by the pupil of eye 190. These embodiments are particularly useful for eye tracking applications, as discussed below in reference to FIGS. 17-38.

IR illumination module 222 emits IR light 272 toward beamsplitter interface 230. Beamsplitter interface 230 merges IR light 272 with visible display light 270 such that IR light 272 and visible display light 270 propagate coaxially to viewing unit 240. Viewing unit 240 directs both of IR light 272 and visible display light 270 to eye 190 such that IR light 272, visible display light 270, and ambient light 274 propagate coaxially from viewing unit 240 to eye 190. Eye 190 reflects at least a portion of IR light 272 back toward viewing unit 240, and eye 190 may further reflect a portion of ambient light 274, such as a reflected ambient light in the red spectrum, back toward viewing unit 240. Such reflected light 276 propagates coaxially (although in opposite direction) with IR light 272, visible display light 270, and ambient light 274 between eye 190 and viewing unit 240, and further propagates coaxially (although in opposite direction) with IR light 272 and visible display light 270 from viewing unit 240 to beamsplitter interface 230. Beamsplitter interface 230 separates reflected light 276 from visible display light 270 and directs reflected light 276 to camera 224. Camera 224 captures an image of eye 190 based upon reflected light 276.

Without departing from the scope hereof, portions of visible display light 270, IR light 272, ambient light 274, and/or reflected light 276 may be lost at one or both of beamsplitter interface 230 and viewing unit 240 and propagate in directions different from those shown in FIG. 2. It is understood that, throughout the present disclosure and although not explicitly discussed, light losses may occur on a beamsplitter interface. For example, a beamsplitter interface may merge only 90% (or another fraction) of one form of light with another form of light, or a beampliiter interface may separate only 90% (or another fraction) of one form of light from another form of light, without departing from the scope hereof.

Figure 3:
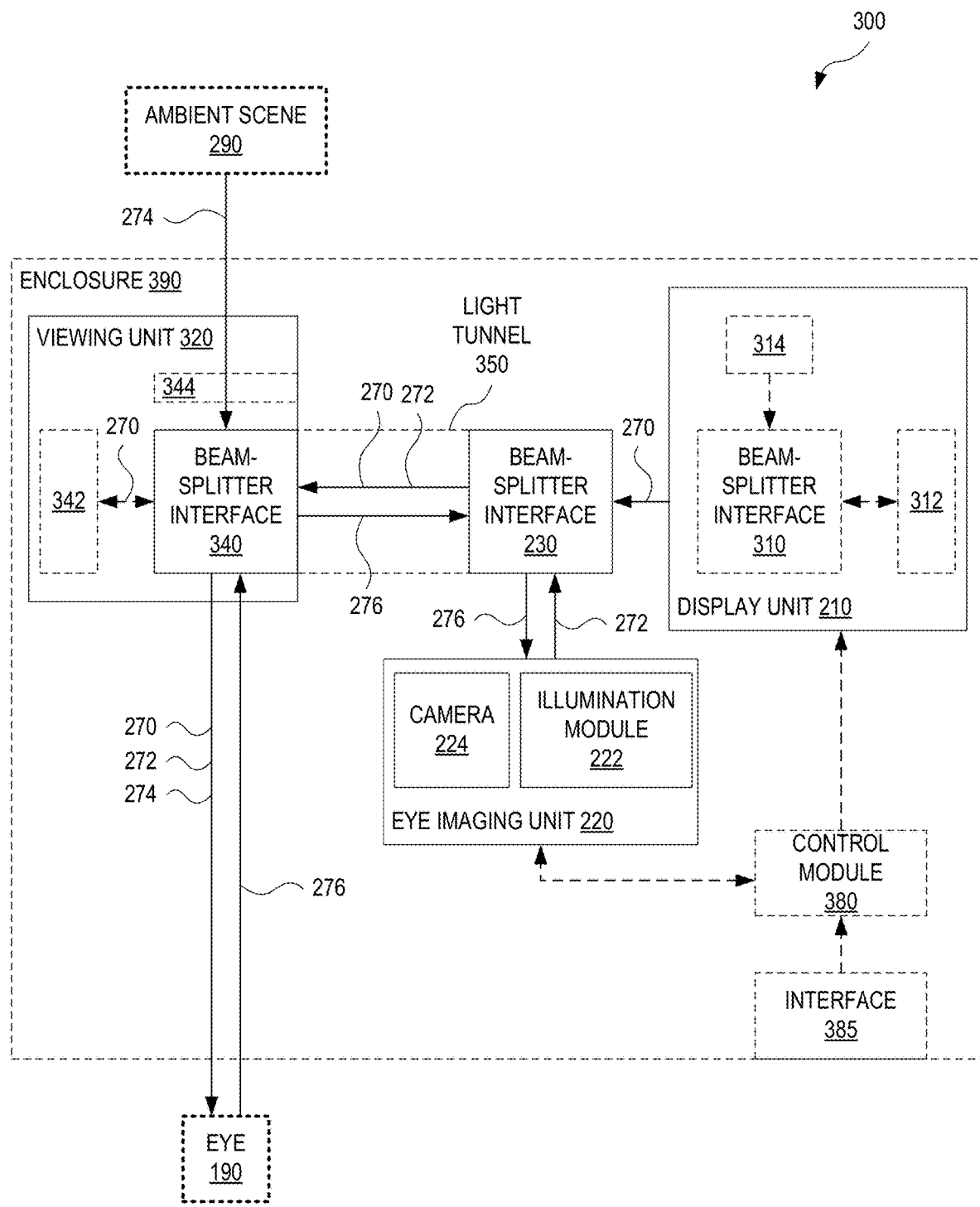
FIG. 3 is a block diagram illustrating another near-eye display device with coaxial eye imaging, according to an embodiment.

FIG. 3 is a block diagram illustrating one exemplary near-eye display device 300 with coaxial eye imaging. Display device 300 is an embodiment of near-eye display device 100. Display device 300 implements viewing unit 240 as a viewing unit 320 that includes a beamsplitter interface 340. Beamsplitter interface 340 merges ambient light 274 with visible display light 270 and IR light 272 to direct all of visible display light 270, IR light 272, and ambient light 274 toward eye 190. Beamsplitter interface 340 may be polarizing, non-polarizing, or partially polarizing.

In an embodiment, viewing unit 320 further includes an imaging objective 342, and beamsplitter interface 340 is configured to direct visible display light 270 toward imaging objective 342. Imaging objective 342 focuses visible display light 270 and redirects visible display light 270 back to beamsplitter interface 340, whereafter beamsplitter interface 340 directs visible display light 270 to eye 190 as discussed above in reference to FIG. 2. In one implementation, imaging objective 342 forms a virtual image located at an apparent distance away from eye 190, optionally externally to display device 300. This virtual image may be formed at infinity or at a finite distance from eye 190. Beamsplitter interface 340 transmits at least a portion of light from ambient scene 290 propagating towards eye 190. Thus, beamsplitter interface 340 provides see-through functionality for display device 300.

In certain embodiments, viewing unit 320 includes an IR filter 344 that removes IR light from ambient light 274 prior to ambient light 274 reaching beamsplitter interface 340 so as to prevent such an IR component of ambient light 274 from reaching camera 224, at least for the spectral IR range detected by camera 224. Thus, IR filter 344 eliminates or reduces background noise in images of eye 190 captured by camera 224. IR filter 344 is, for example, an IR mirror.

Optionally, display device 300 implements display unit 210 with a beamsplitter interface 310, a display 312, and a visible light source 314. Display 312 is, for example, a liquid crystal on silicon (LCOS) display. Beamsplitter interface 310 directs visible illumination light from light source 314 to display 312 to illuminate display 312. Display 312 uses this visible illumination light to display an image, and beamsplitter interface 310 directs visible display light 270 toward beamsplitter interface 230. In one implementation, visible light source 314 includes a light emitting diode (LED) based light source, such as an RGB LED module for generating red, blue, and green light. In this implementation, display 312 and visible light source 314 may cooperate to provide a color display.

In an embodiment, display device 300 includes a light tunnel 350 that connects beamsplitter interfaces 230 and 340, or alternatively connects (e.g., bonds) two optical elements (e.g., beamsplitter cubes) that implement beamsplitter interfaces 230 and 340, respectively. In this embodiment, visible display light 270, IR light 272, and reflected light 276 propagate between beamsplitter interface 230 (or associated optical elements such as beamsplitter cubes that implement beamsplitter interfaces 230 and 340) and viewing unit 320. Light tunnel 350 may be a solid material capable of transmitting light of a desired wavelength, such as visible light and IR light. For example, light tunnel 350 may be made of glass or an optical plastic, such as acrylic, polystyrene, polycarbonate, or polyolefin.

Although not shown in FIG. 3, display unit 210 may be directly connected to beamsplitter interface 230 (or an optical element implementing beamsplitter interface 230). For example, a beamsplitter cube implementing beamsplitter interface 310 may be bonded to a beamsplitter cube implementing beamsplitter interface 230. Likewise, eye imaging unit 220 may be connected (e.g., bonded) to beamsplitter interface 230, light tunnel 350, and/or display unit 210. Thus, in one embodiment, display unit 210, eye imaging unit 220, beamsplitter interface 230, light tunnel 350, and viewing unit 320 form a mechanically integrated module.

Optionally, display device 300 includes a control module 380. For example, control module 380 controls one or more of visible light source 314, display 312, IR illumination module 222, and camera 224. Control module 380 may receive one more images from camera 224 to control the image, displayed by display unit 210, according to information about eye 190 as provided by the image(s) captured by camera 224. Display device 300 may further include an interface 385 configured to communicatively couple control module 380 with a user and/or an external computer system. Interface 385 may include a voice interface and/or a touch interface, such as a keypad or a touchpad, for receiving instructions from a user. Through control module 380, such instructions may affect the image formed on display 312. Alternatively, or in combination therewith, interface 385 may include a sound interface for communicating to the user and/or receiving voice commands from the user. While FIG. 3 illustrates control module 380 and interface 385 as being included in display device 300, one or both of control module 380 and interface 385, or portions thereof, may be located externally to display device 300, without departing from the scope hereof. For example, with display device 300 implemented in display system 102 as display device 100, control module 380 and interface 385 may be located in portions of display system 102 different from display device 300. Although not illustrated in FIG. 3, elements of display device 300 may be powered by a battery incorporated in display device 300, or receive power through, for example, interface 385, without departing from the scope hereof.

Display device 300 may further include an enclosure 390 with one opening (not shown in FIG. 3) for receiving ambient light 274 and another opening for optically coupling beamsplitter interface 340 with eye 190.

Figure 4:
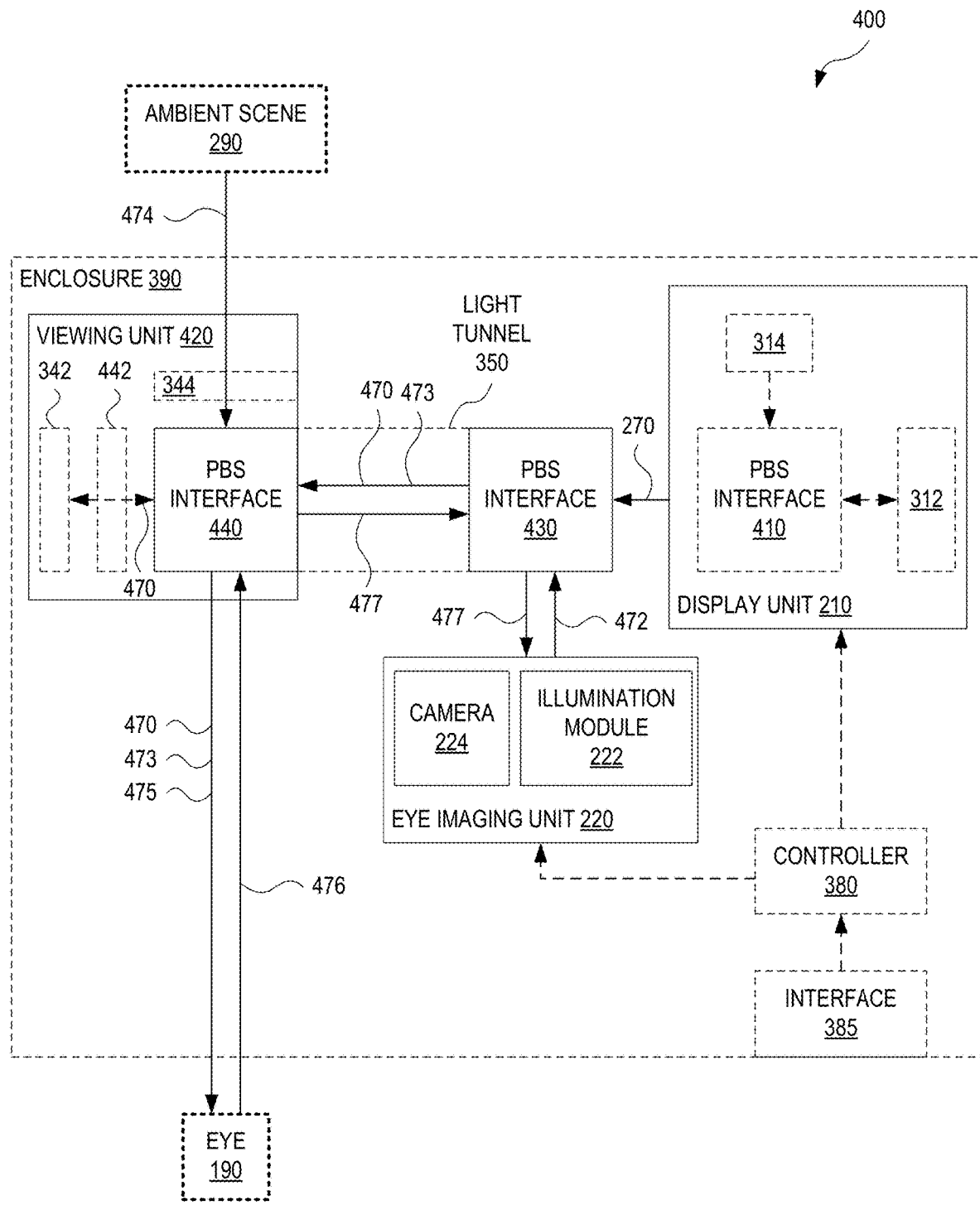
FIG. 4 is a block-diagram illustrating a polarization-based near-eye display device with coaxial eye imaging, according to an embodiment.

FIG. 4 is a block-diagram illustrating one exemplary polarization-based near-eye display device 400 with coaxial eye imaging. Display device 400 is an embodiment of display device 300. Display device 400 implements each beamsplitter interface of display device 300 as a polarizing beamsplitter interface to manage merging and separation of different light components based at least in part on polarization. Specifically, display device 400 implements beamsplitter interface 230, optional beamsplitter interface 310, and beamsplitter interface 340 as polarizing beamsplitter (PBS) interface 430, optional PBS interface 410, and PBS interface 440, respectively.

PBS interface 430 reflects IR light of one polarization component and transmits IR light of the orthogonal polarization component. IR illumination module 222 generates IR light 472, which may or may not be polarized. PBS interface 430 directs one polarization component of IR light 472, i.e., polarized IR light 473 toward PBS interface 440. PBS interface 430 may be configured to reflect or transmit polarized IR light 473 toward PBS interface 440.

PBS interface 430 receives visible display light 270 from display unit 210 and directs polarized visible display light 470 toward PBS interface 440. In one embodiment, visible display light 270 is polarized and polarized visible display light 470 has same type of polarization as visible display light 270. In one example of this embodiment, PBS interface 430 does not have a polarizing function on visible light but is configured to direct at least a portion of visible display light 270 to PBS interface 440. In another example of this embodiment, PBS interface 430 is polarizing also in the visible band and may serve to clean, or at least reduce, imperfections in the polarization of visible display light 270 to produce polarized visible display light 470. In another embodiment, visible display light 270 has polarization properties different from, but not orthogonal to, polarized visible display light 470. In this embodiment, PBS interface 430 is polarizing also in the visible band, and PBS interface 430 selects polarized visible display light 470 from visible display light 270 and directs polarized visible display light 470 toward PBS interface 440.

In the general case, PBS interface 430 either (a) reflects polarized IR light 473 toward PBS interface 440 and transmits polarized visible display light 470 toward PBS interface 440, or (b) transmits polarized IR light 473 toward PBS interface 440 and reflects polarized visible display light 470 toward PBS interface 440. PBS interface 430 may include one or more coatings to achieve this. In one implementation, PBS interface 430 includes one coating with polarizing function in the IR band and another coating with a polarizing function in the visible band. In another implementation, PBS interface 430 includes one broadband coating that has polarizing function both in the IR band and in the visible band. Also in the general case, the polarization of polarized IR light 473 is orthogonal to the polarization of polarized visible display light 470. Herein, "IR band" refers to the spectral range of IR light 472 and "visible band" refers to the spectral range of visible display light 270.

PBS interface 440 is configured to reflect one polarization component and transmit the orthogonal polarization component, wherein PBS interface 440 has same polarizing function in the visible band as in the IR band. In one embodiment, PBS interface 440 transmits light of same polarization as polarized visible display light 470 and reflects light of same polarization as polarized IR light 473. In this embodiment, PBS interface 440 may transmit polarized visible display light 470 to imaging objective 342 through an optional quarterwave plate 442. By virtue of quarterwave plate 442, the polarization of polarized visible display light 470 is rotated 90 degrees when returning to PBS interface 440, and PBS interface 440 then reflects the returned polarized visible display light 470 toward eye 190. PBS interface 440 transmits polarized ambient light 475 received from ambient scene 290 as at least a portion of ambient light 474.

Near-eye display device 400 is configured to image a portion of polarized IR light 473 reflected by eye 190 and, optionally, also a portion of polarized ambient light 475 reflected by eye 190, such as polarized ambient light 475 in the red range of the visible spectrum. Reflected light 476 indicates such light reflected by eye 190, which is in a spectral range imageable by camera 224 via PBS interfaces 440 and 430. Reflected light 476 propagates from eye 190 toward PBS interface 440. PBS interface 440 directs a polarized portion of reflected light 476 toward PBS interface 430 as polarized reflected light 477. PBS interface 430 directs at least a portion of polarized reflected light 477 toward camera 224. Each of PBS interfaces 440 and 430 is configured to have similar reflection and transmission properties for polarized reflected light 477 as for polarized IR light 473.

Certain embodiments of display device 400 include PBS interface 410, visible light source 314, and display 312. In such embodiments, PBS interface 410 directs one polarization component of visible light from visible light source 314 toward display 312. Display 312 emits visible display light that includes a polarization component transmittable by PBS interface 410, so as to emit visible display light 270 as polarized visible display light 470.

Figure 5A:
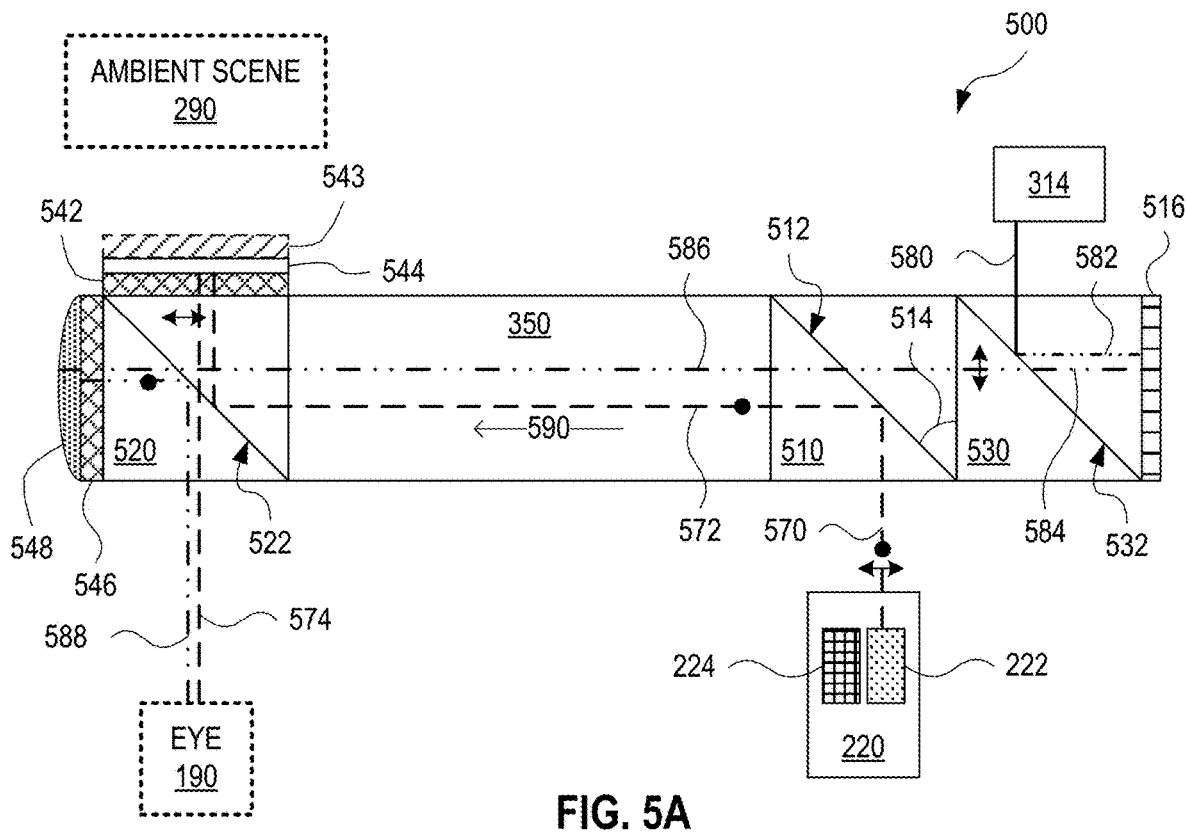
FIGS. 5A, 5B, and 5C illustrate another polarization-based near-eye display device with coaxial eye imaging, according to an embodiment.
Figure 5B:
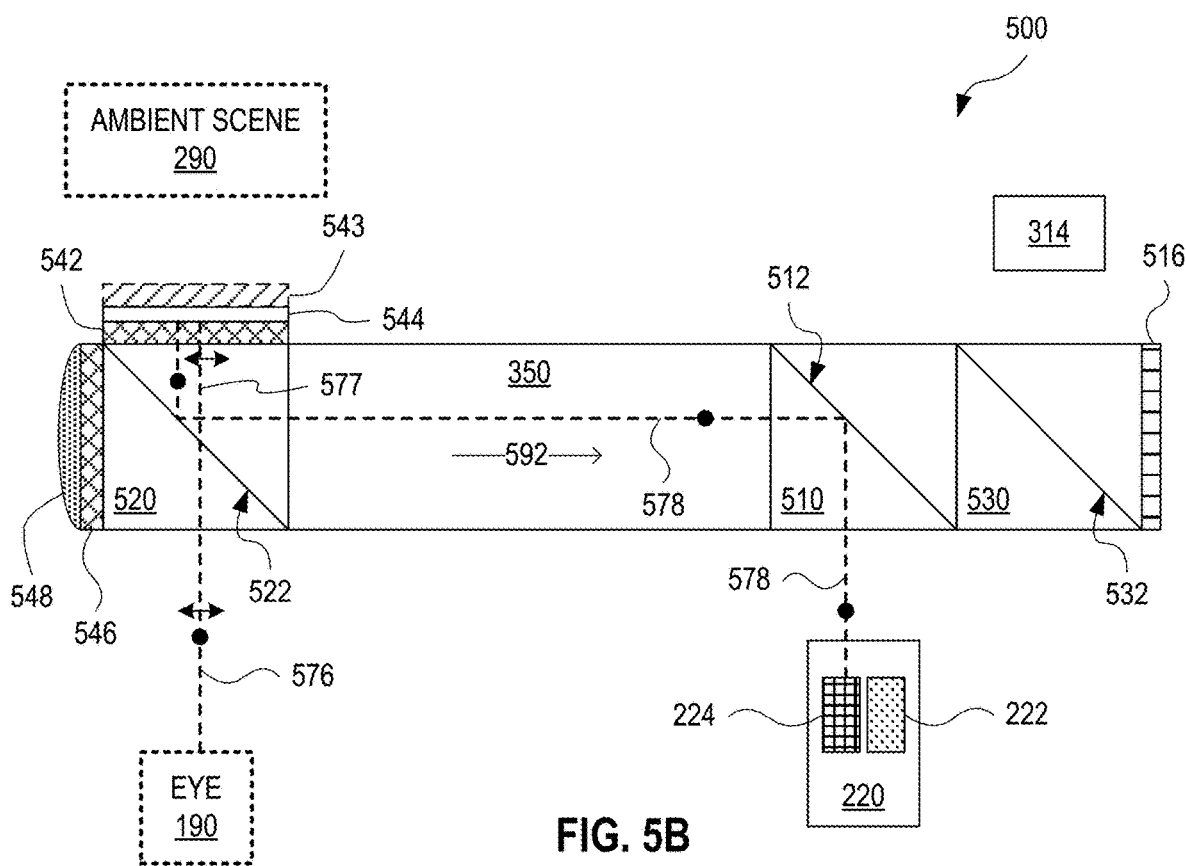
Figure 5C:
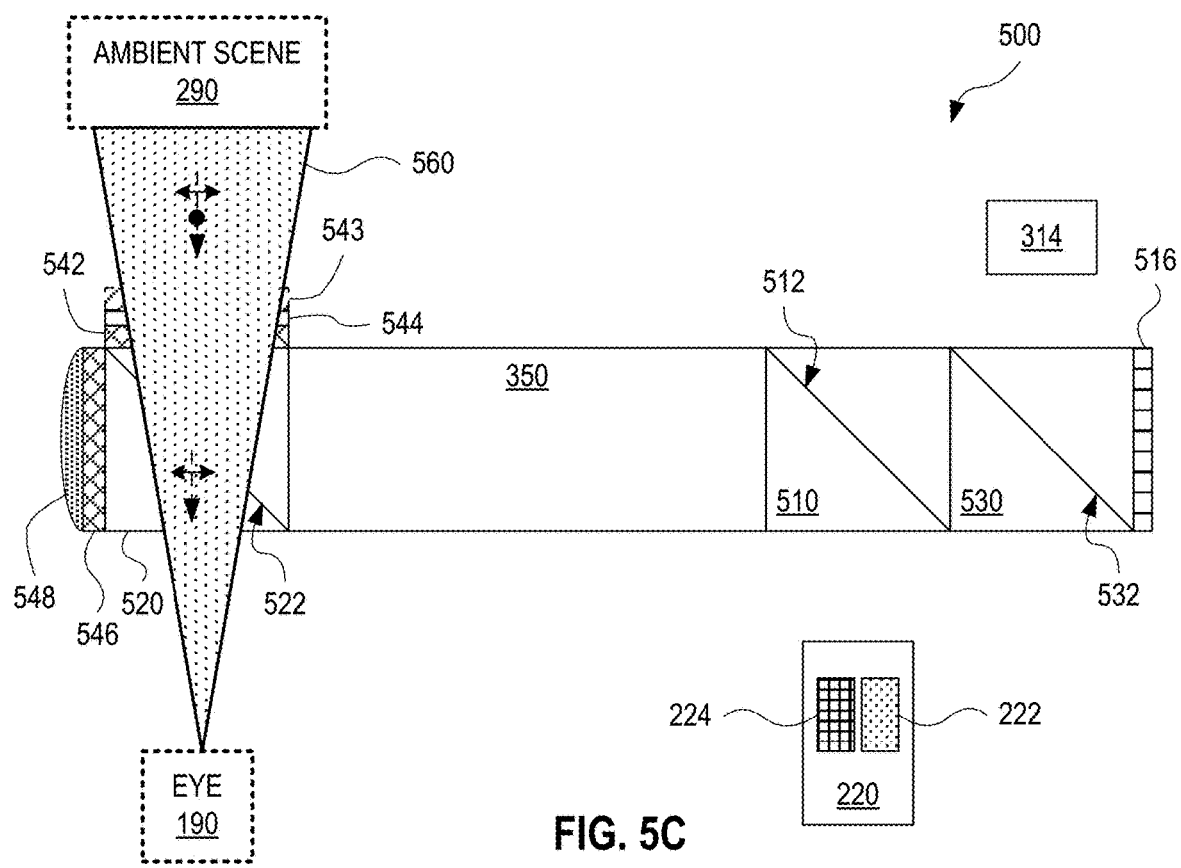

FIGS. 5A, 5B, and 5C illustrate one exemplary polarization-based near-eye display device 500 with coaxial eye imaging. Display device 500 is an embodiment of display device 400. For clarity of illustration, optional control module 380, optional interface 385, and optional enclosure 390 are not shown in FIGS. 5A, 5B, and 5C. FIG. 5A shows propagation of display light and IR light used to illuminate eye 190. FIG. 5B shows propagation of reflected light upon which imaging of eye 190 is based. FIG. 5C shows propagation of ambient light from ambient scene 290 to eye 190. FIGS. 5A, 5B, and 5C are best viewed together.

Display device 500 includes beamsplitter cubes 510, 520, and 530 that include PBS interfaces 512, 522, and 532, respectively. PBS interfaces 512, 522, and 532 are embodiments of PBS interfaces 430, 440, and 410, respectively. In an embodiment, each of beamsplitter cubes 510, 520, and 530 is configured with the associated PBS interface at a 45 degree angle 514 as indicated for beamsplitter cube 510. Display device 500 includes light tunnel 350. Display device 500 further includes visible light source 314 and an LCOS display 516. LCOS display 516 is an embodiment of display 312. Beamsplitter cube 530 is connected (e.g., bonded) to beamsplitter cube 510. Light tunnel 350 is connected (e.g., bonded) to beamsplitter cubes 510 and 520.

Display device 500 implements viewing unit 420 with beamsplitter cube 520, a quarterwave plate 542, a mirror 544, a visible-band quarterwave plate 546, and a curved reflector 548. Mirror 544 is an embodiment of IR filter 344 and is configured to reflect IR light in the spectral range imageable by camera 224. Optionally, mirror 544 is further configured as a partial reflector for a subportion of the visible spectrum, such as a red portion of the visible spectrum. Visible-band quarterwave plate 546 is an embodiment of quarterwave plate 442. Quarterwave plate 542 is configured to function as a quarterwave plate in the spectral range of IR light 572. Quarterwave plate 542 may further be configured to function as a quarterwave plate for a subportion of the visible spectrum, such as a red portion of the visible spectrum.

IR illumination module 222 generates IR light 570 and emits IR light 570 in the direction toward beamsplitter cube 510 (see FIG. 5A). IR light 570 need not be polarized but includes s-polarized IR light 572. s-polarized IR light 572 is s-polarized with respect to PBS interface 512. PBS interface 512 is configured to reflect s-polarized light and transmit p-polarized light in both the IR band and the visible band. Thus, PBS interface 512 reflects s-polarized IR light 572, received from IR illumination module 222, toward PBS interface 522. s-polarized IR light 572 propagates through light tunnel 350 in a general direction 590. PBS interface 512 is configured to reflect s-polarized light and transmit p-polarized light in both the IR band and the visible band. Thus, PBS interface 522 reflects s-polarized IR light 572, received from light tunnel 350, in the direction toward ambient scene 290, such that s-polarized IR light 572 passes through quarterwave plate 542, is retro-reflected by mirror 544, passes through quarterwave plate 542 again, and then propagates toward PBS interface 522 in the direction toward eye 190 as p-polarized IR light 574. PBS interface 522 transmits s-polarized IR light 572 toward eye 190, such that s-polarized IR light 572 illuminates eye 190.

Visible light source 314 generates visible light 580 (see FIG. 5A). PBS interface 532 reflects a portion 582 of visible light 580 toward LCOS display 516 to illuminate LCOS display 516. Portion 582 is s-polarized, for example. LCOS display 516 emits visible display light 584 in the direction toward PBS interface 532. LCOS display 516 generates visible display light 584 from portion 582. PBS interface 532 transmits p-polarized visible display light 586 which is at least a portion of visible display light 584. p-polarized visible display light 586 is transmitted by PBS interface 512, propagates through light tunnel 350 along direction 590, is transmitted by PBS interface 522, passes through visible-band quarterwave plate 546, is retro-reflected and focused by curved reflector 548, passes through visible-band quarterwave plate 546 again, and then propagates toward PBS interface 522 in the direction toward light tunnel 350 as s-polarized visible display light 588. However, PBS interface 522 reflects s-polarized visible display light 588 toward eye 190 to present a virtual image of LCOS display 516 to eye 190.

For clarity of illustration FIG. 5A shows light propagation as straight lines that do not overlap. However, it is understood that light, such as display light and IR illumination light, propagates through display device 500 as beams that have non-zero extent and are possibly diverging or converging, and also that different beams may overlap. For example, p-polarized visible display light 586 and s-polarized IR light 572 may be overlapping beams between PBS interfaces 512 and 522.

A portion of p-polarized IR light 574 is reflected by eye 190 as reflected light 576 (see FIG. 5B). Reflected light 576 may further include a portion of ambient light 560 (see FIG. 5C) received from ambient scene 290 and reflected by eye 190, wherein such reflected ambient light is in a spectral range that is imageable by camera 224, for example in a red portion of the visible range. Reflected light 576 may include both p-polarized and s-polarized components. PBS interface 522 transmits p-polarized reflected light 577 which is a portion of reflected light 576. p-polarized reflected light 577 passes through quarterwave plate 542, is reflected by mirror 544, passes through quarterwave plate 542 again, and then propagates toward PBS interface 522 as s-polarized reflected light 578. PBS interface 522 reflects s-polarized reflected light 578 toward PBS interface 512. s-polarized reflected light 578 propagates through light tunnel 350 toward PBS interface 512 along a general direction 592 opposite direction 590. PBS interface 512 reflects s-polarized reflected light 578 toward camera 224. Camera 224 captures an image of eye 190 based upon s-polarized reflected light 578.

The polarization management of IR light 570, and components thereof, throughout display device 500 minimizes the risk of IR light 570 being reflected back to eye 190 through other means than the intended reflection off of eye 190. As a result, images of eye 190 captured by camera 224 have minimal noise contribution from undesirable back-reflection of IR light 570. Without departing from the scope hereof, any of PBS interfaces 512, 522, and 532 may transmit (reflect) a small amount of light having polarization orthogonal to the polarization direction that the PBS interface is designed to transmit (reflect). This may occur, for example, if light is incident on one of PBS interfaces 512, 522, and 532 at an angle significantly away from the design angle of the PBS interface.

Ambient light 560 propagating from ambient scene 290 through PBS interface 522 to eye 190 may be of any polarization (see FIG. 5C). However, transmission of ambient light 560 by PBS interface 522 is substantially limited to a p-polarized component of ambient light 560. If ambient scene 290 is very close to display device 500, ambient light 560 may include light having angles of incidence onto PBS interface 522 sufficiently far away from the design angle of incidence for PBS interface 522 that some s-polarized light will leak through PBS interface 522 to eye 190. In any case, eye 190 will be able to receive at least a portion of ambient light 560 and thus be able to view ambient scene 290 through display device 500. Eye 190 may reflect, as part of reflected light 576, a portion of ambient light 560, which is in a spectral range imageable by camera 224.

Ambient light 560 may include a spectral component in the IR band. However, this component is reflected away from display device 500 by mirror 544 and therefore does not contribute to background in images of eye 190 captured by camera 224.

Optionally, viewing unit 420, as implemented in display device 500, further includes a polarization filter 543 that allows only transmission of p-polarized ambient light 560 into beamsplitter cube 520. This minimizes the risk of ambient light 560 being reflected by PBS interface 522 toward LCOS display 516 and/or camera 224.

Figure 6:
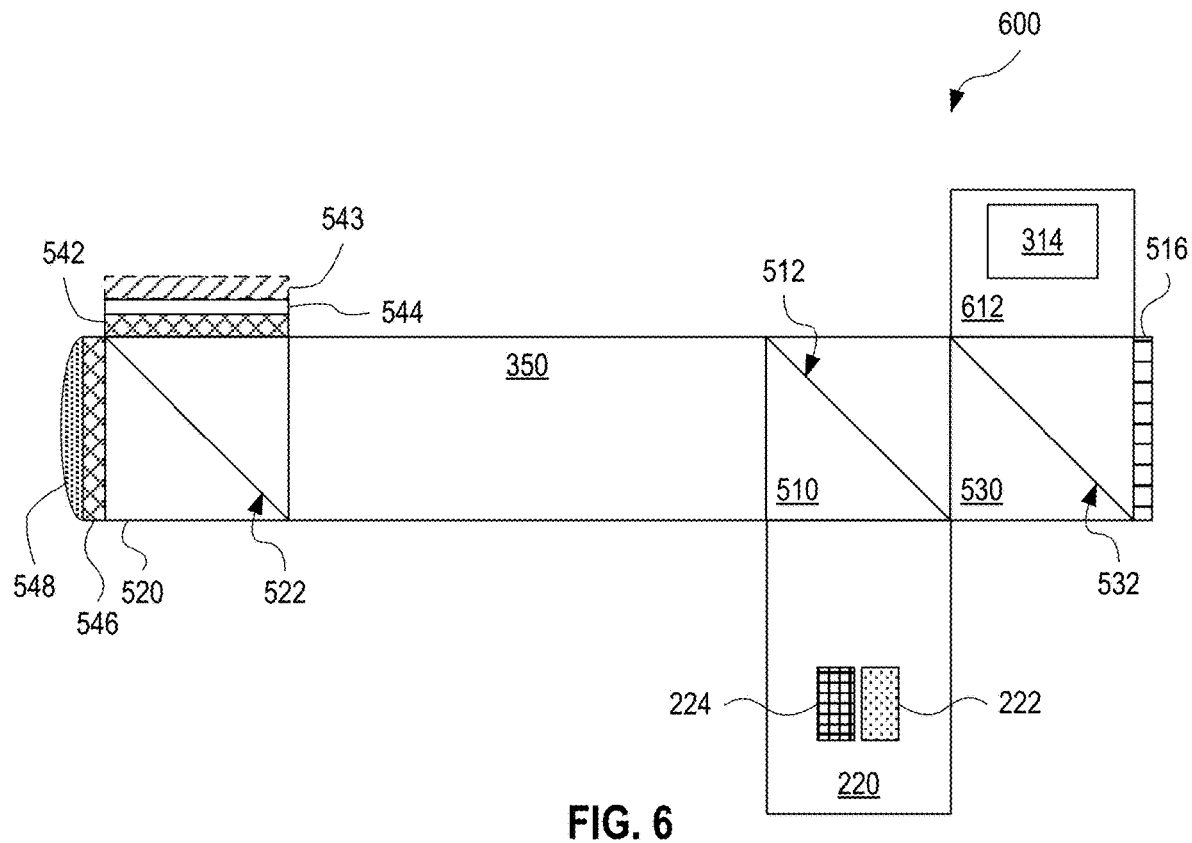
FIG. 6 illustrates a polarization-based near-eye display device with coaxial eye imaging, wherein an eye imaging unit is connected to one beamsplitter cube and a visible light source is implemented in an assembly that is connected to another beamsplitter cube, according to an embodiment.

FIG. 6 illustrates one exemplary polarization-based near-eye display device 600 with coaxial eye imaging. Display device 600 is an embodiment of display device 500. In display device 600, eye imaging unit 220 is connected to beamsplitter cube 510 and visible light source 314 is implemented in an assembly 612 that is connected to beamsplitter cube 530. Eye imaging unit 220 may be bonded to beamsplitter cube 510 and, optionally (not shown in FIG. 6), light tunnel 350 and/or beamsplitter cube 530. Likewise, assembly 612 may be bonded to beamsplitter cube 530 and, optionally (not shown in FIG. 6), beamsplitter cube 510. For clarity of illustration, optional control module 380, optional interface 385, and optional enclosure 390 are not shown in FIG. 6.

Figure 7:
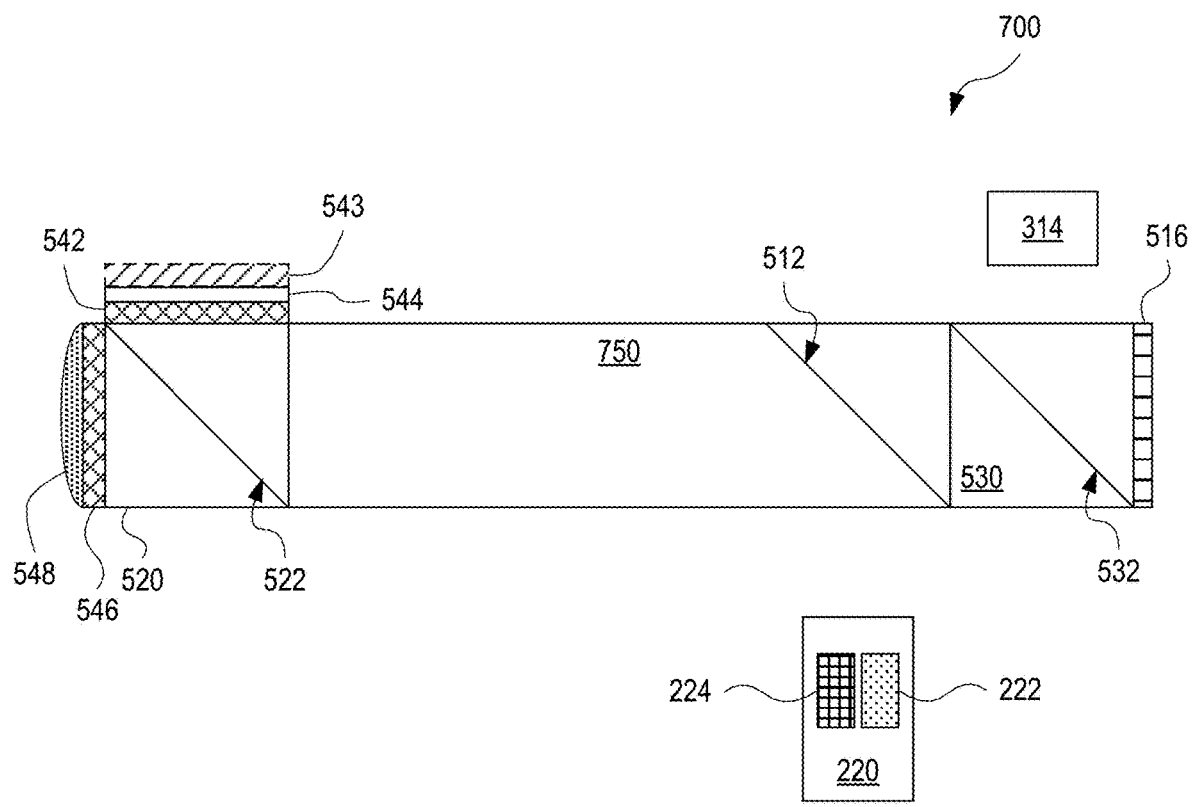
FIG. 7 illustrates a polarization-based near-eye display device with coaxial eye imaging, which includes a light tunnel that implements a polarizing beamsplitter interface, according to an embodiment.

FIG. 7 illustrates one exemplary polarization-based near-eye display device 700 with coaxial eye imaging. Display device 700 is an embodiment of display device 400. Display device 700 is similar to display device 500 except for light tunnel 350 and beamsplitter cube 510 being replaced by a light tunnel 750 implementing PBS interface 512. Although not shown in FIG. 7, eye imaging unit 220 may be connected to light tunnel 750 in a manner similar to that shown in FIG. 6, without departing from the scope hereof. Likewise, display device 700 may implement visible light source 314 in assembly 612 as shown in FIG. 6, without departing from the scope hereof. For clarity of illustration, optional control module 380, optional interface 385, and optional enclosure 390 are not shown in FIG. 7.

Figure 8:
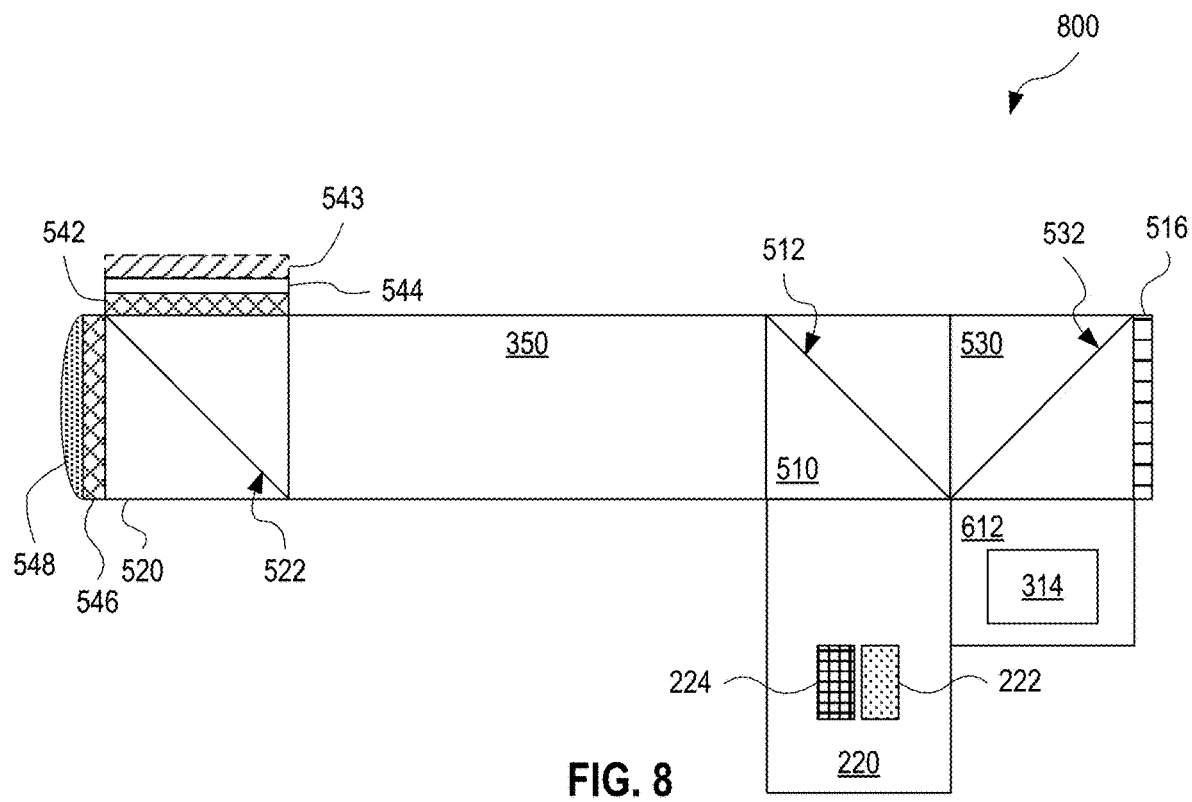
FIG. 8 illustrates another polarization-based near-eye display device with coaxial eye imaging, according to an embodiment.

FIG. 8 illustrates one exemplary polarization-based near-eye display device 800 with coaxial eye imaging. Display device 800 is an embodiment of display device 400. Display device 800 is similar to display device 600 except that the orientation of beamsplitter cube 530 in display device 800 is rotated, as compared to the configuration of display device 600, such that assembly 612 is adjacent eye imaging unit 220. Assembly 612 may be disposed a distance away from eye imaging unit 220, without departing from the scope hereof. For clarity of illustration, optional control module 380, optional interface 385, and optional enclosure 390 are not shown in FIG. 8.

Without departing from the scope hereof, the orientation of beamsplitter cube 530 in display device 800 may be applied to any of display devices 500 and 700 as well as display devices 900 and 1000 discussed below in reference to FIGS. 9 and 10.

Figure 9:
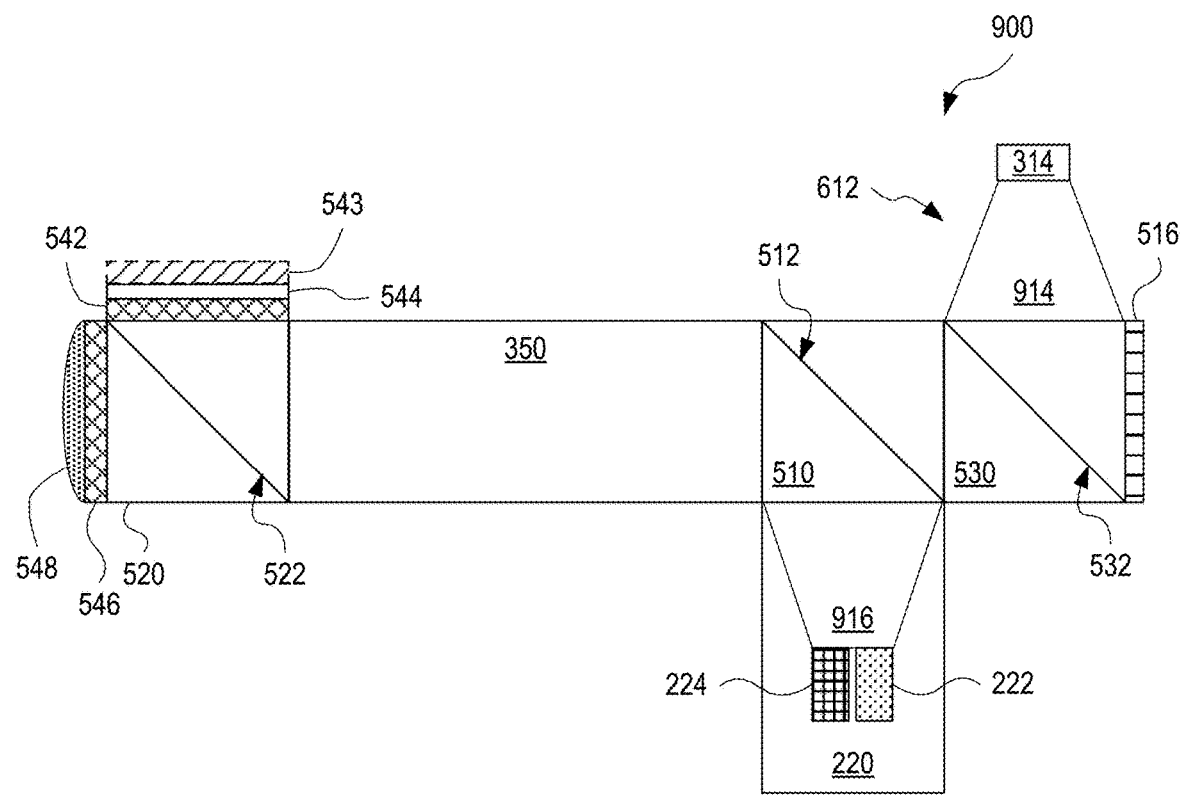
FIG. 9 illustrates a polarization-based near-eye display device with coaxial eye imaging, which includes tapered light tunnels, according to an embodiment.

FIG. 9 illustrates one exemplary polarization-based near-eye display device 900 with coaxial eye imaging. Display device 900 is an embodiment of display device 600. In display device 900, eye imaging unit 220 includes a tapered light tunnel 916 that couples (a) IR light, generated by IR illumination module 222, to beamsplitter cube 510 and (b) light reflected by eye 190 to camera 224 from beamsplitter cube 510. In addition, display device 900 implements assembly 612 with a tapered light tunnel 914 that couples visible light, generated by visible light source 314, to beamsplitter cube 530. Tapered light tunnels 914 and 916 may have material properties similar to those of light tunnel 350. For clarity of illustration, optional control module 380, optional interface 385, and optional enclosure 390 are not shown in FIG. 9.

Without departing from the scope hereof, tapered light tunnels 914 and/or 916 may be implemented in any of display devices 700, 800, and 1000 (discussed below in reference to FIG. 10).

Figure 10:
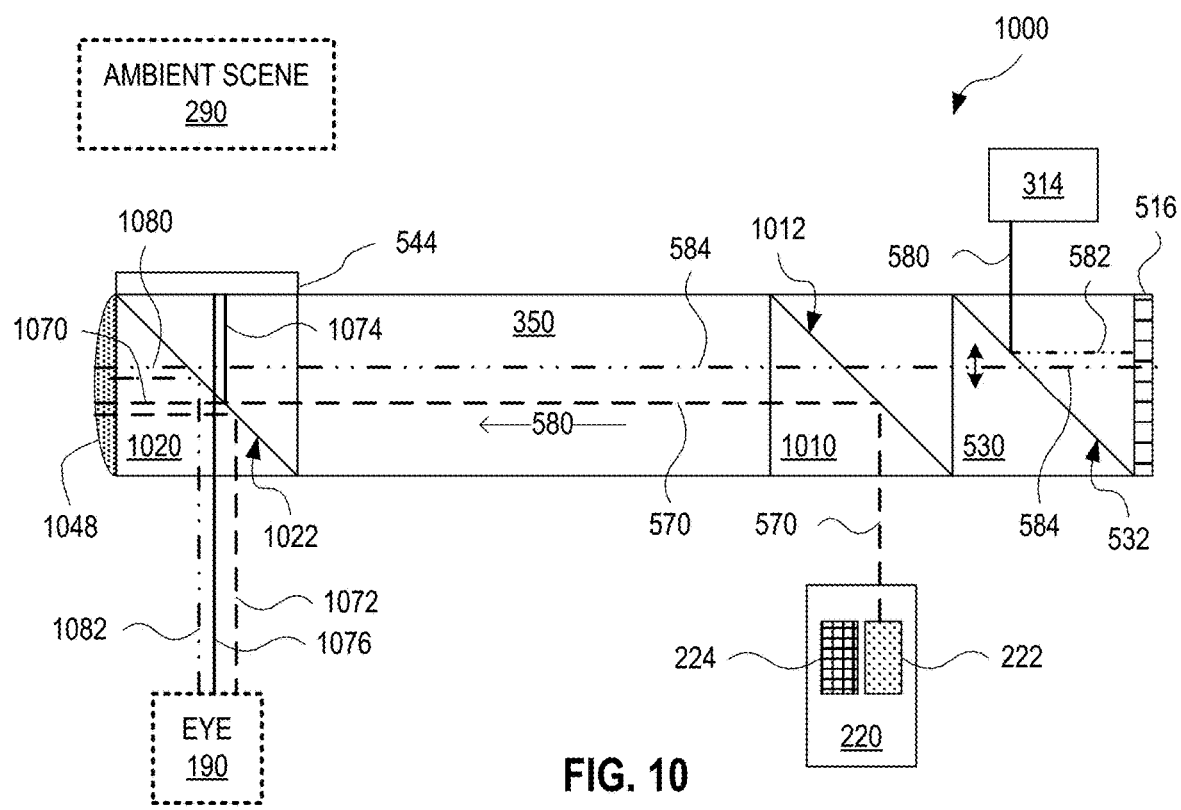
FIG. 10 illustrates yet another near-eye display device with coaxial eye imaging, according to an embodiment.

FIG. 10 illustrates one exemplary near-eye display device 1000 with coaxial eye imaging. Display device 1000 is an embodiment of display device 300. Display device 1000 is similar to display device 500 except that (a) beamsplitter cubes 510 and 520 are replaced with beamsplitter cubes 1010 and 1020, respectively, (b) quarterwave plate 542 and visible-band quarterwave plate 546 are omitted from display device 1000, and (c) curved reflector 548 is replaced by a curved reflector 1048. Curved reflector 1048 is configured to reflect both visible-band and IR-band light.

Beamsplitter cubes 1010 and 1020 include beamsplitter interfaces 1012 and 1022, respectively. Beamsplitter interfaces 1012 and 1022 are embodiments of beamsplitter interfaces 230 and 340, respectively. Beamsplitter interface 1012 has a transmission coefficient of at least 50% for visible-band light and a reflection coefficient of at least 50% for IR-band light, substantially regardless of polarization. In one example, beamsplitter interface 1012 has a nearly 100% transmission coefficient for visible-band light and a nearly 100% reflection coefficient for IR-band light, substantially regardless of polarization. The transmission to reflection ratio for beamsplitter interface 1022 is substantially 50%/50% for both IR-band light and visible-band light, regardless of polarization.

In operation, visible light source 314 generates visible light 580, which results in (see above discussion in reference to FIG. 5) polarized visible display light 584 propagating from beamsplitter cube 530 to beamsplitter cube 1010. At least 50%, and in one embodiment nearly 100%, of polarized visible display light 584 is transmitted by beamsplitter interface 1012 and propagates through light tunnel 350 to beamsplitter cube 1020. Beamsplitter interface 1022 transmits a portion 1080 of polarized visible display light 584 toward curved reflector 1048. Curved reflector 1048 focuses and retro-reflects portion 1080 toward beamsplitter interface 1022. Beamsplitter interface 1022 reflects a portion 1082 of portion 1080 toward eye 190 to present to eye 190 an image of LCOS display 516. Curved reflector 1048 has focusing properties similar to those of curved reflector 548. Up to approximately 25% of polarized visible display light 584, delivered by beamsplitter cube 530, is transmitted to eye 190.

Also in operation, IR illumination module 222 generates IR light 570. At least 50%, and in one embodiment nearly 100%, of IR light 570 is reflected by beamsplitter interface 1012 and propagates through light tunnel 350 to beamsplitter cube 1020. Beamsplitter interface 1022 transmits a portion 1070 of IR light 570 toward curved reflector 1048. Curved reflector 1048 focuses and retro-reflects portion 1070 toward beamsplitter interface 1022. Beamsplitter interface 1022 reflects a portion 1072 of portion 1070 toward eye 190 to illuminate eye 190 with IR light. In addition, beamsplitter interface 1022 reflects a portion 1074 of IR light 570 toward mirror 544. Mirror 544 retro-reflects portion 1074 to beamsplitter interface 1022. Beamsplitter interface 1022 transmits a portion 1076 of portion 1074 toward eye 190 to provide further IR illumination of eye 190. Up to approximately 50% of IR light 570, generated by IR illumination module 222, is transmitted to eye 190.

Eye 190 reflects some of the light incident on eye 190 as portion 1076, back toward beamsplitter interface 1022. Portion 1076 includes IR light that is a reflected portion of portion 1072. Portion 1076 may further include a portion of visible ambient light received from ambient scene 290 and reflected by eye 190, which is in a spectral range imageable by camera 224, for example visible light in the red range. Some of portion 1076 propagates back to eye imaging unit 220 along optical paths propagating in opposite direction to the optical paths associated with IR light 570 and components thereof, as discussed above. Camera 224 captures an image of eye 190 based upon portion 1076.

Ambient light from ambient scene 290 propagates through mirror 544 and beamsplitter interface 1022 in a manner similar to that discussed for display device 500, except that approximately 50% of the ambient light is lost on beamsplitter interface 1022.

Figure 11:
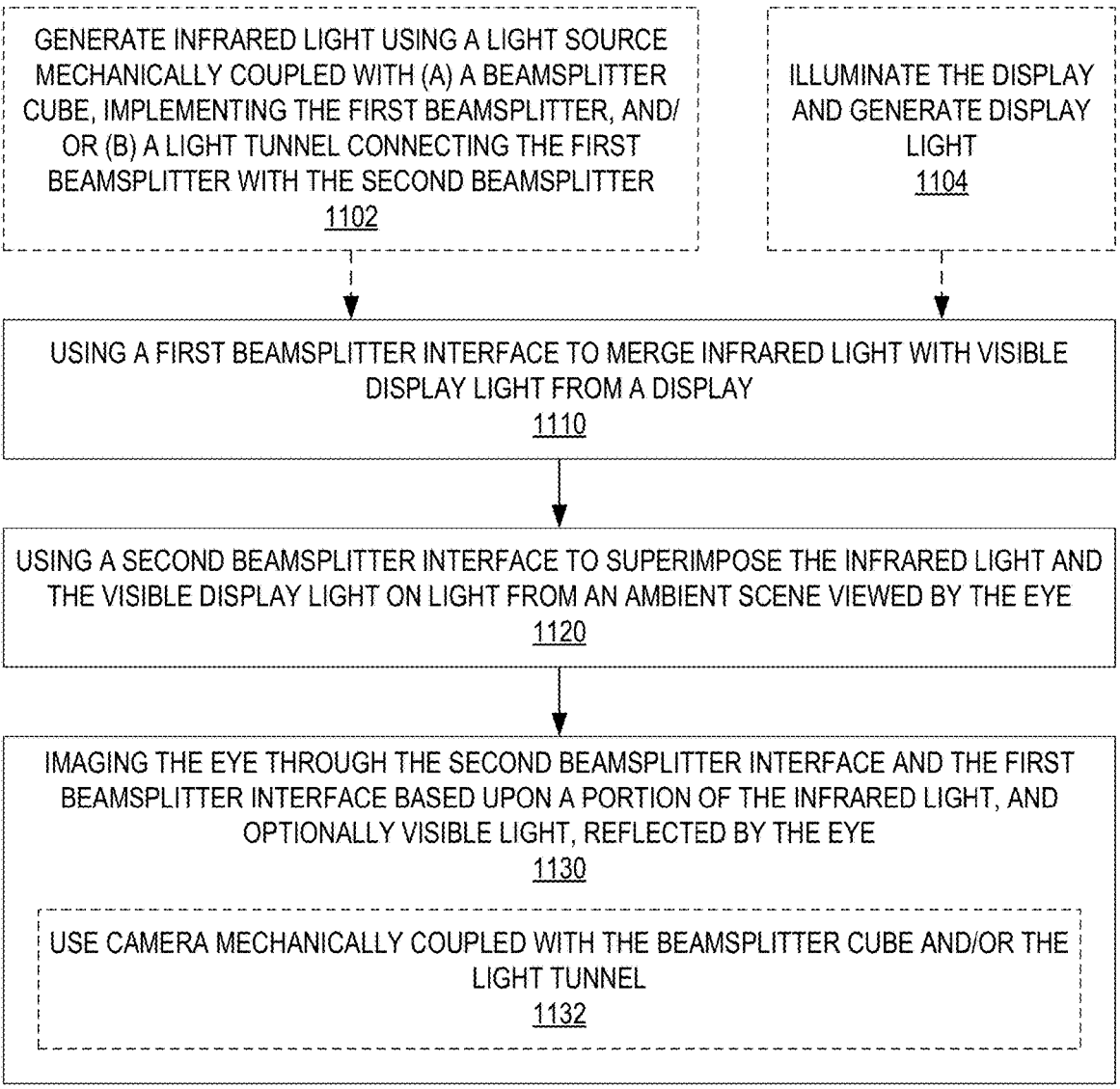
FIG. 11 illustrates a method for performing coaxial eye imaging in a near-eye display device, according to an embodiment.

FIG. 11 illustrates one exemplary method 1100 for performing coaxial eye imaging in a near-eye display device. Method 1100 is for example performed by display device 300.

In a step 1110, method 1100 uses a first beamsplitter interface to merge IR light with visible display light from a display. In one example of step 1110, beamsplitter interface 230 of display device 300 merges IR light 272 with visible display light 270.

In a step 1120, method 1100 uses a second beamsplitter interface to superimpose the IR light and visible display light, of step 1110, on light from an ambient scene viewed by the eye. In one example of step 1120, beamsplitter interface 340 of display device 300 superimposes IR light 272 and visible display light 270 on ambient light 274.

In a step 1130, method 1100 images the eye through the second beamsplitter interface and the first beamsplitter interface based upon a portion of the IR light of step 1120 reflected by the eye, and optionally a portion of visible light received from the ambient scene. In one example of step 1130, camera 224 detects reflected light 276 to capture an image of eye 190. Control module 380 may activate IR illumination module 222 for a finite duration to illuminate eye 190 with at least a portion of IR light 272 during this finite duration. Control module 380 may further be configured to induce capture of the image of eye 190 during this finite duration, based upon reflected light 276.

In an embodiment, method 1100 further includes a step 1102, and step 1130 includes a step 1132. Step 1102 generates infrared light using a light source that is mechanically coupled with (a) a beamsplitter cube, implementing the first beamsplitter, and/or (b) a light tunnel connecting the first beamsplitter with the second beamsplitter. Step 1132 images the eye using a camera that is mechanically coupled with the beamsplitter cube and/or light tunnel of step 1102. In one example of this embodiment, method 1100 utilizes an embodiment of display device 300 wherein eye imaging unit 220 is connected to (a) at least one of beamsplitter cube 510 and light tunnel 350, (b) light tunnel 750, or (c) at least one of beamsplitter cube 1010 and light tunnel 350, as discussed above in reference to FIGS. 6-10.

Optionally, method 1100 also includes a step 1104 of illuminating the display and generating the display light. In one example of step 1104, visible light source 314 illuminates display 312 such that display 312 emits visible display light. This example of step 1104 may further include polarization filtering of the visible display light by beamsplitter interface 310.

FIG. 12 illustrates one exemplary method 1200 for directing the reflected light to a camera in step 1130 of method 1100. In a step 1210, method 1200 separates (a) IR light, and optionally some visible light, reflected by the eye from (b) the ambient scene light using the second beamsplitter interface of step 1120. In one example of step 1210, beamsplitter interface 340 separates reflected light 276 from ambient light 274. In a step 1220, method 1200 separates the reflected light of step 1210 from the visible display light using the first beamsplitter interface of step 1110. In one example of step 1220, beamsplitter interface 230 separates reflected light 276 from visible display light 270.

FIG. 13 illustrates one exemplary method 1300 for illuminating a display and generating associated display light. Method 1300 is an embodiment of step 1104 of method 1100 and may be performed by display unit 210 as implemented in any of display devices 500, 600, 700, 800, 900, and 1000.

In a step 1310, method 1300 generates visible illumination light. In one example of step 1310, visible light source 314 generates visible light 580.

In a step 1320, method 1300 uses a polarizing beamsplitter interface to reflect substantially only a first polarization component of the visible illumination light toward a display. Step 1320 thus illuminates the display with polarized visible illumination light. In one example of step 1320, PBS interface 532 reflects an s-polarized portion 582 of visible light 580 toward LCOS display 516.

In a step 1330, the display emits visible display light. In one example of step 1330, LCOS display 516 emits visible display light 584 generated from s-polarized portion 582 based upon settings of LCOS display 516. These settings are, for example, defined by control module 380.

In a step 1340, substantially only a second polarization component of the visible display light, emitted in step 1330, is transmitted through the polarizing beamsplitter interface of step 1320, to produce polarized visible display light. This second polarization component is orthogonal to the first polarization component. In one example of step 1340, PBS interface 532 transmits p-polarized visible display light 586, wherein p-polarized display light 586 is a component of visible display light 584.

FIG. 14 illustrates one exemplary polarization-based method 1400 for performing coaxial eye imaging in a near-eye display device. Method 1400 is an embodiment of method 1100. Method 1400 is, for example, performed by display device 400.

In a step 1410, method 1400 uses a first polarizing beamsplitter interface to merge polarized IR light with polarized visible display light from a display. In one example of step 1410, PBS interface 430 of display device 400 merges polarized IR light 473 with visible display light polarized visible display light 470.

In an embodiment, step 1410 includes a step 1412 of reflecting only one polarization component of the IR light received from the IR light source. In one example of step 1412, PBS interface 512 of any of display devices 500, 600, 700, 800, and 900 merges s-polarized IR light 572 with p-polarized visible display light 586 by reflecting s-polarized IR light 572 in the same direction as the propagation direction of p-polarized visible display light 586 transmitted by PBS interface 512.

In a step 1420, method 1100 uses a second polarizing beamsplitter interface to superimpose the polarized IR light and polarized visible display light, of step 1410, on light from an ambient scene viewed by the eye. Step 1420 thus directs both the polarized IR light and polarized visible display light to the eye, so as to illuminate the eye with IR light and present a display image to the eye. In one example of step 1420, PBS interface 440 of display device 400 superimposes polarized IR light 473 and polarized visible display light 470 on ambient light 474. In another example of step 1420, beamsplitter interface 522 of any of display devices 500, 600, 700, 800, and 900 superimposes p-polarized IR light 574 and s-polarized visible display light 588 on ambient light 560.

In a step 1430, method 1400 images the eye through the second polarizing beamsplitter interface and the first polarizing beamsplitter interface based upon (a) a portion of the IR light, of step 1420, reflected by the eye and optionally (b) visible light reflected by the eye, such as red visible light received from the ambient scene and reflected by the eye. In one example of step 1430, camera 224 detects polarized reflected light 477 to capture an image of eye 190. In another example of step 1430, camera 224 detects s-polarized reflected light 578 to capture an image of eye 190. In an embodiment, step 1430 includes method 1200 implemented with each of the first and second beamsplitter interfaces being polarizing beamsplitter interfaces, such as PBS interfaces 512 and 522, as discussed above in reference to FIG. 5B. Step 1430 may utilize control module 380 as discussed above for step 1130 in reference to FIG. 11.

In an embodiment, method 1400 further includes a step 1402, and step 1430 includes a step 1432. Step 1402 is similar to step 1102 and step 1432 is similar to step 1132. In one example of this embodiment, method 1400 utilizes an embodiment of display device 400 wherein eye imaging unit 220 is connected to (a) at least one of beamsplitter cube 510 and light tunnel 350 or (b) light tunnel 750, as discussed above in reference to FIGS. 6-9.

Optionally, method 1400 also includes a step 1404 of illuminating the display and generating the display light. In one example of step 1404, visible light source 314 illuminates display 312 such that display 312 emits visible display light, which is subsequently polarization filtered by PBS interface 410. Another example of step 1404 utilizes visible light source 314, PBS interface 532, and LCOS display 516, as discussed above in reference to method 1300.

FIG. 15 illustrates one exemplary method 1500 for directing the polarized IR light toward eye 190 in step 1420 to illuminate the eye. Method 1500 is for example performed by any of display devices 400, 500, 600, 700, 800, and 900.

In a step 1510, method 1500 uses the second polarizing beamsplitter interface to reflect, toward the ambient scene, the polarized IR light received from the first polarizing beamsplitter interface. In one example of step 1510, PBS interface 522 reflects s-polarized IR light 572 toward ambient scene 290.

In a step 1520, method 1500 retro-reflects and rotates the polarization of the polarized IR light, reflected by the second polarizing beamsplitter interface in step 1510, to produce orthogonally polarized IR light. Step 1510 includes steps 1522, 1524, and 1526. In step 1522, method 1500 passes the polarized IR light through a quarterwave plate toward the ambient scene. In one example of step 1522, s-polarized IR light 572 passes through quarterwave plate 542 to form circularly polarized IR light. In step 1524, method 1500 retro-reflects the circularly polarized IR light on a mirror. In one example of step 1524, the circularly polarized IR light, generated by passing s-polarized IR light 572 through quarterwave plate 542, is retro-reflected by mirror 544. In step 1526, method 1500 passes the circularly polarized IR light, retro-reflected in step 1524, through the quarterwave plate again to form orthogonally polarized IR light. In one example of step 1526, the circularly polarized IR light, retro-reflected by mirror 544, passes through quarterwave plate 542 to form p-polarized IR light 574 propagating toward PBS interface 522.

In a step 1530, method 1500 transmits the orthogonally polarized IR light, produced in step 1520, through the second polarizing beamsplitter interface toward the eye to illuminate the eye. In one example of step 1530, PBS interface 522 transmits p-polarized IR light 574 toward eye 190 to illuminate eye 190.

FIG. 16 illustrates one exemplary method 1600 for directing the polarized visible display light toward eye 190 in step 1420 to present a display image to the eye. Method 1600 is for example performed by any of display devices 400, 500, 600, 700, 800, and 900.

In a step 1610, method 1600 transmits, through the second polarizing beamsplitter interface, the polarized visible display light received from the first polarizing beamsplitter interface. In one example of step 1610, PBS interface 522 transmits p-polarized visible display light 586.

In a step 1620, method 1600 retro-reflects, focuses, and rotates the polarization of the polarized visible display light, transmitted by the second polarizing beamsplitter interface in step 1610, to produce orthogonally polarized visible display light. Step 1610 includes steps 1622, 1624, and 1626. In step 1622, method 1600 passes the polarized visible display light through a visible-band quarterwave plate. In one example of step 1622, p-polarized visible display light 586 passes through visible-band quarterwave plate 546 to form circularly polarized visible display light. In step 1624, method 1600 retro-reflects the circularly polarized visible display light on a visible-band mirror. In one example of step 1624, the circularly polarized visible display light, generated by passing p-polarized visible display light 586 through visible-band quarterwave plate 546, is retro-reflected by curved reflector 548. In step 1626, method 1600 passes the circularly polarized IR light, retro-reflected in step 1624, through the visible-band quarterwave plate again to form orthogonally polarized visible display light. In one example of step 1626, the circularly polarized visible display light, retro-reflected by curved reflector 548, passes through visible-band quarterwave plate 546 to form s-polarized visible display light 588 propagating toward PBS interface 522.

In a step 1630, method 1600 reflects the orthogonally polarized visible display light, produced in step 1620, on the second polarizing beamsplitter interface toward the eye to present a display image to the eye. In one example of step 1630, PBS interface 522 reflects s-polarized visible display light 588 toward eye 190 to present a display image (for example an image of LCOS display 516) to eye 190.

Figure 17:
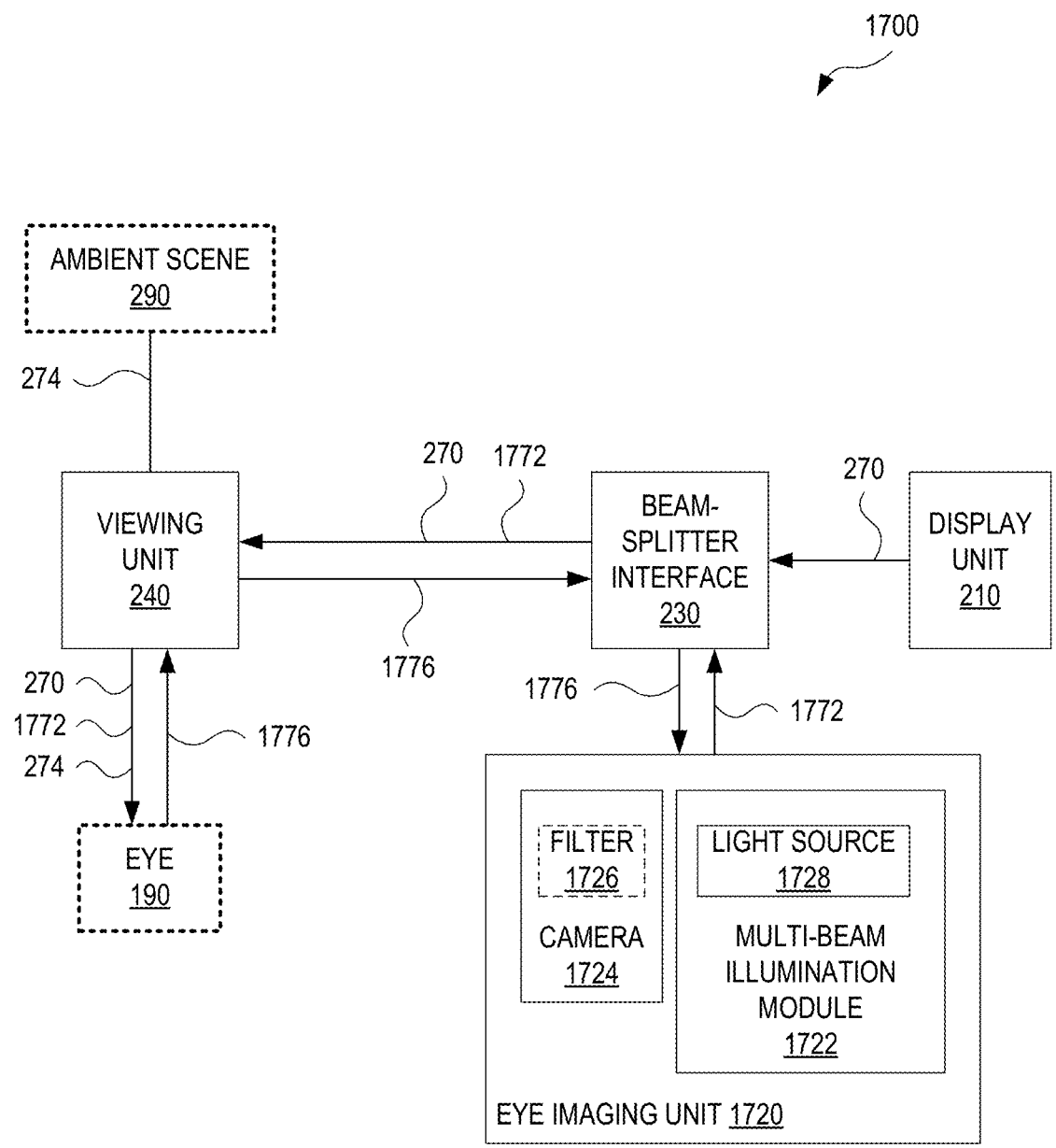
FIG. 17 illustrates a near-eye display device with coaxial eye tracking, according to an embodiment.

FIG. 17 illustrates one exemplary near-eye display device 1700 with coaxial eye tracking. Display device 1700 is an embodiment of display device 100, specifically adapted for tracking of eye 190. Display device 1700 illuminates eye 190 with at least three IR beams to generate at least three respective glints on eye 190. Display device 190 images eye 190, including the pupil of eye 190 and the glints. The location of the pupil with respect to the glints indicates the gaze direction of eye 190.

Display device 1700 includes display unit 210, beamsplitter interface 230, viewing unit 240, and an eye imaging unit 1720. Display unit 210, beamsplitter interface 230, and viewing unit 240 are configured as discussed above in reference to FIG. 2. Eye imaging unit 1720 is an embodiment of eye imaging unit 220. Eye imaging unit 1720 includes a camera 1724 and a multi-beam illumination module 1722, which are embodiments of camera 224 and illumination module 222, respectively. Multi-beam illumination module 1722 includes an IR light source 1728 that generates IR light, for example near-IR light. In one embodiment, IR light source 1728 is a light emitting diode that emits light in a spectral band centered around 850 nanometers (nm). Based upon light generated by IR light source 1728, multi-beam illumination module 1722 emits at least three IR light beams 1772. For clarity of illustration, the at least three IR light beams 1772 are indicated in FIG. 17 by a single arrow. In one embodiment, IR light beams 1772 includes three IR light beams that propagate in three different and mutually non-coplanar directions, respectively. IR light beams 1772 cooperatively form an embodiment of IR light 272. Display device 1700 propagates IR light beams 1772 toward eye 190 in the same manner as discussed for IR light 272 in reference to FIG. 2.

Camera 1724 is sensitive to light in the spectral range associated with IR light beams 1772 such that camera 1724 is capable of imaging reflections (glints) of IR light beams off of eye 190. In addition, camera 1724 is sensitive to light in at least a portion of the visible range such that camera 1724 is capable of imaging the pupil of eye 190. In one embodiment, camera 1724 is sensitive to a contiguous spectral range that includes at least a portion of the near-IR range and at least a portion of the red visible range. Camera 224 may include a spectral filter 1726 that selects a desired spectral wavelength range for imaging by camera 224. The reflections of IR light beams off of eye 190, together with some visible light reflected by eye 190, propagates from eye 190 to camera 1724 as reflected light 1776. Reflected light 1776 is an embodiment of reflected light 276. Based upon reflected light 1776, camera 224 forms one or more images of the pupil of eye 190 and the reflections of IR light beams 1772 off of eye 190.

Figure 18A:
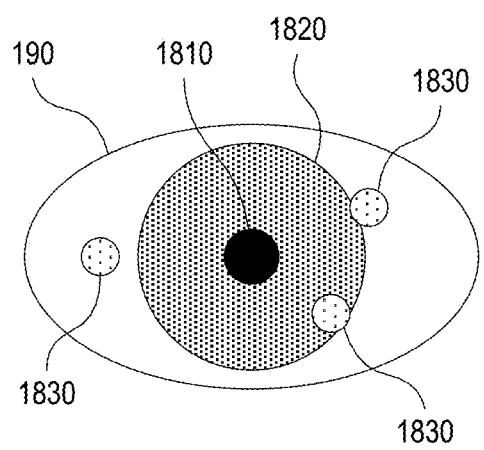
FIGS. 18A-D illustrate eye tracking based upon the location of the pupil relative to reflections of IR light beams off of the eye, according to an embodiment.
Figure 18B:
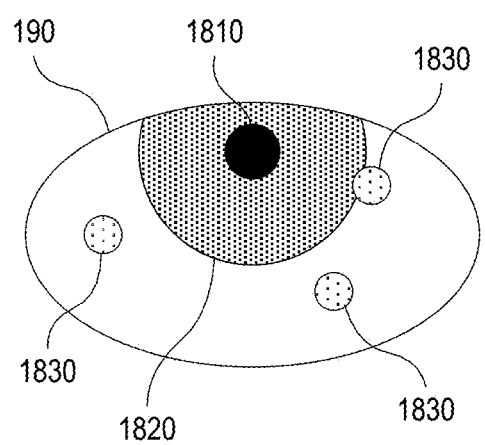
Figure 18C:
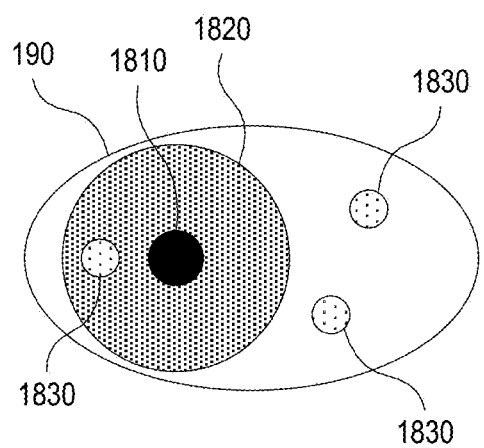
Figure 18D:
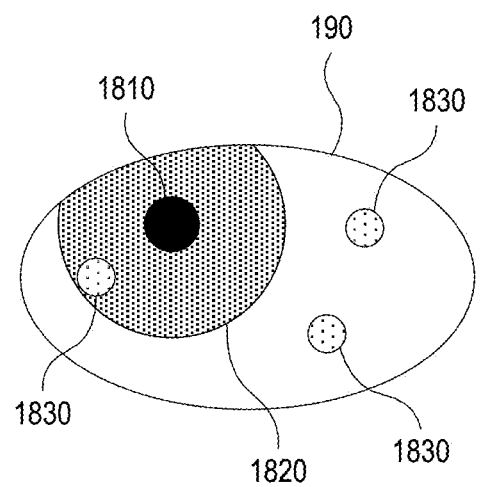

FIGS. 18A-D illustrate tracking of eye 190 based upon the location of pupil 1810 of eye 190 relative to reflections 1830 (glints) of IR light beams 1772 off of eye 190. FIGS. 18A-D schematically illustrate scenes viewed by camera 1724 of display device 1700 during use. FIG. 18A shows eye 190 when the gaze direction of eye 190 is straight ahead. FIGS. 18B, 18C, and 18D, show eye 190 from the same vantage point as used in FIG. 18A when the gaze direction of eye 190 is upwards, to the right, and upwards and to the right, respectively. FIGS. 18A-D are best viewed together.

FIGS. 18A-D show scenarios wherein three IR light beams 1772 are incident on eye 190. These three IR light beams 1772 are mutually non-coplanar such that reflections 1830 form a triangle on eye 190. When the gaze direction of eye 190 is straight ahead, IR light beams 1772 are incident on both the cornea (located over iris 1820 of eye 190) and the sclera (the white of the eye further away from pupil 1810 than iris 1820). Without departing from the scope hereof, display device 1700 may direct more than three IR light beams 1772 to eye 190. Also without departing from the scope hereof, the locations of incidence of IR light beams 1772 on eye 190 may be different from those shown in FIGS. 18A-D.

In normal use, the movement of display device 1700 relative to eye 190 is minimal. The propagation directions of IR light beams 1772 is constant in time. Accordingly, substantially all movement of pupil 1810 relative to reflections 1830 is related to a change in gaze direction of eye 190. Camera 1724 generates one or more images of pupil 1810 and reflections 1830 to provide a measurement of the location of pupil 1810 relative to reflections 1830. These images indicate the gaze direction of eye 190 through the location of pupil 1810 relative to the locations of reflections 1830 in the images.

Even if there should be some minor movement of display device 1700 relative to eye 190, such movement has relatively little influence on the deduced gaze direction. For example, for an optical path distance of about 55 millimeters between camera 1724 and eye 190, a change in gaze direction by 20 degrees shifts the location of pupil 1810 by about 4 millimeters relative to the locations of reflections 1830 on eye 190. For comparison, a 4 millimeter translation of display device 1700 relative to eye 190 shifts the location of reflections 1830 by only about 0.7 millimeters. In turn, an 0.7 millimeter shift of pupil 1810 relative to reflections 1830 corresponds to a change in gaze direction by about 3.3 degrees. Thus, in a worst case scenario, a 4 millimeter shift of display device 1700 relative to eye 190, which is in the upper range of what would be expected during normal use of display device 1700, could potentially be misinterpreted as a change in gaze direction of eye 190 by about 3.3 degrees, which is a relatively small change in gaze direction. It follows that the gaze direction information provided by display device 1700 is relatively insensitive to movement of display device 1700 relative to eye 190.

The use of at least three IR light beams 1772 improves the reliability of eye tracking provided by display device 1700, and also allows for certain image processing methods to determine the gaze direction of eye 190. Such methods are discussed below in reference to FIGS. 31 and 32.

Figure 19:
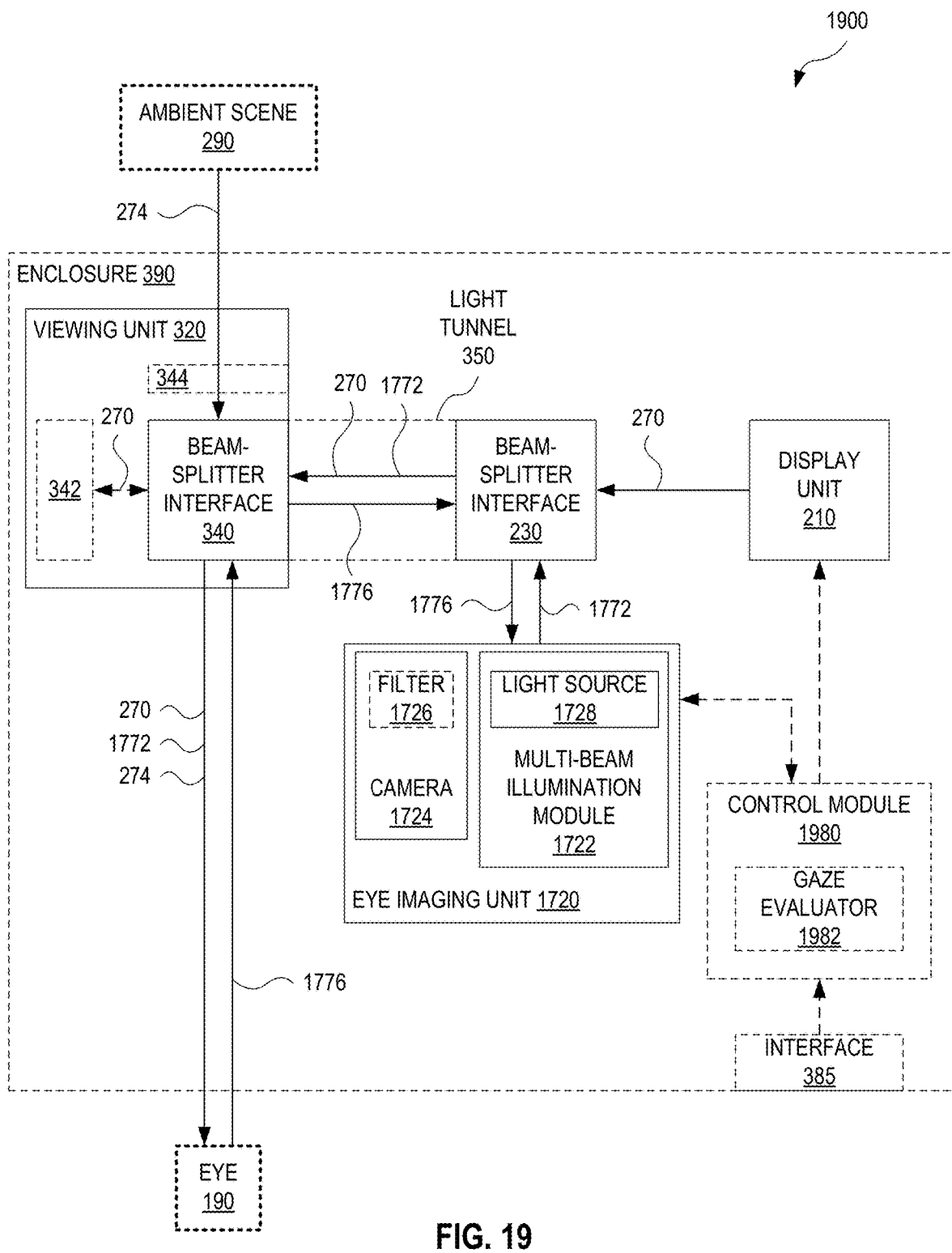
FIG. 19 illustrates another exemplary near-eye display device with coaxial eye tracking, according to an embodiment.

FIG. 19 illustrates one exemplary near-eye display device 1900 with coaxial eye tracking. Display device 1900 is an embodiment of each of display device 1700 and display device 300. Display device 1900 implements viewing unit 240 as viewing unit 320. Although for clarity not shown in FIG. 19, display device 1900 may implement display unit 210 as shown in FIG. 3. In certain embodiments, display device 1900 includes a control module 1980 that is an embodiment of control module 380. Display device 1900 may further include interface 385 and/or enclosure 390.

Control module 1980 includes a gaze evaluator 1982 that processes one or more images captured by camera 1724 to determine the gaze direction of eye 190. Herein, a gaze direction determination refers to providing a measure of gaze direction. This measure may include one or more of a quantitative determination of the absolute gaze direction of eye 190 (for example, 27 degrees up and 17 degrees to the right), a qualitative determination of the gaze direction of eye 190 (for example, up and to the right), an indication that the gaze direction of eye 190 has changed, or an indication that the gaze direction of eye 190 has changed in a certain direction (for example, the gaze direction shifted upwards).

In an embodiment, control module 1980 is configured to provide at least partly control of the image displayed by display unit 210 based upon the gaze direction determined by gaze evaluator 1982. Control module 1980 may be further configured to at least partly control operation of light source 1728 and camera 1724 to generate images indicative of the gaze direction of eye 190 at a desired rate and/or time. In one implementation, a user may, via interface 395, activate or adjust operation of eye tracking by eye imaging unit 1720 and gaze evaluator 1982.

Display device 1900 may implement the same optical configuration as any one of display devices 400, 500, 600, 700, 800, 900, and 1000, with illumination module 222 and camera 224 implemented as illumination module 1722 and camera 1724, respectively.

Figure 20:
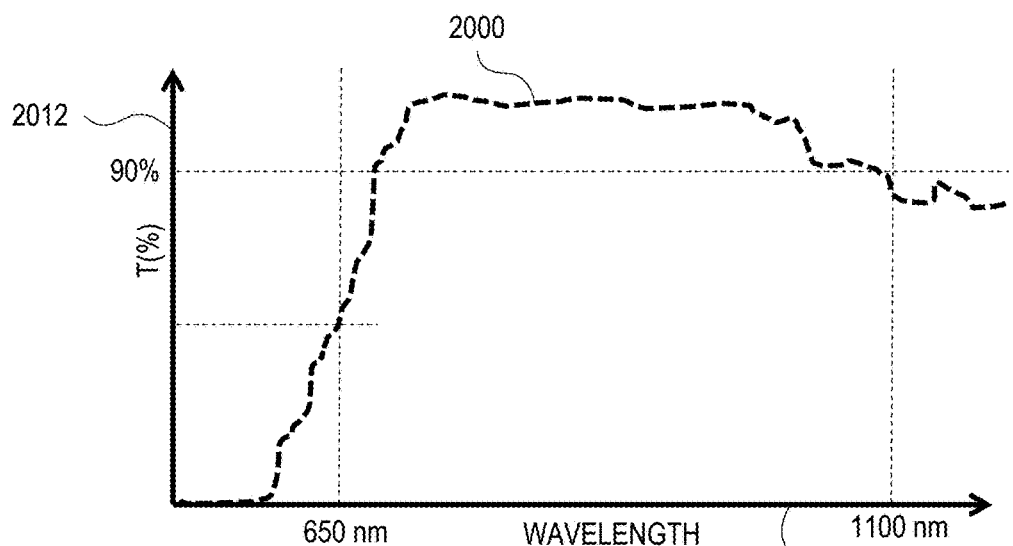
FIG. 20 shows the transmission curve for one exemplary spectral filter for a camera of a near-eye display device with coaxial eye tracking, according to an embodiment.

FIG. 20 shows the transmission curve 2000 for one exemplary implementation of spectral filter 1726. Transmission curve 2000 is plotted as transmission 2012 in percent as a function of wavelength 2010. Within the near-IR spectral range from about 700 nm up to about 1100 nm, transmission 2012 is at least 90%. In the direction from the near-IR spectral range into the visible spectral range, transmission 2012 drops to substantially zero, with transmission 2012 crossing 50% at about 650 nm. In certain embodiments, the sensor of camera 1724 of display device 1700 is a silicon based sensor sensitive to light in the visible spectral range and in the near-IR spectral range up to about 1100 nm. In one such embodiment, camera 1724 includes spectral filter 1726 characterized by transmission curve 2000, and camera 1724 is capable of imaging reflected light 1776 in (a) the near-IR spectral range up to about 1100 nm to image reflections 1830 and (b) the red portion of the visible spectrum to image pupil 1810.

Figure 21:
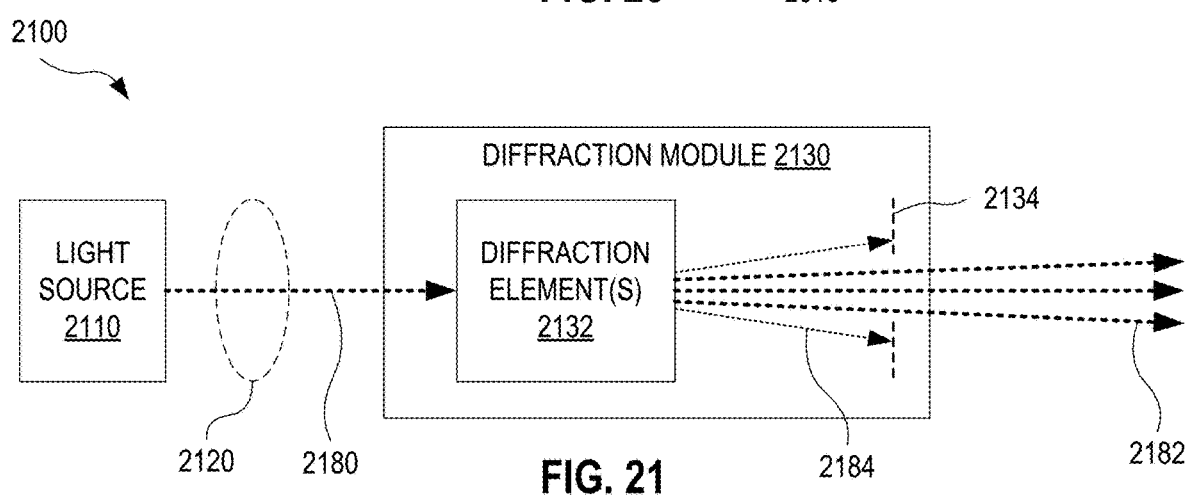
FIG. 21 illustrates a multi-beam illumination module that uses diffraction of a single IR light beam to generate at least three IR light beams propagating in different directions, according to an embodiment.

FIG. 21 illustrates one exemplary multi-beam illumination module 2100 that uses diffraction of a single IR light beam 2180 to generate at least three IR light beams 2182 propagating in different directions. Illumination module 2100 is an embodiment of illumination module 1722. IR light beams 2182 are embodiments of IR light beams 1772. In certain embodiments, at least three of IR light beams 2182 have mutually non-coplanar propagation directions.

Illumination module 2100 includes an IR light source 2110 and a diffraction module 2130. Light source 2110 is an embodiment of light source 1728 and generates IR light beam 2180. Light source 2110 is a light emitting diode, for example. Diffraction module 2130 includes one or more diffraction elements 2132 that diffract IR light beam 2180 to produce at least three IR light beams 2182 as diffraction orders of IR light beam 2180. In one implementation, diffraction element(s) 2132 is a single diffraction element, for example a holographic diffraction element or a one-dimensional diffraction grating such as a ruled grating. Herein, a one-dimensional diffraction grating refers to a diffraction grating that causes diffraction along one dimension. In another implementation, diffraction elements 2132 include a plurality of diffraction elements coupled in series.

Optionally, illumination module 2100 includes a lens 2120 that collects at least a portion of the light generated by light source 2110 to form IR light beam 2180. In one such example, light source 2110 is a light emitting diode with an integrated lens.

In one embodiment, diffraction module 2130 includes an aperture 2134 that allows passage of IR light beams 2182 but blocks other IR light beams 2184 generated from IR light beam 2180 by diffraction elements 2132. Alternatively, or in combination therewith, aperture 2134 serves to block stray light, for example stray light generated by light source 2110, optional lens 2120, and/or diffraction elements 2132.

Figure 22:
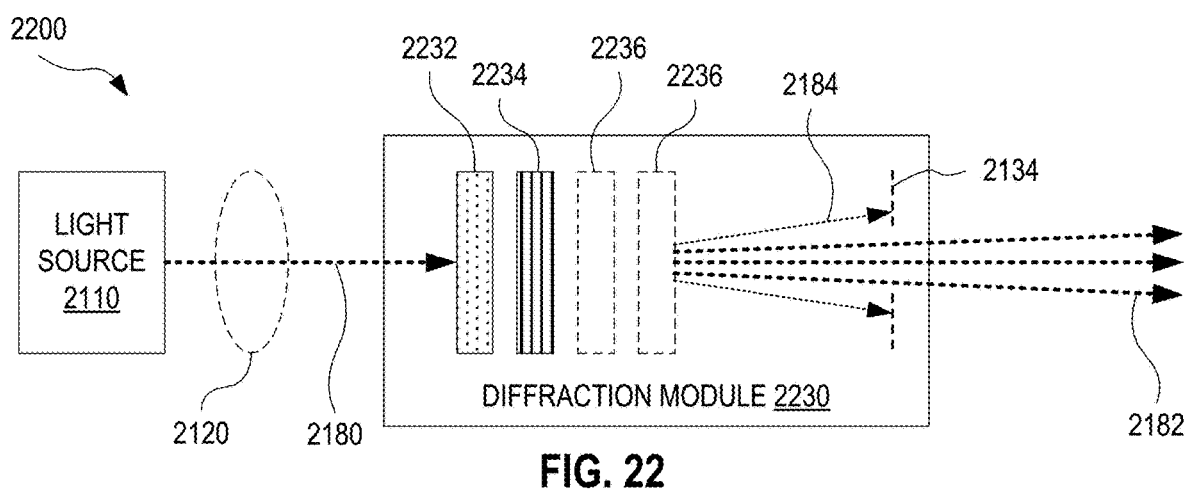
FIG. 22 illustrates a multi-beam illumination module that uses serially coupled diffraction elements to generate IR light beams, according to an embodiment.

FIG. 22 illustrates another exemplary multi-beam illumination module 2200 that uses serially coupled diffraction elements to generate IR light beams 2182. Illumination module 2200 is an embodiment of illumination module 2100, which implements diffraction module 2130 as a diffraction module 2230. Diffraction module 2230 includes a plurality of one-dimensional diffraction gratings coupled in series and each configured to operate in transmission mode. Specifically, diffraction module 2230 includes a first one-dimensional diffraction grating 2232 followed by a second one-dimensional diffraction grating 2234 optionally followed by one or more additional one-dimensional diffraction grating 2236. Each of diffraction gratings 2232, 2232, and 2234 may be a ruled grating.

Although FIG. 22 shows diffraction gratings 2232, 2232, and 2234 as being spaced apart, two or more of diffraction gratings 2232, 2232, and 2234 may be in direct contact with each other, without departing from the scope hereof.

Figure 23A:
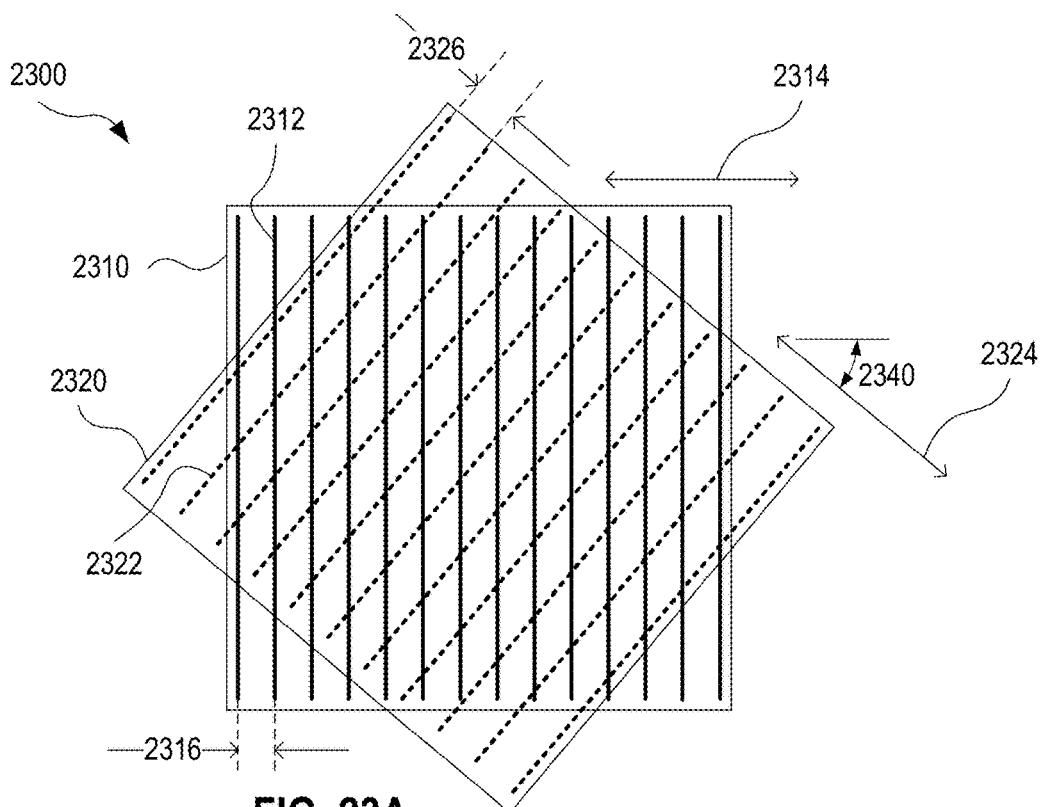
FIGS. 23A and 23B illustrate two exemplary diffraction grating stacks.
Figure 23B:
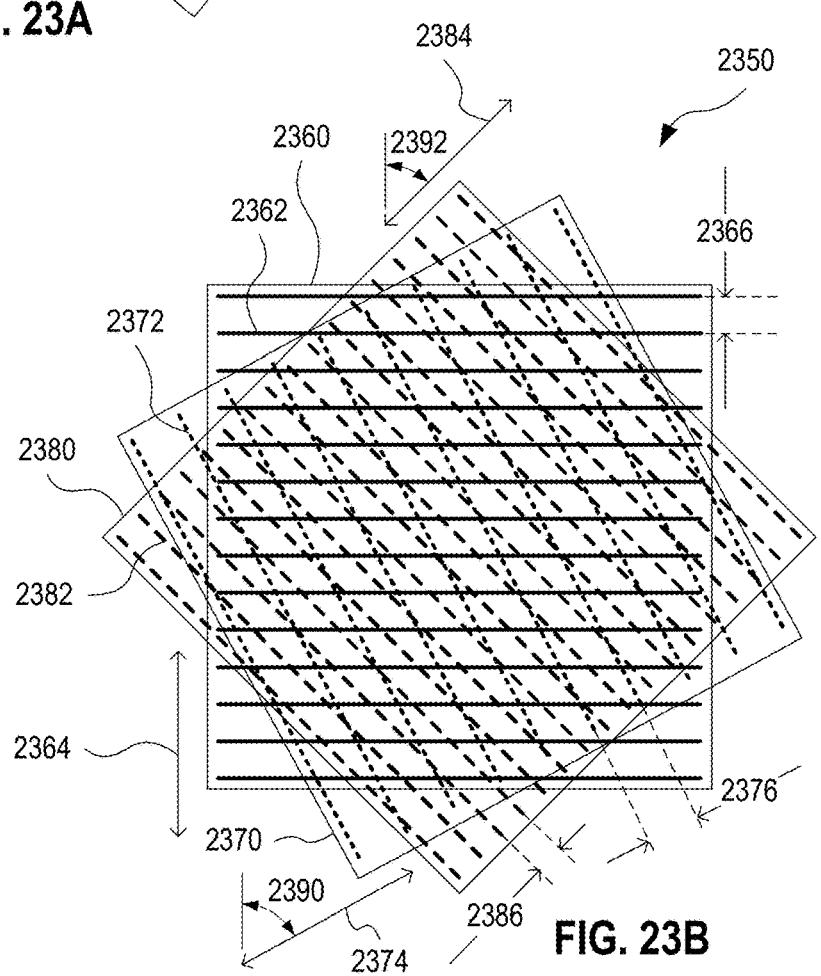

FIGS. 23A and 23B illustrate two exemplary diffraction grating stacks 2300 and 2350, respectively. Each of diffraction grating stacks 2300 and 2350 is an embodiment of the diffraction gratings of diffraction module 2230. The view in each of FIGS. 23A and 23B is along a viewing direction substantially parallel to the general propagation direction of IR light beam 2180. Each of diffraction grating stacks 2300 and 2350 is configured to diffract IR light beam 2180 to produce at least three IR light beams 2182 having mutually non-coplanar propagation directions.

Diffraction grating stack 2300 includes two one-dimensional diffraction gratings 2310 and 2320. Diffraction gratings 2310 and 2320 are embodiments of diffraction gratings 2232 and 2234, respectively. Each of diffraction gratings 2310 and 2320 is positioned substantially orthogonal to the general propagation direction of IR light beam 2180. Diffraction grating 2310 includes lines 2312 that cause diffraction along a direction 2314. Diffraction grating 2320 includes lines 2322 that cause diffraction along a direction 2324. Lines 2322 are at an angle to lines 2312 such that direction 2324 is at an angle 2340 to direction 2314.

In operation, IR light beam 2180 is diffracted by diffraction grating 2310 to produce a plurality of diffraction orders propagating in the plane spanned by direction 2314 and the initial propagation direction of IR light beam 2180. For example, diffraction grating 2310 may produce diffraction orders −1 (diffracted to the left in FIG. 23), 0 (fundamental diffraction order, no change of propagation direction), and +1 (diffracted to the right in FIG. 23). The diffraction orders generated by diffraction grating 2310 propagate to diffraction grating 2320 and are diffracted thereby to each produce a second set of diffraction orders. Since direction 2324 is at an angle 2340 to direction 2314, not all diffraction orders produced by diffraction grating 2320 are coplanar. Any non-fundamental diffraction order generated by diffraction grating is out of the plane spanned by the diffraction orders generated by diffraction grating 2310.

In one example, aperture 2134 of diffraction module 2230 selects, as IR light beams 2182, diffraction orders (−1,0), (0,−1), and (+1,+1) to produce a pattern similar to that shown by reflections 1830 in FIGS. 20A-D. Herein, a diffraction order (n,m) indicates that the m'th diffraction order produced by diffraction grating 2320 from the n'th diffraction order produced by diffraction grating 2310. However, there any many other possible combinations of diffraction orders generated by diffraction grating stack 2300, which produce three IR light beams 2182 having mutually non-coplanar propagation directions.

Lines 2312 of diffraction grating 2310 are characterized by a line spacing 2316, and lines 2322 of diffraction grating 2320 are characterized by a line spacing 2326. Line spacings 2316 and 2326 may be selected to produce certain propagation directions of IR light beams 2182.

Diffraction grating stack 2350 includes three one-dimensional diffraction gratings 2360, 2370, and 2380. Diffraction gratings 2360, 2370, and 2380 are embodiments of diffraction gratings 2232, 2234, and 2236 respectively. Each of diffraction gratings 2360, 2370, and 2380 is positioned substantially orthogonal to the general propagation direction of IR light beam 2180. Diffraction grating 2360 includes lines 2362 that cause diffraction along a direction 2364. Diffraction grating 2370 includes lines 2372 that cause diffraction along a direction 2374. Diffraction grating 2380 includes lines 2382 that cause diffraction along a direction 2384. Lines 2372 are at an angle to lines 2362 such that direction 2374 is at an angle 2390 to direction 2364. Lines 2382 are at an angle to lines 2362 such that direction 2384 is at an angle 2392 to direction 2364.

In operation, IR light beam 2180 is diffracted by diffraction grating 2360 to produce a plurality of diffraction orders propagating in the plane spanned by direction 2364 and the initial propagation direction of IR light beam 2180. The diffraction orders generated by diffraction grating 2360 propagate to diffraction grating 2370 and are diffracted thereby to each produce a second set of diffraction orders. Next, the diffraction orders outputted by diffraction grating 2370 propagate to diffraction grating 2380 and are diffracted thereby to each produce a third set of diffraction orders. Since directions 2374 and 2384 are at angles 2490 and 2492, respectively, to direction 2364, it is possible to select at least three non-coplanar IR light beams 2182 from the diffraction orders outputted by diffraction grating 2380.

Lines 2362 of diffraction grating 2360 are characterized by a line spacing 2366, lines 2372 of diffraction grating 2370 are characterized by a line spacing 2376, and lines 2382 of diffraction grating 2380 are characterized by a line spacing 2386. Line spacings 2366, 2376, and 2386 may be selected to produce certain propagation directions of IR light beams 2182.

Figure 24A:
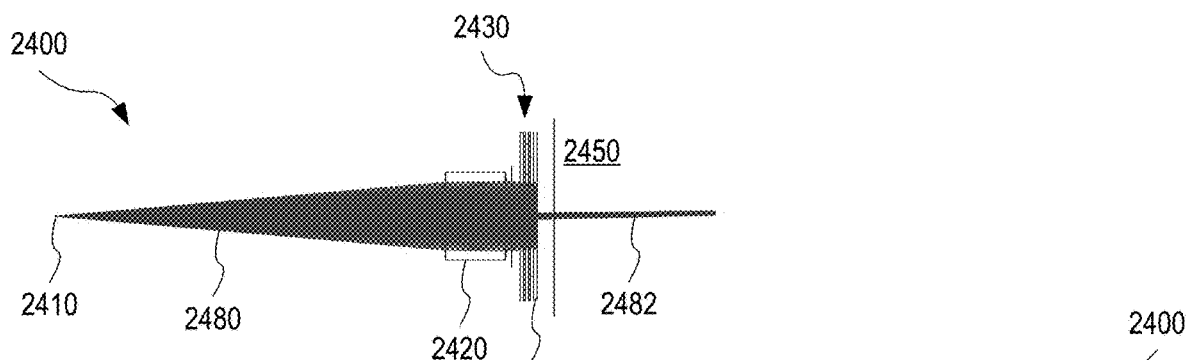
FIGS. 24A-C illustrate an illumination module which uses a diffraction grating stack of three one-dimensional diffraction gratings to generate three IR light beams having mutually non-coplanar propagation directions, according to an embodiment.
Figure 24B:
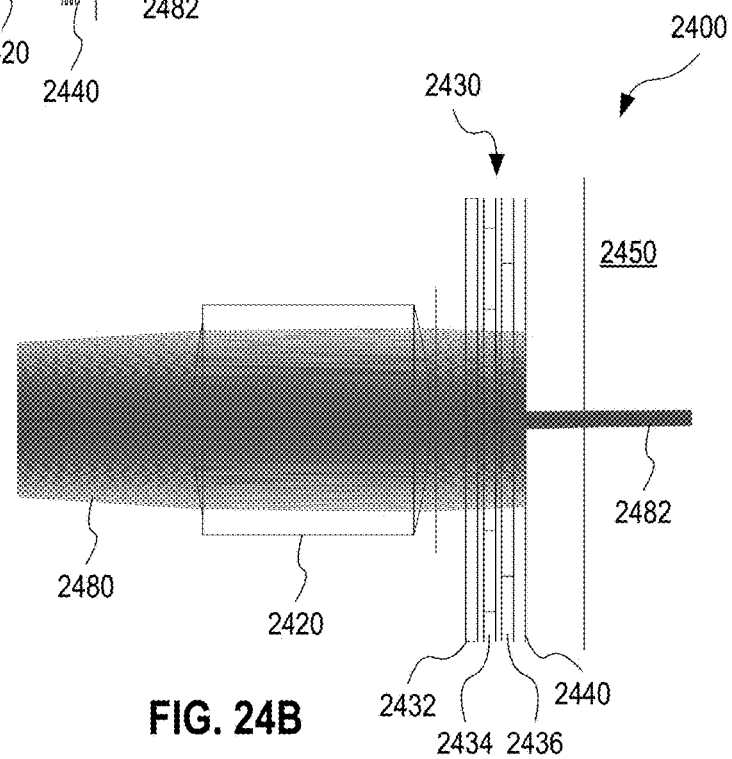
Figure 24C:
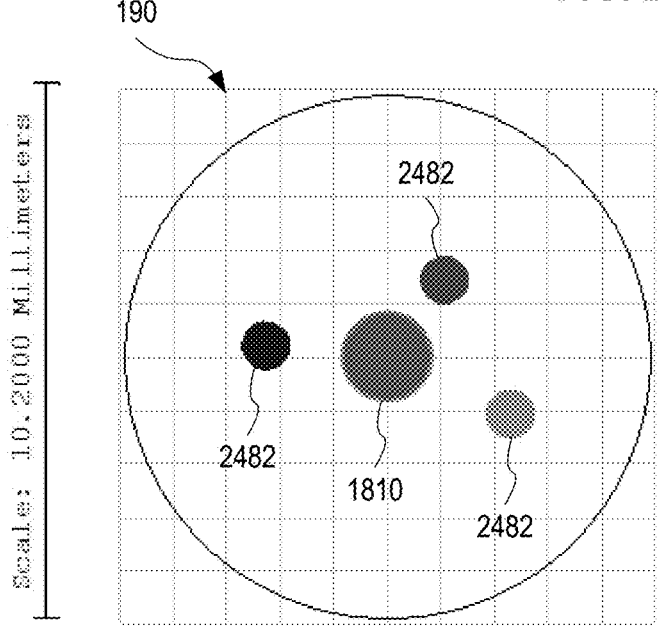

FIGS. 24A-C illustrate one exemplary illumination module 2400 which uses a diffraction grating stack 2430 of three one-dimensional diffraction gratings to generate three IR light beams 2482 having mutually non-coplanar propagation directions. Illumination module 2400 is an embodiment of illumination module 2200, which implements an embodiment of diffraction grating stack 2350. FIG. 24A shows illumination module 2400 and ray tracing of light propagating through illumination module 2400 to a solid light propagation medium 2450. Solid light propagation medium 2450 is one of (a) beamsplitter cube 510 plus light tunnel 350 plus beamsplitter cube 520, (b) light tunnel 750 plus beamsplitter cube 520, and (c) beamsplitter cube 1010 plus light tunnel 350 plus beamsplitter cube 1020. FIG. 24B shows a close-up of a portion of illumination module 2400. FIG. 24C is the result of a ray tracing calculation for one example of illumination module 2400 and shows the positions of IR light beams 2482 as incident on the plane of pupil 1810. FIGS. 24A-C are best viewed together.

Illumination module 2400 includes a light emitting diode 2410 that generates IR light beam 2480, for example centered at about 850 nm. Light emitting diode 2410 is an embodiment of light source 2110, and IR light beam 2480 is an embodiment of IR light beam 2180. Illumination module 2400 also includes a collimation lens 2420 that is an embodiment of lens 2120. Collimation lens 2420 collimates at least some of IR light beam 2480 and delivers this collimated IR light to diffraction grating stack 2430.

Diffraction grating stack 2430 includes three one-dimensional diffraction gratings 2432, 2434, and 2436, configured as shown for diffraction gratings 2360, 2370, and 2380 in FIG. 23B. Thus, each of diffraction grating 2432, 2434, and 2436 diffracts IR light along a direction that is non-parallel to the direction of diffraction by each of the other two diffraction gratings.

Illumination module 2400 further includes an aperture 2440 that selects IR light beams 2482 as three diffraction orders produced by diffraction grating stack 2430. IR light beams 2482 propagate along mutually non-coplanar propagation directions and therefore form a triangle on the plane of pupil 1810.

In one example of example of illumination module 2400 light source 2410 is a light emitting diode with a divergence angle (half angle) of 9 degrees, and the distance from light source 2410 to lens 2420 is 1.28 millimeters (mm). In this example, lens 2420 is made from a cyclic olefin polymer Zeonex® 480R (Zeon Chemicals), has thickness 0.4 mm, and has a first lens surface closer to light source 2410 and a second lens surface further from light source 2410. The first surface has radius of curvature 1.119 mm, diameter 0.52 mm, clear aperture 0.44 mm, and conic constant −35.525146. The second surface has radius of curvature −1.161 mm, diameter 0.52 mm, clear aperture 0.52 mm, and conic constant −6.198023. In this example, the distance from the second surface of lens 2420 to diffraction grating stack 2430 is 0.06 mm, and the diffractive gratings of diffraction grating stack 2430 has the following properties: diffraction grating 2432 has a grating period of 0.05 lines/µm, diffraction grating 2434 has a grating period of 0.03 lines/µm, diffraction grating 2436 has a grating period of 0.08 lines/µm, each of diffraction gratings 2432, 2434, and 2436 has thickness 0.02 mm and clear aperture 1.0 mm, angle 2390 is 60 degrees, and angle 2392 is 45 degrees. Aperture 2440 has a opening with a diameter of 0.04 mm in this example. FIG. 24C shows the results of ray tracing for this example of illumination module 2400, further assuming that the distance from diffraction grating stack 2430 to solid light propagation medium 2450 is 0.2 mm, the propagation distance within solid light propagation medium 2450 is 33.5 mm, the distance from solid light propagation medium 2450 to eye 190 is 20 mm, solid light propagation medium is BK7 glass, and solid light propagation medium has a square cross section with 8 mm side length.

Figure 25:
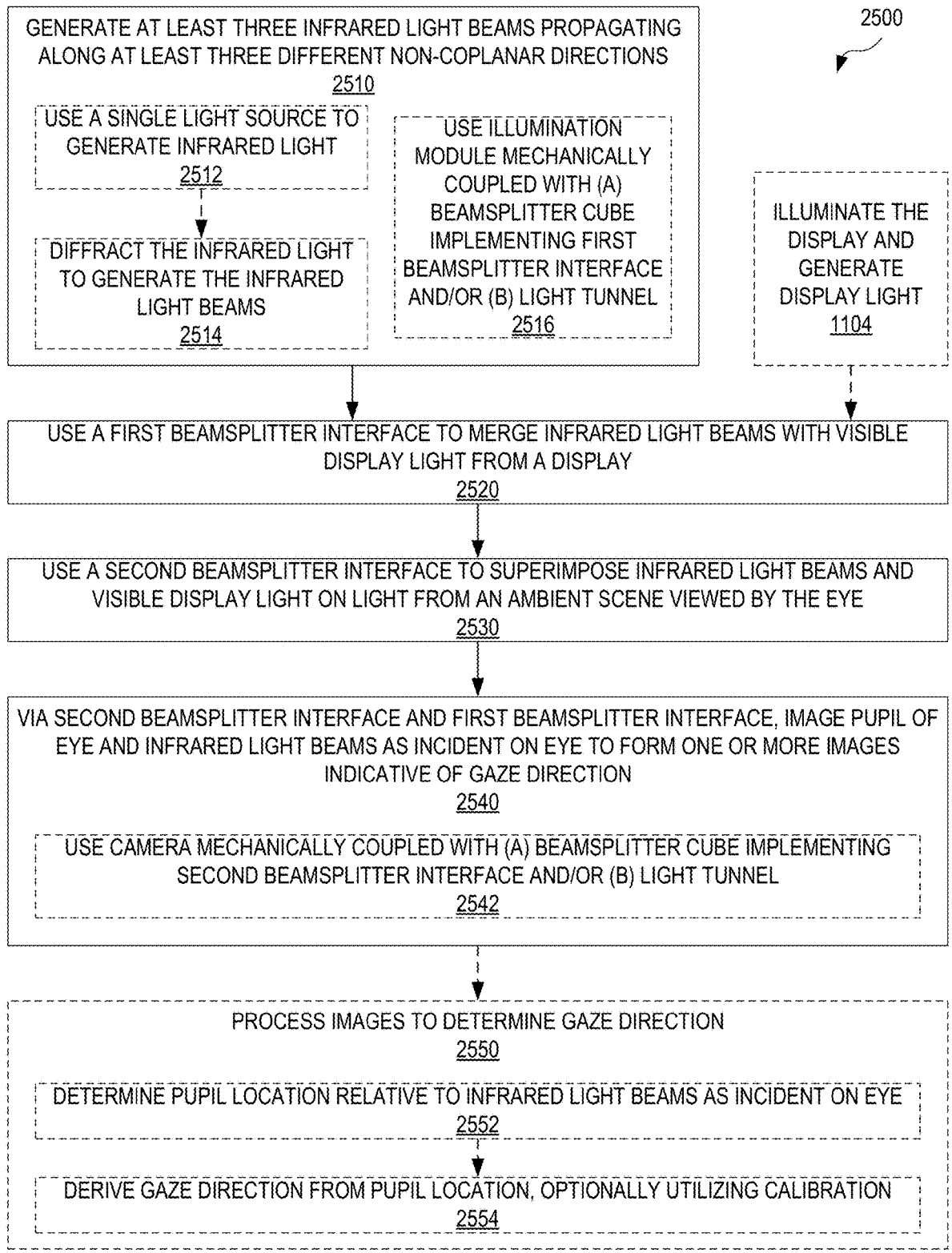
FIG. 25 illustrates a method for coaxial eye tracking in a near-eye display device, according to an embodiment.

FIG. 25 illustrates one exemplary method 2500 for coaxial eye tracking in a near-eye display device. Method 2500 is an embodiment of method 1100 specifically adapted for tracking of eye 190 for the purpose of determining the gaze direction of eye 190. Method 2500 is performed by display device 1700 or display device 1900, for example.

In a step 2510, method 2500 generates at least three IR light beams that propagate along at least three different, non-coplanar directions, respectively. Step 2510 is an embodiment of step 1102. In one example of step 2510, illumination module 1722 generates at least three IR light beams 1772 that propagate along at least three different, non-coplanar directions, respectively. In an embodiment, step 2510 includes steps 2512 and 2514. Step 1512 uses a single light source to generate IR light, and step 2514 diffracts the IR light of step 2512 to generate the IR light beams. In one example of steps 2512 and 2514, IR light source 2110 generates IR light beam 2180, and diffraction module 2130 diffracts IR light beam 2180 to produce at least three IR light beams 2182.

In a step 2520, method 2500 uses a first beamsplitter interface to merge the IR light beams of step 2510 with visible display light from a display. Step 2520 is an embodiment of step 1110. In one example of step 2520, beamsplitter interface 230 merges IR light beams 1772 with visible display light 270.

In a step 2530, method 2500 uses a second beamsplitter interface to superimpose the IR light beams and visible display light, merged in step 2520, on ambient light from ambient scene 290 viewed by eye 190. Step 2530 is an embodiment of step 1120. In one example of step 2530, beamsplitter interface 340 superimposes IR light beams 1772 and visible display light 270 on ambient light 274.

In a step 2540, method 2500 images (a) pupil 1810 of eye 190 and (b) reflections off of eye 190 of the IR light beams, generated in step 2510. Step 2540 thus forms one or more images of eye 190, which are indicative of the gaze direction of eye 190, for example as discussed in reference to FIGS. 18A-D. Step 2540 is an embodiment of step 1130. In one example of step 2540, camera 1724 forms one or more images of pupil 1810 and reflections 1830 based upon reflected light 1776.

In an embodiment, step 2510 implements a step 2516, and step 2540 implements a step 2542. Step 2516 uses an illumination module that is mechanically coupled with (a) a beamsplitter cube implementing the first beamsplitter interface of step 2520 and/or (b) a light tunnel connecting the first beamsplitter of step 2520 with the second beamsplitter of step 2530. Likewise, step 2542 uses a camera that is mechanically coupled with (a) a beamsplitter cube implementing the first beamsplitter interface of step 2520 and/or (b) a light tunnel connecting the first beamsplitter of step 2520 with the second beamsplitter of step 2530. This embodiment of method 2500 is performed by an embodiment of display device 1700, wherein eye imaging unit 1720 is mechanically coupled with (a) a beamsplitter cube implementing the first beamsplitter interface of step 2520 and/or (b) a light tunnel connecting the first beamsplitter of step 2520 with the second beamsplitter of step 2530, for example as shown in FIGS. 6, 8, and 9.

In certain embodiments, method 2500 further includes a step 2550 of processing the image(s) captured in step 2540 to determine the gaze direction of eye 190. Step 2550 is performed by gaze evaluator 1982, for example. In one such embodiment, step 2550 includes steps 2552 and 2554. Step 2552 determines the location of pupil 1810 relative to reflections 1830 in the image(s) captured in step 2540. Step 2554 derives the gaze direction of eye 190 from the relative location of pupil 1810 determined in step 1552. Optionally, step 2554 utilizes calibration information where the relative location of pupil 1810 (relative to reflections 1830) is calibrated for one particular gaze direction, such as the straight-ahead gaze direction of FIG. 18A. Step 2554 may the derive the gaze direction of eye 190 by comparing the relative location of pupil 1810, determined in step 2552, to the relative location of pupil 1810 when eye 190 is in the calibration-associated gaze direction.

Method 2500 may further include step 1104.

Without departing from the scope hereof, method 2500 may perform steps 2510, 2520, and 2540 repeatedly and average at least some of the resulting images to improve the image quality prior to proceeding to optional step 2550.

FIG. 26 illustrates one exemplary method 2600 for using a near-eye display device to coaxially image eye 190, to form one or more images indicative of the gaze direction of eye 190. Method 2600 is an embodiment of step 2540 and may be performed by display device 1700 or display device 1900.

In a step 2610, a camera images pupil 1810 and reflections of the IR light beams of step 2610, incident on eye 190, to form one or more images indicative of the gaze direction of eye 190. The camera images eye 190 via the second beamsplitter interface of step 2530 and the first beamsplitter interface of step 2520. Step 2610 includes steps 2612, 2614, and 2618. Optionally, step 2610 further includes a step 2616.

Step 2612 uses the second beamsplitter interface to separate, from ambient light 274, (a) a portion of each IR light beam reflected by eye 190 and (b) a portion of visible light reflected by eye 190. In one example of step 2612, beamsplitter interface 340 separates reflected light 1776 from ambient light 274 and directs reflected light 1776 toward beamsplitter interface 230.

Step 2614 uses the first beamsplitter interface to separate, from display light emitted by a display of the near-eye display device, (a) the portion of each IR light beam reflected by eye 190 and (b) the portion of visible light reflected by eye 190, separated from the ambient light in step 2612. In one example of step 2614, beamsplitter interface 230 separates reflected light 1776 from visible display light 270 and directs reflected light 1776 toward camera 1724.

In optional step 2616, the light directed toward the camera in step 2614 is spectrally filtered to image the reflections of the IR light beams, incident on the eye, and only a red portion of the visible spectrum. Light in the red portion of the visible spectrum is used to form an image of pupil 1810. In one example of step 2616, camera 1724 includes an embodiment of spectral filter 1726 having the transmission properties plotted in FIG. 20. This embodiment of spectral filter 1726 filters reflected light 1776, and other light propagating toward camera 1724 if such other light is present, such that camera 1724 images light only in the red and near-IR spectral ranges. Step 2616 helps ensure that visible light reflected by eye 190 does not overwhelm the light signal associated with reflections 1830.

Step 2618 forms an image of pupil 1810 and an image of reflections of the IR light beams incident on eye 190. In one embodiment, step 2618 forms a single image that includes both an image of pupil 1810 and an image of reflections of the IR light beams incident on eye 190. In another embodiment, step 2618 forms one image of pupil 1810 (for example when no IR light beams are incident on eye 190) and forms another image that includes an image of reflections of the IR light beams incident on eye 190. In one example of step 2618, camera 1724 captures an image of reflected light 1776 to form an image of pupil 1810 and an image of reflections 1830. Camera 1724 may form a single image of eye 190, which shows both pupil 1810 and reflections 1830. Alternatively, camera 1724 may capture one image of eye 190 when IR light source 1728 is off to provide an image of pupil 1810, and capture another image of eye 190 when IR light source 1728 is on to provide an image of reflections 1830 optionally also showing pupil 1810.

In an embodiment, step 2610 implements step 2542 as discussed above in reference to FIG. 25.

Figure 27:
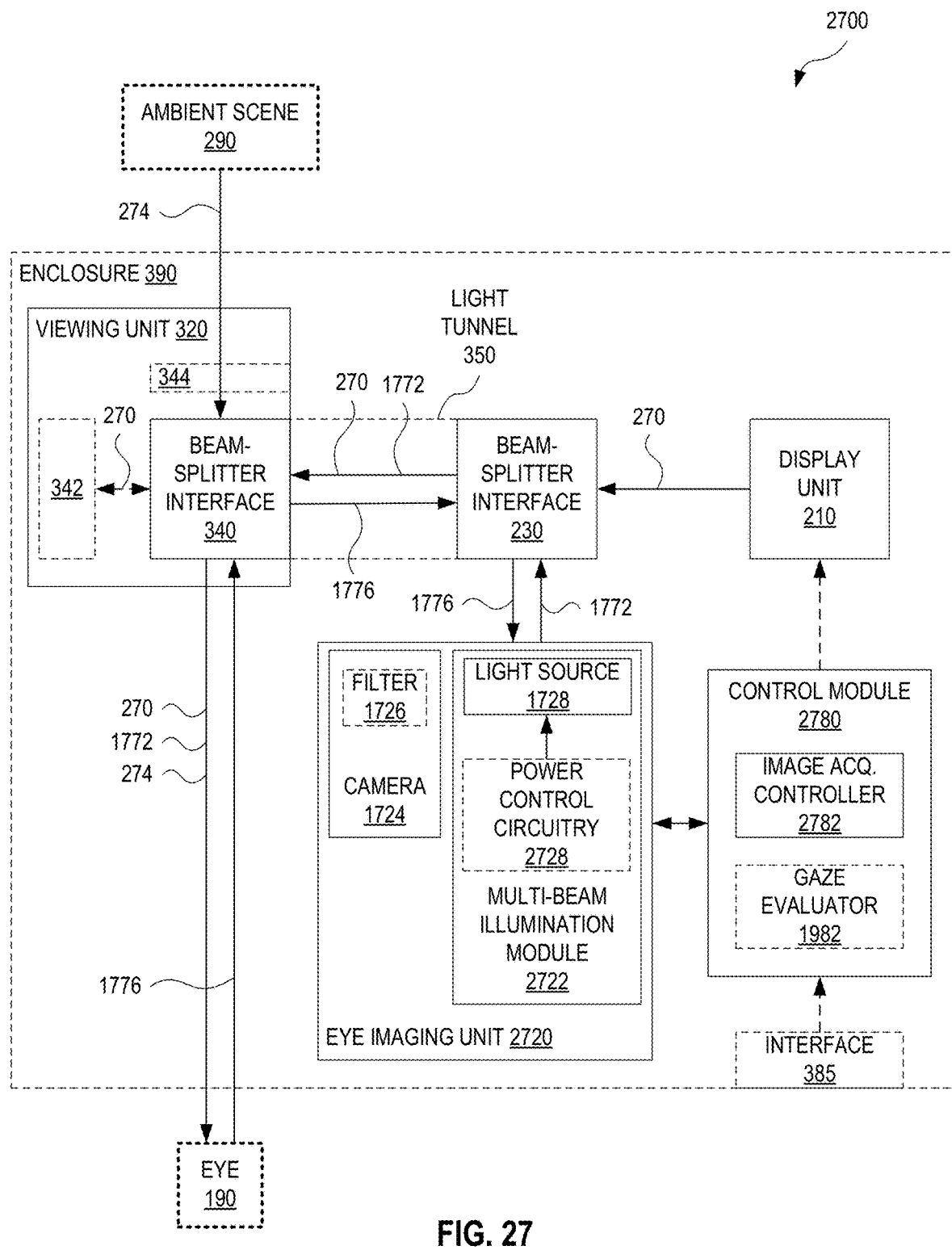
FIG. 27 illustrates yet another near-eye display device with coaxial eye tracking, according to an embodiment.

FIG. 27 illustrates one exemplary near-eye display device 2700 with coaxial eye tracking. Display device 2700 is an embodiment of display device 1900. Display device 2700 implements eye imaging unit 1720 as an eye imaging unit 2720. Display device 2700 includes a control module 2780 that is an embodiment of control module 2780.

Eye imaging unit 2720 includes camera 1724 and a multi-beam illumination module 2722. Illumination module 2722 is an embodiment of illumination module 1722 that may include power control circuitry 2728. Power control circuitry 2728 controls a power setting of light source 1728 such that light source 1728 may generate IR light at two different intensities, or at more than two different intensities. As a result, illumination module 2722 is capable of generating IR light beams 1772 at two or more different intensities.

The background level in images captured by camera 1724 may vary depending, for example, on the brightness of ambient scene 290. As discussed in further detail below, to ensure accurate location of reflections 1830 in these images, it may be advantageous to image reflections 1830 at two or more different intensities of IR light beams 1772.

Control module 2780 includes an image acquisition controller 2782 that controls generation of IR light beams 1772 by illumination module 2722 and image capture by camera 1724. Image acquisition controller 2782 may be communicatively coupled with power control circuitry 2728 to control the intensities of IR light beams 1772.

Figure 28:
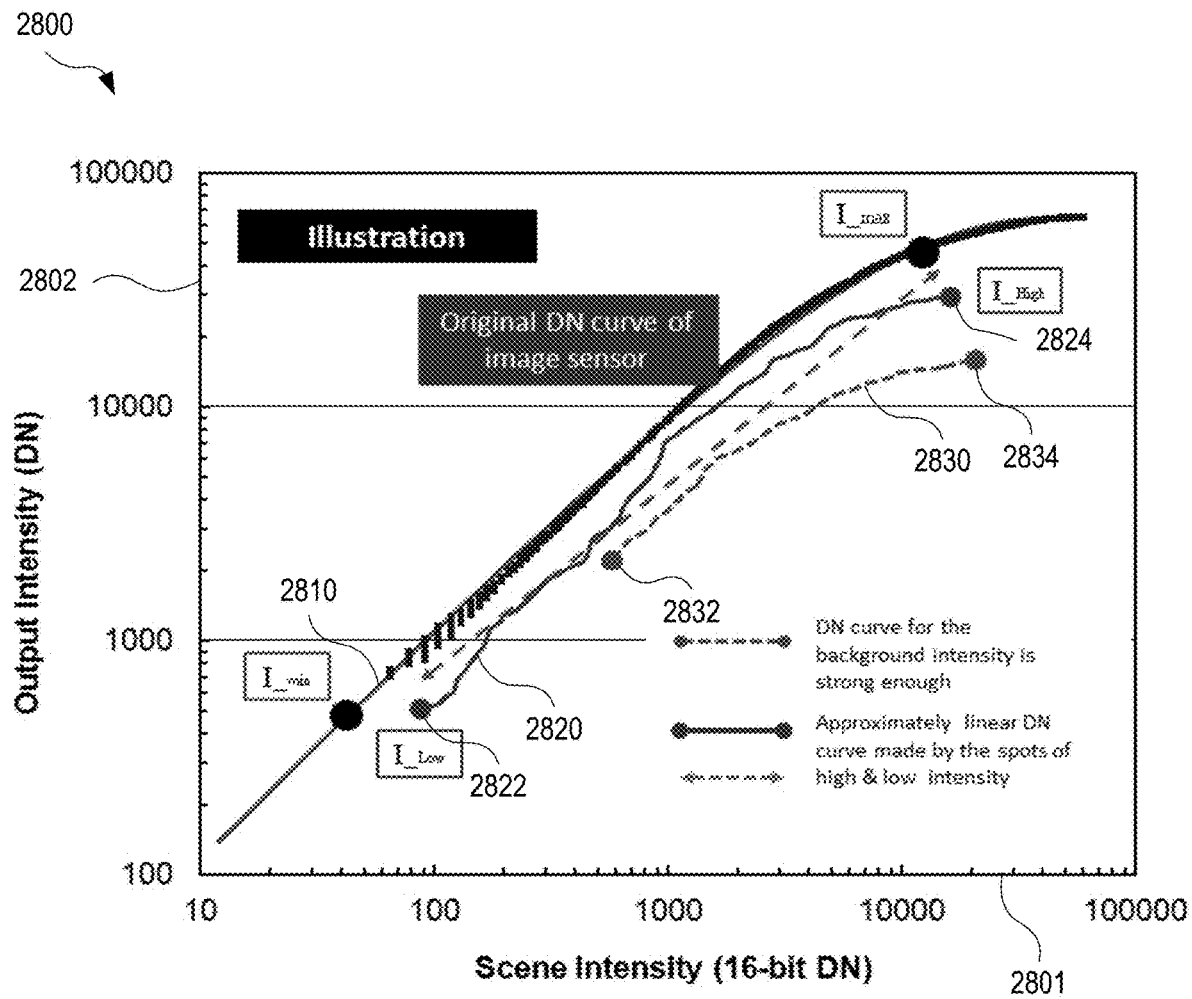
FIG. 28 illustrates exemplary data for the pixel intensity of an image captured by a camera of a near-eye display device as a function of the intensity of the scene (e.g., an eye) imaged by the camera, according to an embodiment.

FIG. 28 illustrates exemplary data for the pixel intensity 2802 of an image captured by camera 1724 as a function of the intensity 2801 of the scene (e.g., eye 190) imaged by camera 1724. Curve 2810 is the original sensitivity curve for camera 1724. Curve 2820 is a plot of the measured pixel intensity 2802 for a range of brightnesses of IR light beams 1772, ranging from an intensity 2822 measured for IR light beams 1772 at a lowest brightness to an intensity 2824 measured for IR light beams 1772 at a highest brightness. Curve 2820 is recorded when the background level in the image is low. For comparison, curve 2830 is recorded when the background level in the image is high. Curve 2830 ranges from an intensity 2832 measured for IR light beams 1772 at the lowest brightness to an intensity 2834 measured for IR light beams 1772 at the highest brightness. Due to the increased background level in the image, curve 2830 is compressed as compared to curve 2820. Display device 2700 may utilize power control circuitry 2728 to operate light source 1728 at two (or more) different intensities so as to increase the dynamic range for images of reflections 1830 captured by camera 1724 in order to properly account for a wide range of background levels.

Figure 29:
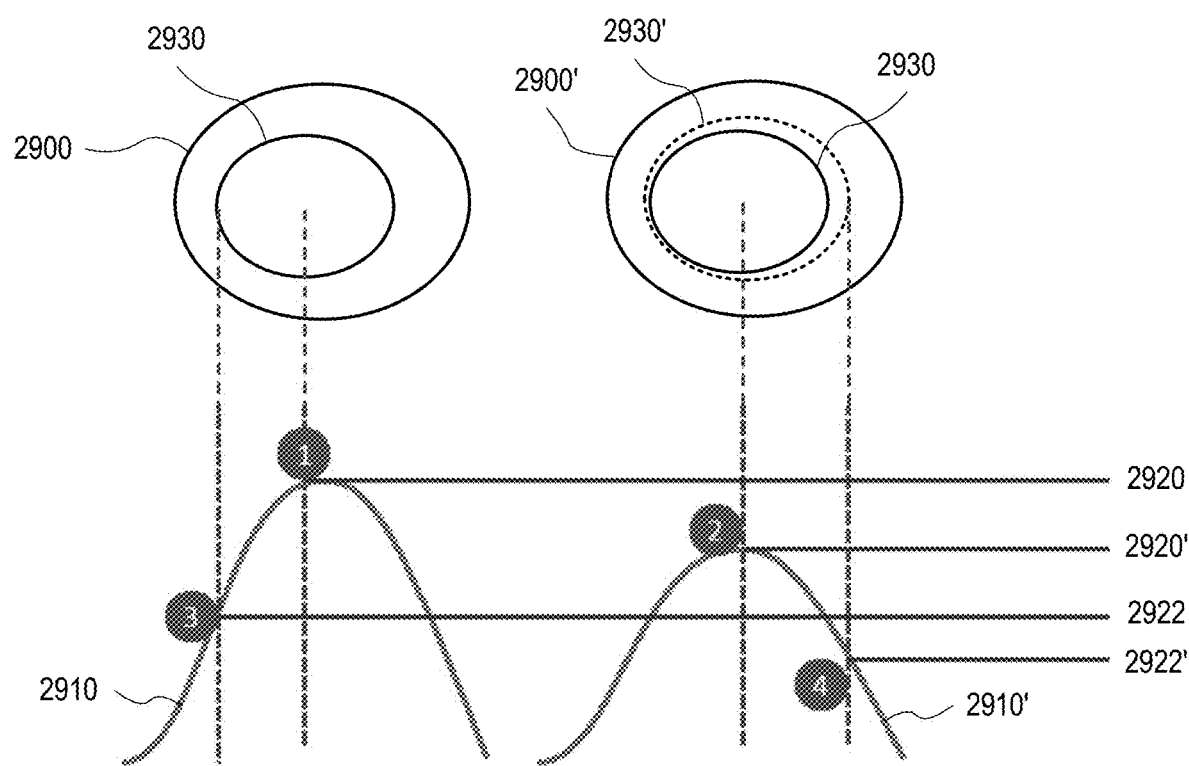
FIG. 29 illustrates images of a reflection of one IR light beam incident on an eye for two intensities of the IR light beam, according to an embodiment.

FIG. 29 illustrates exemplary images of reflections of one IR light beam 1772 incident on eye 190 (i.e., images of reflections 1830) for two intensities of IR light beam 1772. The left-hand side of FIG. 29 shows a reflection 2900 of IR light beam 1772 (an example of reflection 1830) at a high intensity of IR light beam 1772, together with a line profile 2910 through reflection 2900. The right-hand side of FIG. 29 shows the same reflection 2900' imaged at a low intensity of IR light beam 1772, together with a line profile 2910' through reflection 2900'.

Gaze evaluator 1982 may locate reflection 2900 by thresholding the image as shown for line profile 2910. Gaze evaluator 1982 may determine a max intensity 2920 for reflection 2900 and, based thereupon, define a threshold 2922. Threshold 2922 is, for example, 50% of max intensity 2920. Threshold 2922 defines an outline 2930 of reflection 2900 as determined by gaze evaluator 1982.

Likewise, gaze evaluator 1982 may locate reflection 2900' by thresholding the image as shown for line profile 2910'. Gaze evaluator 1982 may determine a max intensity 2920' for reflection 2900' and, based thereupon, define a threshold 2922'. Threshold 2922' is, for example, 50% of max intensity 2920'. Threshold 2922' defines an outline 2930' of reflection 2900' as determined by gaze evaluator 1982.

For comparison, outline 2930 is depicted also on the right-hand side of FIG. 29. It is apparent that outline 2930' is different from outline 2930, and that the center location of outline 2930' is shifted relative to the center location of outline 2930. This is a consequence of the relatively larger background contribution to reflection 2900'. This illustrates that the perceived center location of reflection 2900/2900' may depend on the relative ratio of signal of reflection 2900/2900' to background. Thus, if images are captured at only one intensity of IR light beams 1772 and the background level varies over time, the perceived center location of reflection 2900/2900' may shift over time, which in turn may lead to inaccuracies in gaze directions derived from such images. This problem may be alleviated by capturing images at two different intensities of IR light beams 1772 and taking into account both outline 2930 and outline 2930' to determine the final center location of reflection 2900/2900'. In one embodiment, gaze evaluator 1982 defines the location of the reflections of IR light beam 1772, incident on eye 190, as the average of the center locations of outlines 2930 and 2930'.

Figure 30:
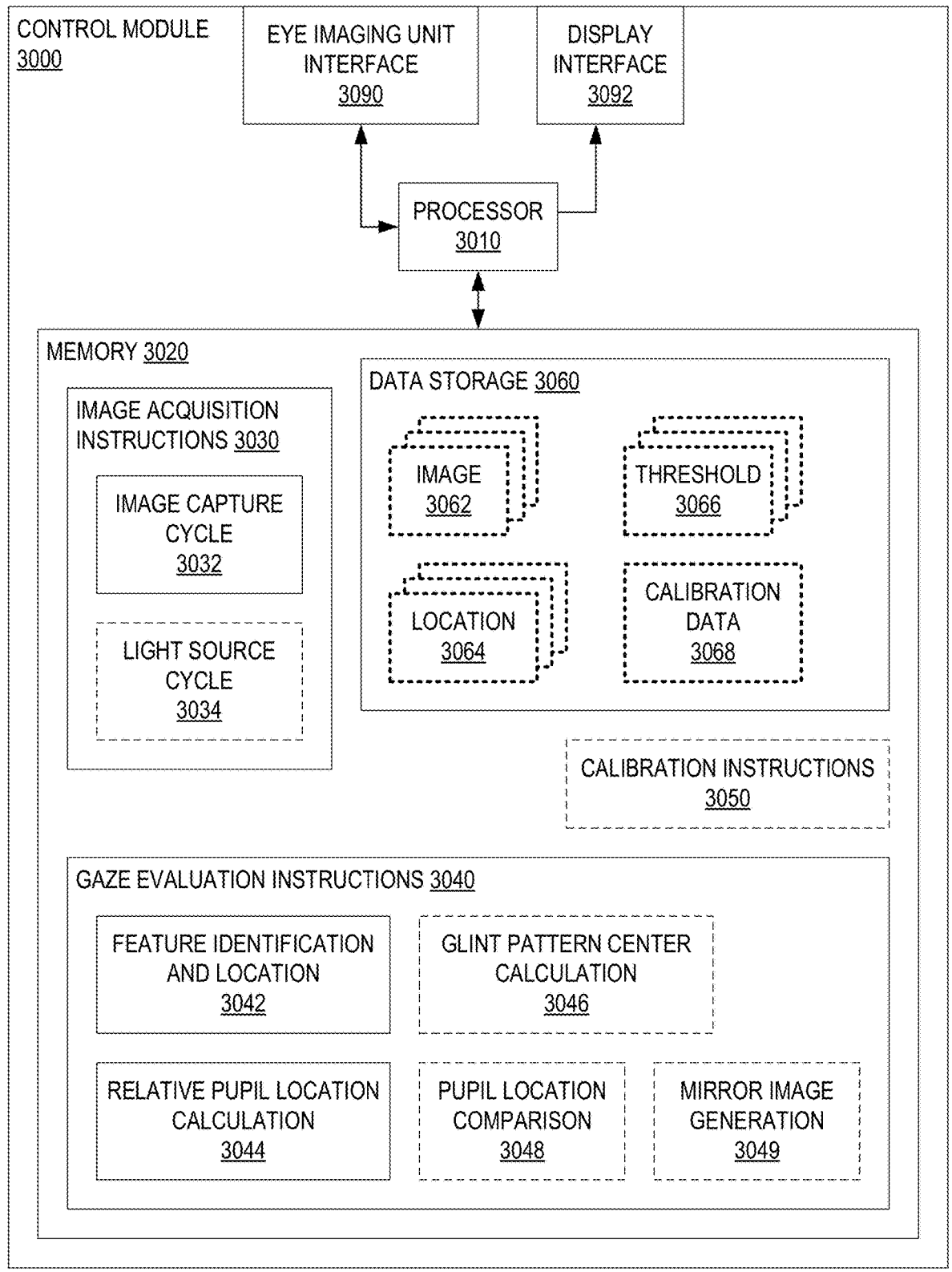
FIG. 30 illustrates a control module for controlling image acquisition and performing gaze evaluation in a near-eye display device, according to an embodiment.

FIG. 30 illustrates one exemplary control module 3000 for controlling image acquisition and performing gaze evaluation in a near-eye display device. Control module 3000 may be implemented in near-eye display device 1900 as control module 1980, or in near-eye display device 2700 as control module 2780.

Control module 3000 includes a processor 3010 and a non-transitory memory 3020. Memory 3020 includes machine-readable image acquisition instructions 3030, machine-readable gaze evaluation instructions 3040, a data storage 3060, and optionally calibration instructions 3050. Processor 3010 is communicatively coupled with memory 3020 and may execute (a) image acquisition instructions to implement the functionality of image acquisition controller 2782, (b) gaze evaluation instructions 3040 to implement the functionality of gaze evaluator 1982, and (c) calibration instructions 3050 to calibrate the location of pupil 1810 relative to reflections 1830 for one particular gaze direction.

Image acquisition instructions 3030 include image capture cycle instructions 3032 that, upon execution by processor 3010, control image capture by camera 1724 to image pupil 1810 and reflections 1830. In an embodiment, image acquisition instructions 3030 further includes light source cycle instructions 3034 that, upon execution by processor 3010, control the operation of light source 1728. When implemented in display device 2700, light source cycle instructions 3034, upon execution by processor 3010, control power control circuitry 2728 to set the power level of light source 1728.

Gaze evaluation instructions 3040 includes feature identification and location instructions 3042 that, upon execution by processor 3010, identifies and locates pupil 1810 and reflections 1830 in image(s) captured by camera 1724. Gaze evaluation instructions 3040 also includes relative pupil location instructions 3044 that, upon execution by processor 3010, determines the location of pupil 1810 relative to reflections 1830 in image(s) captured by camera 1724. In an embodiment, gaze evaluation instructions 3040 includes glint pattern center calculation instructions 3046 that, upon execution by processor 3010, calculates the center location of the pattern formed by the locations of reflections 1830 in image(s) captured by camera 1724. In an embodiment, gaze evaluation instructions 3040 includes pupil location comparison instructions 3048 that, upon execution by processor 3010, compares one relative location of pupil 1810 (relative to reflections 1830) to another relative location of pupil 1810 (relative to reflections 1830) for a calibration associate gaze direction. In addition, gaze evaluation instructions 3040 may include mirror image generation instructions 3049 that, upon execution by processor 3010, forms the mirror image of an image captured by camera 1724, wherein the mirror image may be formed by reflection through a horizontal or vertical center line of the image.

Processor 3010 may store to data storage (a) one or more images 3062 such as images captured by camera 1724 or mirror images thereof, (b) one or more locations 3064 of pupil 1810 and reflections 1830 in image(s) 3062, (c) one or more thresholds 3066 used to locate pupil 1810 and/or reflections 1830 in image(s) 3062, such as thresholds 2922 and 2922' or the ratio of threshold 2922 (2922') to intensity 2920 (2920'), and/or (d) calibration data 3068 such as the location of pupil 1810 relative to reflections 1830 for a calibration-associated gaze direction.

Control module 3000 further includes an eye imaging unit interface 3090, through which processor 3010 communicates with eye imaging unit 1720 or 2720. In addition, control module 3000 includes a display interface 3092, through which processor 3010 communicates with display unit 210. Although not shown in FIG. 30, control module 3000 may include interface 385 or an interface for communicating with interface 385.

Figure 31:
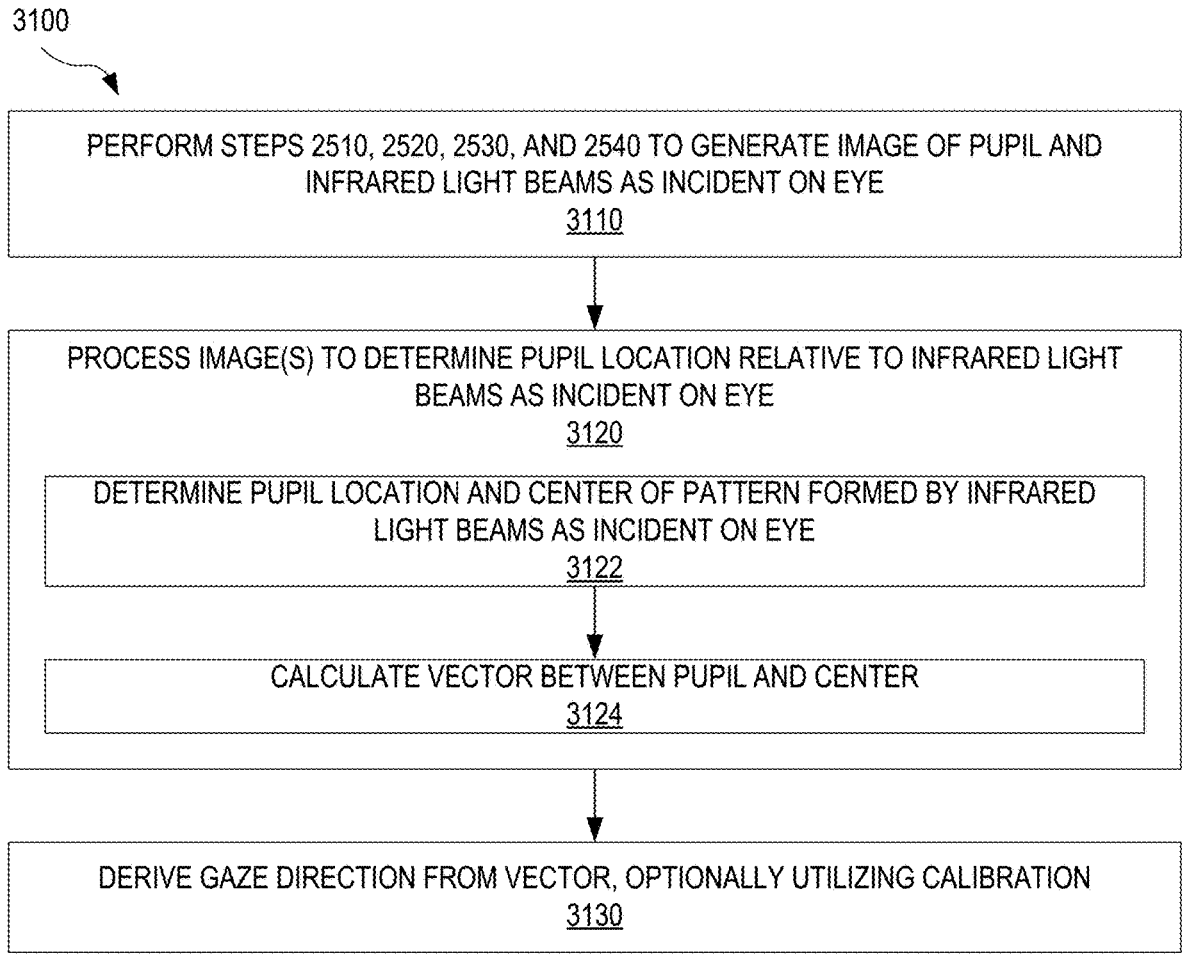
FIG. 31 illustrates a method for determining the gaze direction of an eye, using a near-eye display device, according to an embodiment.

FIG. 31 illustrates one exemplary method 3100 for determining the gaze direction of eye 190, using a near-eye display device. Method 3100 is an embodiment of method 2500 and may be performed by display device 2700 implemented with control module 3000.

In a step 3110, method 3100 performs steps 2510, 2520, 2530, and 2540 to generate one or more images of pupil 1810 and reflections of IR light beams 1772 incident on eye 190 (reflections 1830). In one example of step 3110, processor 3010 executes image acquisition instructions 3030 to generate IR light beams 1772 and capture one or more images 3062 of pupil 1810 and reflections 1830. Processor 3010 stores image(s) 3062 to data storage 3060.

In a step 3120, method 3100 processes the image(s) captured in step 3110 to determine the location of pupil 1810 relative to the location of reflections of IR light beams 1772 incident on eye 190. Step 3120 includes steps 3122 and 3124. Step 3122 determines the location of pupil 1810 and the center location of the pattern formed by the locations of reflections of IR light beams 1772 incident on eye 190. Step 3124 calculates the vector between pupil 1810 and the center location determined in step 3122.

Figure 32:
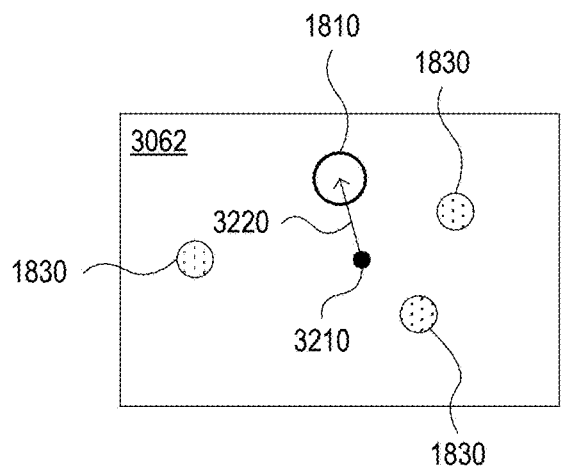
FIG. 32 shows image processing to determine the location of a pupil of an eye relative to the location of reflections of IR light beams incident on the eye, according to an embodiment.

FIG. 32 shows one example of processing of image 3062 to perform steps 3122 and 3124. Step 3122 determines the location of pupil 1810. Step 3122 further determines the locations of each reflection 1830 and calculates therefrom the location of the center 3210 of the pattern (e.g., triangle) formed by reflections 1830. Step 3124 determines vector 3220 from center 3210 to pupil 1810. Although FIG. 32 shows three reflections 1830, image 3062 may include more than three reflections 1830 generated by more than three IR light beams, respectively. For example, image 3062 may include four reflections 1830, in which case center 3210 is the center of a quadrilateral.

Referring again to FIG. 31, in one example of step 3122, processor 3010 retrieves image 3062 from data storage 3060 and executes feature identification and location instructions 3042 to locate pupil 1810 and reflections 1830 in image 3062. Next, processor 3010 executes glint pattern center calculation instructions 3046 to determine the location of center 3210. Processor 3010 then executes relative pupil location instructions 3044 to determine vector 3220. Processor 3010 may store vector 3220 to data storage 3060 as a location 3064.

In a step 3130, method 3100 derives the gaze direction of eye 190 from the vector determined in step 3124. Optionally, step 3130 takes into account a calibrated relative location of pupil 1810 (relative to reflections of IR light beams 1772 incident on eye 190) when determining the gaze direction of eye 190. In one example, processor 3010 retrieves vector 3220 from data storage 3060 and executes gaze evaluation instructions 3040 to derive the gaze direction of eye 190 from vector 3220. For example, referring to FIG. 32, step 3130 may derive from vector 3220 that the gaze direction of eye 190 is upwards or that the gaze direction of eye 190 is upwards by, e.g., 23 degrees.

FIG. 33 illustrates one exemplary method 3300 for calibrating gaze evaluation by a near-eye display device. The output of method 3300 may be utilized in step 3130 of method 3100. Method 3300 is performed, for example, by display device 2700 implemented with control module 3000.

In an optional step 3310, method 3300 instructs the user of the near-eye display device to look in a particular direction, for example straight ahead. In one example of step 3310, processor 3010 executes a portion of calibration instructions 3050 to instruct display unit 210 to display a message to the user directing the user to look in this calibration-associated direction.

In a step 3320, method 3300 performs steps 3110 and 3120 of method 3100 for the calibration-associated gaze direction to determine the location of pupil 1810 relative to reflections of IR light beams 1772, incident on eye 190, for the calibration-associated gaze direction.

A step 3330 stores the relative location of pupil 1810, determined in step 3320, to memory of the near-eye display device. In one example of step 3330, processor 3010 stores vector 3220 for the calibration-associated direction to data storage 3060 as calibration data 3068.

In an alternate embodiment, method 3300 does not process the images captured in step 3320 but instead saves these images to memory (such as data storage 3060). In this embodiment, the remainder of method 3300 is performed when the calibration information is needed in step 2554 of method 2500, in step 3130 of method 3100, or in step 3420 of method 3400.

In one exemplary use scenario, method 3300 is performed once for each user of the near-eye display device. Method 3300 may be performed for several users of the near-eye display device such, that the near-eye display device contains calibration data pertaining to each of these users.

FIG. 34 illustrates one exemplary method 3400 for determining the gaze direction of eye 190, using a near-eye display device and based in part on a gaze direction calibration. Method 3400 is an embodiment of method 3100 and is performed, for example, by display device 2700 implemented with control module 3000.

In a step 3410, method 3400 performs steps 3110 and 3120 of method 3100 during actual (non-calibration) use of the near-eye display device to determine the relative location of pupil 1810. Step 3410 determines vector 3220.

In a step 3420, method 3400 derives the gaze direction of eye 190 from a comparison of (a) vector 3220 determined in step 3410 to (b) a calibration-associated vector 3220 determined for a calibration-associated gaze direction, for example according to method 3300.

FIGS. 35A and 35B show two exemplary images 3062(1) and 3062(2), respectively, captured when eye 190 is in the gaze-associated calibration direction and during actual use of the near-eye display device, respectively. In image 3062(1), the gaze direction of eye 190 is straight ahead, and the relative location of pupil 1810 is indicated by vector 3530(1). In image 3062(2), the gaze direction of eye 190 is upwards, and the relative location of pupil 1810 is indicated by vector 3530(2). Although each of FIGS. 35A and 35B shows three reflections 1830, each of image 3062(1) and image 3062(2) may include more than three reflections 1830 generated by more than three IR light beams, respectively. For example, each of image 3062(1) and 3062(2) may include four reflections 1830, in which case center 3210 is the center of a quadrilateral.

Referring now to FIGS. 34, 35A, and 35B in combination, step 3420 compares vector 3530(2) to vector 3530(1) to determine the gaze direction of eye 190. In one example of step 3420, processor 3010 retrieves vectors 3530(1) and 3530(2) from data storage 3060 and executes pupil location comparison instructions 3048 to determine the difference between vector 3530(2) and vector 3530(1) and derives, from this difference, the gaze direction of eye 190.

Figure 36:
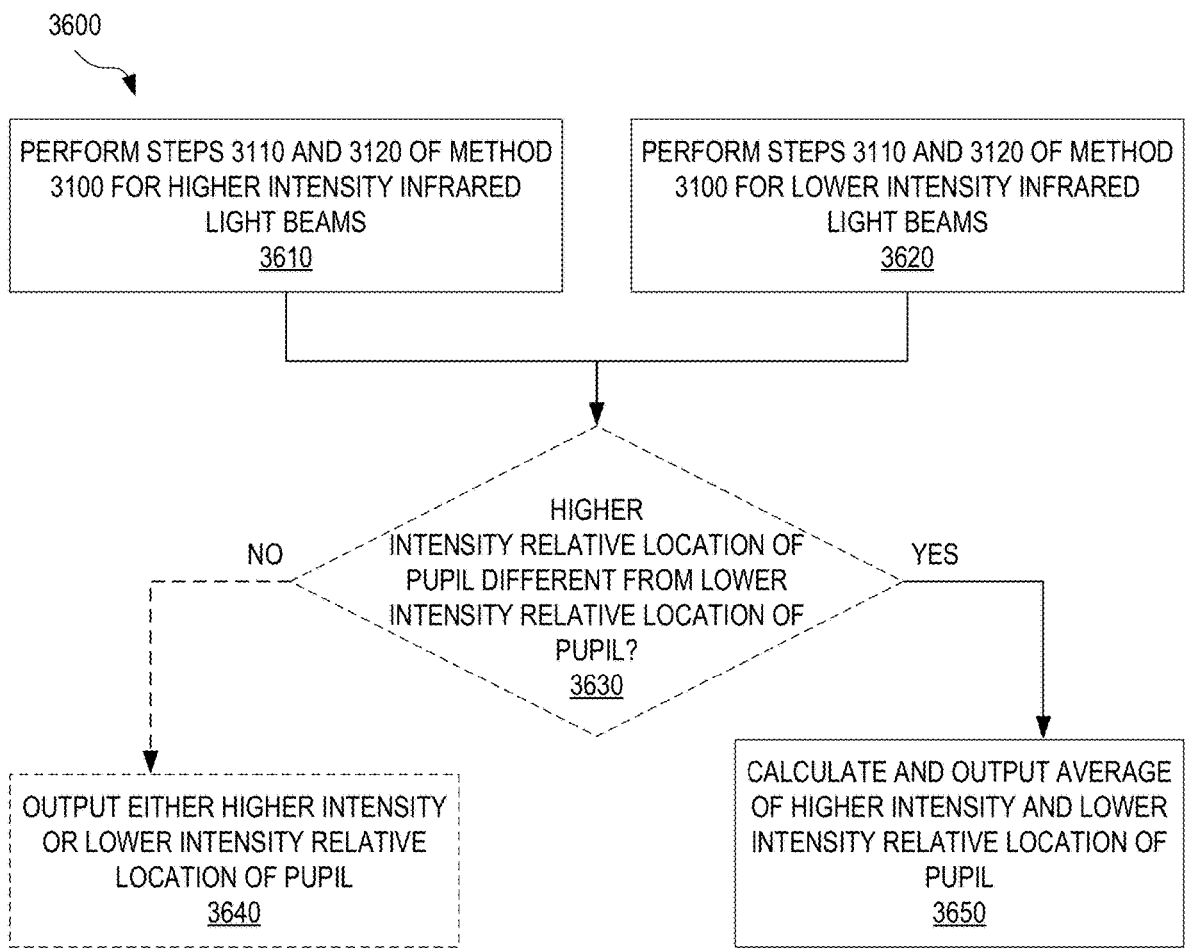
FIG. 36 illustrates a method for determining the location of the pupil of an eye relative to the location of reflections of IR light beams, incident on the eye, based upon images captured at both high and low intensities of the IR light beams producing the reflections, according to an embodiment.

FIG. 36 illustrates one exemplary method 3600 for determining the location of pupil 1810 relative to the location of reflections 1830 based upon images captured at both high and low intensities of the IR light beams producing reflections 1830. By using two different intensities of the IR light beams, method 3600 benefits from the advantages discussed above in reference to FIGS. 27-29. Method 3600 is an embodiment of steps 2510, 2520, 2530, 2540, and 2552 of method 2500. Method 3600 is also an embodiment of step 3410 of method 3400. In addition, when applied to a calibration-associated gaze direction, method 3600 is an embodiment of method 3300. Method 3600 is, for example, performed by display device 2700 implemented with power control circuitry 2728 and control module 3000.

In a step 3610, method 3600 performs steps 3110 and 3120 of method 3100 for higher intensity IR light beams. In one example of step 3610, display device 2700 performs steps 3110 and 3120, as discussed above in reference to FIG. 31 and further utilizing power control circuitry 2728, with IR light beams 1772 at a higher intensity to determine vector 3220 for the higher intensity IR light beams 1772. In a step 3620, method 3600 performs steps 3110 and 3120 of method 3100 for lower intensity IR light beams. In one example of step 3620, display device 2700 performs steps 3110 and 3120, as discussed above in reference to FIG. 31 and further utilizing power control circuitry 2728, with IR light beams 1772 at a lower intensity to determine vector 3220 for the lower intensity IR light beams 1772. In an embodiment, the intensity used in step 3620 is in the range from 0.1% to 10% of the intensity used in step 3610.

In one embodiment, method 3600 includes a step 3630 of comparing the relative location of pupil 1810 determined in step 3610 to the relative location of pupil 1810 determined in step 3620. If these two relative pupil locations are the same, method 3600 proceeds to a step 3640 of outputting either one of the two (identical) relative pupil locations. In, on the other hand, these two relative pupil locations are different, method 3600 proceeds to a step 3650 of calculating and outputting the average of these two relative pupil locations. In one example of this embodiment, processor 3010 executes pupil location comparison instructions 3048 to perform step 3630 and, depending on the outcome of step 3630, either step 3640 or step 3650.

In another embodiment, method 3600 does not include steps 3630 and 3640 but proceeds to calculate and output the average of these two relative pupil locations in step 3650. In one example of this embodiment, processor 3010 executes pupil location comparison instructions 3048 to perform step 3650.

In an example, image capture performed in steps 3610 and 3620, is performed at a frame rate of 60 frames per second, such that it takes 1/30 of a second to perform steps 3610 and 3620. Method 3600 may be performed repeatedly, such that relative locations of pupil 1810 is outputted at a rate of 30 per second.

Without departing from the scope hereof, method 3600 may perform multiple repetitions of steps 3610 and 3620 and, for each of steps 3610 and 3620, average the captured images to improve image quality prior to proceeding to step 3630 or 3650.

Figure 37:
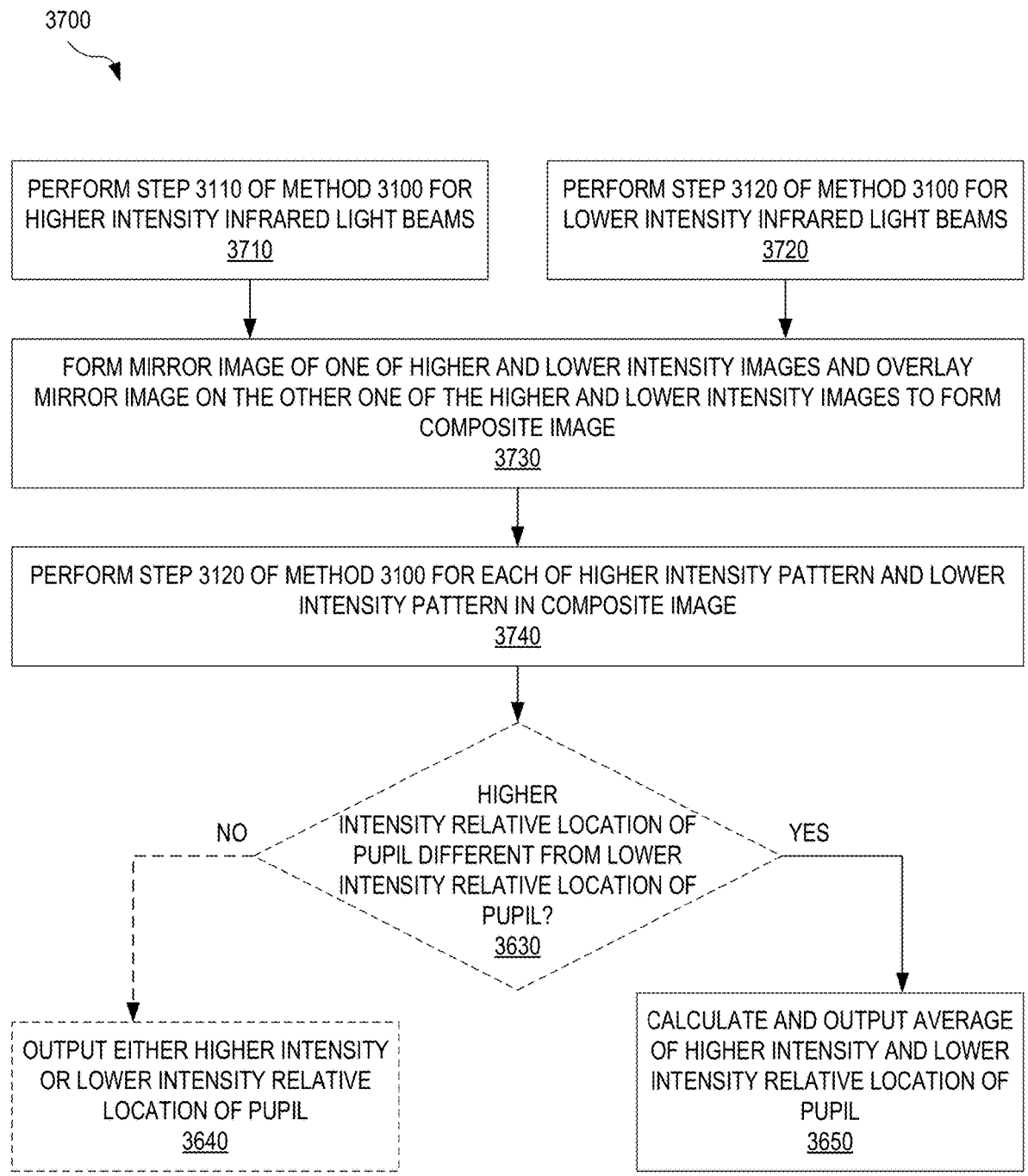
FIG. 37 illustrates another method for determining the location of the pupil of an eye relative to the location of reflections of IR light beams, incident on the eye, based upon images captured at both high and low intensities of the IR light beams producing the reflections, according to an embodiment.

FIG. 37 illustrates another exemplary method 3700 for determining the location of pupil 1810 relative to the location of reflections 1830 based upon images captured at both high and low intensities of the IR light beams producing reflections 1830. By using two different intensities of the IR light beams, method 3700 benefits from the advantages discussed above in reference to FIGS. 27-29. Method 3700 is an embodiment of steps 2510, 2520, 2530, 2540, and 2552 of method 2500. Method 3700 is also an embodiment of step 3410 of method 3400. In addition, when applied to a calibration-associated gaze direction, method 3700 is an embodiment of method 3300. Method 3700 is, for example, performed by display device 2700 implemented with power control circuitry 2728 and control module 3000. Method 3700 is similar to method 3600 except for steps 3610 and 3620 being replaced by steps 3710, 3720, 3730, and 3740.

In step 3710, method 3700 performs step 3110 of method 3100 for higher intensity IR light beams to generate an image (or a plurality of images) of pupil 1810 and the reflections of IR light beams incident on eye 190. In one example of step 3710, display device 2700 performs step 3110, as discussed above in reference to FIG. 31 and further utilizing power control circuitry 2728 and light source cycle instructions 3034, with IR light beams 1772 at a higher intensity to generate an image (or a plurality of images) of pupil 1810 and reflections 1830 for the higher intensity IR light beams 1772. In step 3720, method 3700 performs step 3110 of method 3100 for lower intensity IR light beams to generate an image of pupil 1810 and reflections of the IR light beams incident on eye 190. In one example of step 3720, display device 2700 performs step 3110, as discussed above in reference to FIG. 31 and further utilizing power control circuitry 2728 and light source cycle instructions 3034, with IR light beams 1772 at a lower intensity to generate an image of pupil 1810 and reflections 1830 for the lower intensity IR light beams 1772. In an embodiment, the intensity used in step 3720 is in the range from 0.1% to 10% of the intensity used in step 3710.

In step 3730, method 3700 overlays a mirror image of (a) one of the higher intensity image generated in step 3710 or the lower intensity image generated in step 3720 on (b) the other one of higher intensity image generated in step 3710 or the lower intensity image generated in step 3720 to form a composite image showing both the higher intensity pattern and the lower intensity pattern of the IR light beams as reflected by eye 190. The mirror image may be formed by reflection through a horizontal or a vertical center axis of the image. In one example of step 3730, processor 3010 retrieves the lower intensity image and the higher intensity image from data storage 3060, and executes mirror image generation instructions 3049 to overlay a mirror image of the lower intensity image on the higher intensity image.

In step 3740, method 3700 performs step 3120 of method 3100, as discussed above in reference to FIG. 31, for each of the lower intensity pattern of the IR light beams and the higher intensity pattern of the IR light beams in the composite image.

Figure 38:
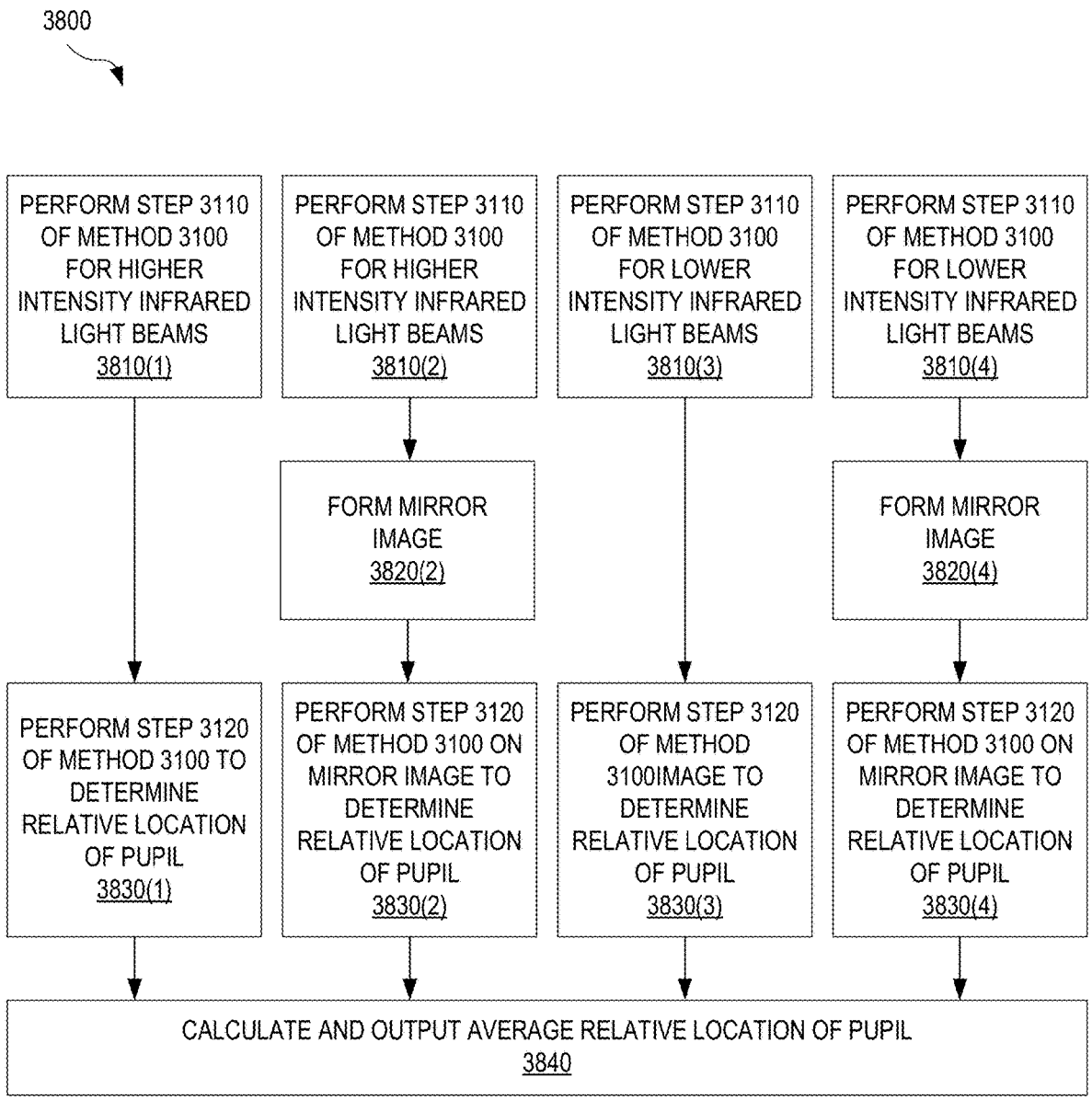
FIG. 38 illustrates yet another method for determining the location of the pupil of an eye relative to the location of reflections of IR light beams, incident on the eye, based upon images captured at both high and low intensities of the IR light beams producing the reflections, according to an embodiment.

FIG. 38 illustrates yet another method 3800 for determining the location of pupil 1810 relative to the location of reflections 1830 based upon images captured at both high and low intensities of the IR light beams producing reflections 1830. By using two different intensities of the IR light beams, method 3800 benefits from the advantages discussed above in reference to FIGS. 27-29. Method 3800 is an embodiment of steps 2510, 2520, 2530, 2540, and 2552 of method 2500. Method 3800 is also an embodiment of step 3410 of method 3400. In addition, when applied to a calibration-associated gaze direction, method 3800 is an embodiment of method 3300. Method 3800 is, for example, performed by display device 2700 implemented with power control circuitry 2728 and control module 3000 including and light source cycle instructions 3034.

In a step 3810(1), method 3800 performs step 3110 of method 3100 for higher intensity IR light beams. Step 3810(1) is similar to step 3710. In a step 3810(2), method 3800 again performs step 3110 of method 3100 for higher intensity IR light beams. Step 3810(2) is followed by a step 3820(2) of forming the mirror image of the image captured in step 3810(2). In one example of step 3810(2), processor 3010 executes mirror image generation instructions 3049. In a step 3810(3), method 3800 performs step 3110 of method 3100 for lower intensity IR light beams. Step 3810(3) is similar to step 3720. In a step 3810(4), method 3800 again performs step 3110 of method 3100 for lower intensity IR light beams. Step 3810(4) is followed by a step 3820(4) of forming the mirror image of the image captured in step 3810(4). In one example of step 3810(2), processor 3010 executes mirror image generation instructions 3049.

In a step 3830(1), method 3800 performs step 3120 of method 3100 as discussed above in reference to FIG. 31 to determine the location of pupil 1810 relative to the location of reflections 1830 for the image generated in step 3810(1). In a step 3830(2), method 3800 performs step 3120 of method 3100 as discussed above in reference to FIG. 31 to determine the location of pupil 1810 relative to the location of reflections 1830 for the image generated in step 3820(2). In a step 3830(3), method 3800 performs step 3120 of method 3100 as discussed above in reference to FIG. 31 to determine the location of pupil 1810 relative to the location of reflections 1830 for the image generated in step 3810(3). In a step 3830(4), method 3800 performs step 3120 of method 3100 as discussed above in reference to FIG. 31 to determine the location of pupil 1810 relative to the location of reflections 1830 for the image generated in step 3820(4).

In a step 3840, method 3800 calculates and outputs the average of the relative locations of pupil 1810 determined in steps 3830(1), 3830(2), 3830(3), and 3830(4). Step 3840 is similar to step 3650 except for being applied to the results of four images instead of two.

In an example, image capture performed in steps 3810(1), 3810(2), 3810(3), and 3810(4), is performed at a frame rate of 60 frames per second, such that it takes ¹/₁₅ of a second to perform steps 3810(1), 3810(2), 3810(3), and 3810(4). Method 3800 may be performed repeatedly, such that average relative locations of pupil 1810 is outputted at a rate of 15 per second.

Without departing from the scope hereof, method 3800 may perform multiple repetitions of steps 3810(1), 3810(2), 3810(3), and 3810(4) and, for each of steps 3810(1), 3810 (2), 3810(3), and 3810(4), average the captured images to improve image quality prior to proceeding to steps 3830(1), 3830(2), 3830(3), and 3830(4).

Additional Embodiments

The following discloses additional embodiments of display device 100. These embodiments are referred to in as "head-mounted display apparatus".

In one embodiment, a head-mounted apparatus is provided, including:
 a reflective microdisplay;
 a visible light source configured to illuminate the microdisplay;
 an illumination optics unit configured to direct visible light emanated from the visible light source into the microdisplay, and allow light reflected from the microdisplay in the form of an image to pass therethrough and transmit along an optical axis;
 an imaging optics unit configured to project the image from the microdisplay into an eye of a user; and
 an eye tracker module, including:
 an invisible light source configured to emanate an invisible light beam into the illumination optics unit, the illumination optics unit configured to reflect the invisible light beam along said optical axis, the imaging optics unit configured to receive and direct the invisible light beam into the eye of the user; and
 a sensor configured to receive the invisible light beam reflected back from the eye of the user and to capture an image of the eye.

Optionally, the reflective microdisplay may be a liquid crystal on silicon display or a digital light processing display. Optionally, the image from the microdisplay projected into the eye of a user may be a virtual image. Optionally, the eye tracker module may further include a processor for receiving the image of the eye from the sensor and for monitoring a position of the eye. Optionally, the sensor may provide a real image for monitoring the position of the eye. Optionally, the processor may calculate the position of the eye by using an algorithm. Optionally, the imaging optics unit may be disposed downstream to the illumination optics unit along the optical axis, with the eye tracker module disposed on a first side of the illumination optics unit, and with the visible light source disposed on a second side of the illumination optics unit opposite to the first side. Optionally, the illumination optics unit may include a first beam splitter arranged with an angle of about 45 degrees relative to the optical axis. Optionally, the imaging optics unit may include a second beam splitter and an imaging lens, arranged along the optical axis, the second beam splitter has a first surface for receiving and allowing both the image from the microdisplay and the invisible light beam to pass therethrough, the imaging lens is configured to reflect the image from the microdisplay and the invisible light beam toward a second surface of the second beam splitter, and second surface of the second beam splitter is configured to reflect the image from the microdisplay and the invisible light beam into the eye of the user. Optionally, the imaging optics unit may include a second beam splitter and an imaging lens arranged along the optical axis and a reflector, the second beam splitter has a first surface that allows the image from the microdisplay to pass therethrough and reflects the invisible light beam toward the reflector, wherein the first surface of the second beam splitter is further configured to allow the invisible light beam reflected from the reflector to pass therethrough into the eye of the user, the imaging lens is configured to reflect the image from the microdisplay toward a second surface of the second beam splitter, and the second surface of the second beam splitter is configured to reflect the image from the microdisplay into the eye of the user. Optionally, the invisible light source may be an infrared light-emitting diode light source.

In another embodiment, a head-mounted display apparatus includes:
  a reflective microdisplay;
  a visible light source configured to illuminate the microdisplay;
  a first illumination optics unit configured to direct visible light emanated from the visible light source into the microdisplay, and allow light reflected from the microdisplay in the form of an image to pass therethrough along an optical axis;
  a second illumination optics unit disposed downstream to the first illumination optics unit along said optical axis and allowing the image from the microdisplay to pass therethrough;
  an imaging optics unit configured to project the image from the microdisplay into an eye of a user; and
  an eye tracker module, including:
    an invisible light source configured to emanate an invisible light beam into the second illumination optics unit, the second illumination optics unit configured to reflect the invisible light beam along said optical axis, the imaging optics unit configured to receive and direct the invisible light beam into the eye of the user; and
    a sensor configured to receive the invisible light beam reflected back from the eye of the user and to capture an image of the eye.

Optionally, the reflective microdisplay may be a liquid crystal on silicon display or a digital light processing display. Optionally, the image from the microdisplay projected into the eye of a user may be a virtual image. Optionally, the eye tracker module may further include a processor for receiving the image of the eye from the sensor and for monitoring a position of the eye. Optionally, the sensor may provide a real image for monitoring the position of the eye. Optionally, the processor may calculate the position of the eye by using an algorithm. Optionally, the first illumination optics unit, the second illumination optics unit and the imaging optics unit may be successively arranged along the optical axis, with the eye tracker module and the visible light source disposed on a same side of the second illumination optics unit and the first illumination optics unit, respectively. Optionally, the first illumination optics unit may include a first beam splitter arranged with an angle of about 45 degrees relative to the optical axis and the second illumination optics unit may include a second beam splitter arranged with an angle of about 45 degrees relative to the optical axis, wherein the first beam splitter and the second beam splitter is orthogonal to each other. Optionally, the imaging optics unit may include a third beam splitter and an imaging lens, arranged along the optical axis, the third beam splitter has a first surface for receiving and allowing both the image from the microdisplay and the invisible light beam to pass therethrough, the imaging lens is configured to reflect the image from the microdisplay and the invisible light beam toward a second surface of the third beam splitter, and the second surface of the third beam splitter is configured to reflect the image from the microdisplay and the invisible light beam into the eye of the user. Optionally, the imaging optics unit may include a third beam splitter and an imaging lens arranged along the optical axis and a reflector, the third beam splitter has a first surface that allows the image from the microdisplay to pass therethrough and reflects the invisible light beam toward the reflector, wherein the first surface of the third beam splitter is further configured to allow the invisible light beam reflected from the reflector to pass therethrough into the eye of the user, the imaging lens is configured to reflect the image from the microdisplay toward a second surface of the third beam splitter, and the second surface of the third beam splitter is configured to reflect the image from the microdisplay into the eye of the user. Optionally, the invisible light source may be an infrared light-emitting diode light source.

In yet another embodiment, a head-mounted display apparatus includes:
  a transmissive microdisplay;
  a visible light source configured to illuminate a back of the microdisplay, such that light in the form of an image is transmitted from a front of the microdisplay along an optical axis;
  an illumination optics unit configured to receive and allow the image from the microdisplay to pass therethrough;
  an imaging optics unit configured to project the image from the microdisplay into an eye of a user; and
  an eye tracker module, including:
    an invisible light source configured to emanate an invisible light beam into the illumination optics unit, the illumination optics unit configured to reflect the invisible light beam along said optical axis, the imaging optics unit configured to receive and direct the invisible light beam into the eye of the user; and
    a sensor configured to receive the invisible light beam reflected back from the eye of the user and to capture an image of the eye.

Optionally, the illumination optics unit may include a first beam splitter arranged with an angle of about 45 degrees relative to the optical axis. Optionally, the imaging optics unit may include a second beam splitter and an imaging lens arranged along the optical axis, the second beam splitter has a first surface for receiving and allowing both the image from the microdisplay and the invisible light beam to pass therethrough, the imaging lens is configured to reflect the image from the microdisplay and the invisible light beam toward a second surface of the second beam splitter, and the second surface of the second beam splitter is configured to reflect the image from the microdisplay and the invisible light beam into the eye of the user. Optionally, the imaging optics unit may include a second beam splitter and an imaging lens arranged along said optical axis and a reflector, the second beam splitter has a first surface that allows the image from the microdisplay to pass therethrough and reflects the invisible light beam toward the reflector, the first surface of the second beam splitter is further configured to allow the invisible light beam reflected from the reflector to pass therethrough into the eye of the user, wherein the imaging lens is configured to reflect the image from the microdisplay toward a second surface of the second beam splitter, and the second surface of the second beam splitter is configured to reflect the image from the microdisplay into the eye of the user.

Compared to the conventional head-mounted display devices, the head-mounted display apparatuses disclosed herein have the following advantages. 1) They are each provided with an eye tracker module including an invisible light source and a sensor. The invisible light source emanates an invisible light beam which is then received by an imaging optics unit and is directed thereby into an eye of the user. The sensor receives the invisible light beam reflected back from the eye of the user and thus captures an image of the eye, based of which a position of the eye is determinable by calculation. Monitoring the position of the eye allows obtaining a direction and an angle in and at which the eye is staring at an image. This makes it possible to control the displayed image and to track an object. 2) The invisible light beam emanated from the invisible light source enters the illumination optics unit and thereby travels along an optical axis of the invisible light. This results in an improvement in the accuracy of the object tracking. Further, the invisible light beam does not affect the user at all.

The core principle of the head-mounted display apparatuses disclosed herein is to enable the control of a displayed image and tracking of an object by using an eye tracker module including an invisible light source and a sensor, wherein the invisible light source emanates an invisible light beam that is then received by an imaging optics unit and directed thereby into an eye of a user, and the sensor receives the invisible light beam reflected back from the eye of the user and thus captures an image of the eye, and by monitoring the position of the eye to obtain a direction and an angle in and at which the eye is staring.

Embodiment 1

Figure 39:
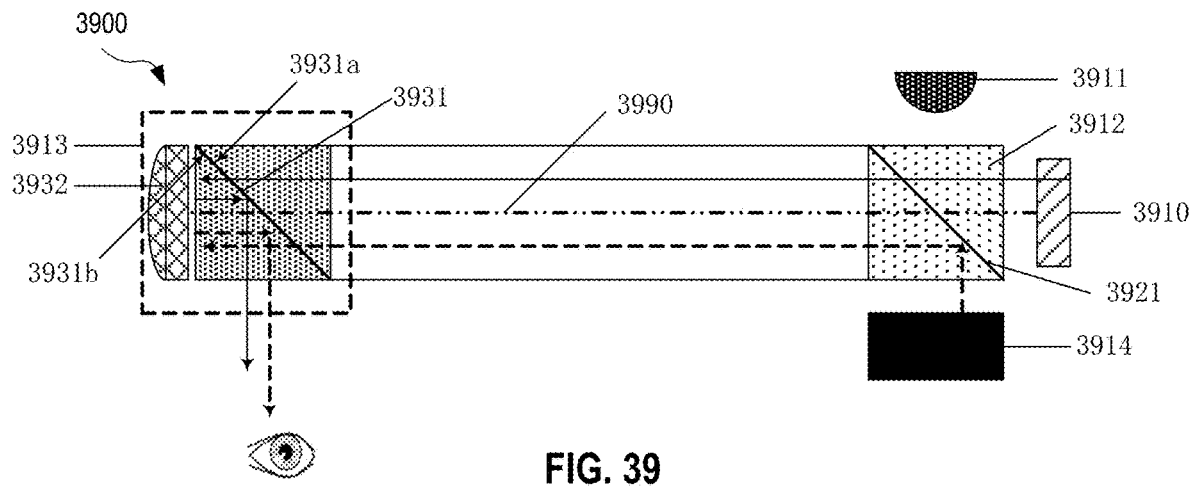
FIG. 39 diagrammatically illustrates a head-mounted display apparatus with coaxial eye imaging and including two beamsplitters, according to an embodiment.

FIG. 39 diagrammatically illustrates one exemplary head-mounted display apparatus 3900 in accordance with an Embodiment 1. Head-mounted display apparatus 3900 is an embodiment of display device 300. As shown in FIG. 39, head-mounted display apparatus 3900 includes: a reflective microdisplay 3910 (an embodiment of display 312), a visible light source 3911 (an embodiment of visible light source 314), an illumination optics unit 3912, an imaging optics unit 3913 (an embodiment of viewing unit 320) and an eye tracker module 3914 (an embodiment of eye imaging unit 220). The visible light source 3911 is configured to illuminate the microdisplay 3910. The illumination optics unit 3912 is configured to direct visible light emanated from the visible light source 3911 into the microdisplay 3910 and to allow light reflected from the microdisplay 3910 carrying an image to pass through the illumination optics unit 3912 and transmit along an optical axis 3990. Illumination optics unit 3912 implements beamsplitter interface 230 and beamsplitter interface 310 as a single beamsplitter 3921. The imaging optics unit 3913 is configured to project the image from the microdisplay 3910 into an eye of a user (as indicated by the arrowed solid lines in FIG. 39). The eye tracker module 3914 includes an invisible light source (an embodiment of IR illumination module 222) and a sensor (an embodiment of camera 224). The invisible light source is adapted to emanate an invisible light beam into the illumination optics unit 3912 which then makes the invisible light beam travel along the optical axis 3990. The imaging optics unit 3913 is configured to receive and direct the invisible light beam into the eye of the user (as indicated by the arrowed dashed lines in FIG. 39). The sensor is configured to receive the invisible light beam reflected back from the eye of the user and to thereby capture an image of the eye. It is noted that the arrowed solid and dashed lines in FIG. 39 are intended solely to indicate directions of different light beams, and, in case of the directions being the same, the lines should coincide but are still presented in the figure as separate lines in order to show that they represent distinct light beams.

The eye tracker module 3914 further includes a processor for receiving the image of the eye from the sensor and for using an algorithm to calculate a position of the eye. This is analogous to an embodiment of display device 300 implementing at least a portion of control module 380 in eye imaging unit 220. The image received by the sensor is a real image for aiding the sensor to monitor the position of the eye. The monitoring of the position of the eye allows knowing a direction and angle of the eye staring at the image from the microdisplay, based on which a portion of the image at which the eye is staring can be determined. This enables the control of the displayed image and the tracking of an object. In addition, without affecting the user at all, the invisible light beam emanated from the invisible light source, after passing through the illumination optics unit 3912, travels coaxially with the visible light along the optical axis 3990, which results in an improvement in the accuracy of the object tracking. Further, the coaxial transmission of the beams establishes a known relationship between the sensor in the eye tracker module 3914 and the microdisplay 3910, thereby making the eye tracker module 3914 free of the need for calibration.

The reflective microdisplay 3910 is a liquid crystal on silicon (LCoS) display or a digital light processing (DLP) display. The image from the microdisplay 3910 is a virtual image. The invisible light source is implemented as an infrared light-emitting diode (LED) light source.

In this embodiment, the imaging optics unit 3913 is disposed downstream to the illumination optics unit 3912 along the optical axis 3990. Additionally, the eye tracker module 3914 is disposed on a first side of the illumination optics unit 3912, and the visible light source 3911 on a second side of the illumination optics unit 3912 that is opposite to the first side. Moreover, the illumination optics unit 3912 includes a first beamsplitter 3921 that is arranged with an angle of about 45 degrees relative to the optical axis 3990. Further, the imaging optics unit 3913 includes a second beamsplitter 3931 (implementing an embodiment of beamsplitter interface 340) and an imaging lens 3932 (an embodiment of imaging objective 342), both arranged along the optical axis 3990. The second beamsplitter 3931 has a first surface 3931*a* and a second surface 3931*b*. The first surface 3931*a* is adapted for reception and passage therethrough of both the image from the microdisplay 3910 and the invisible light beam. The imaging lens 3932 is configured to reflect the image and the invisible light beam toward the second surface 3931*b* which then reflect the image and the invisible light beam further into the eye of the user.

Without departing from the scope hereof, beamsplitter 3931 may be replaced by other forms of beamsplitter interfaces known in the art, such a polarizing beamsplitter interface or a non-polarizing 50%/50% beamsplitter interface. In embodiments, wherein beamsplitter 3931 is replaced by a polarizing beamsplitter, imaging optics unit 3913 may further include one or more quarterwave plates, for example as discussed above in reference to FIGS. 4-9.

Embodiment 2

Figure 40:
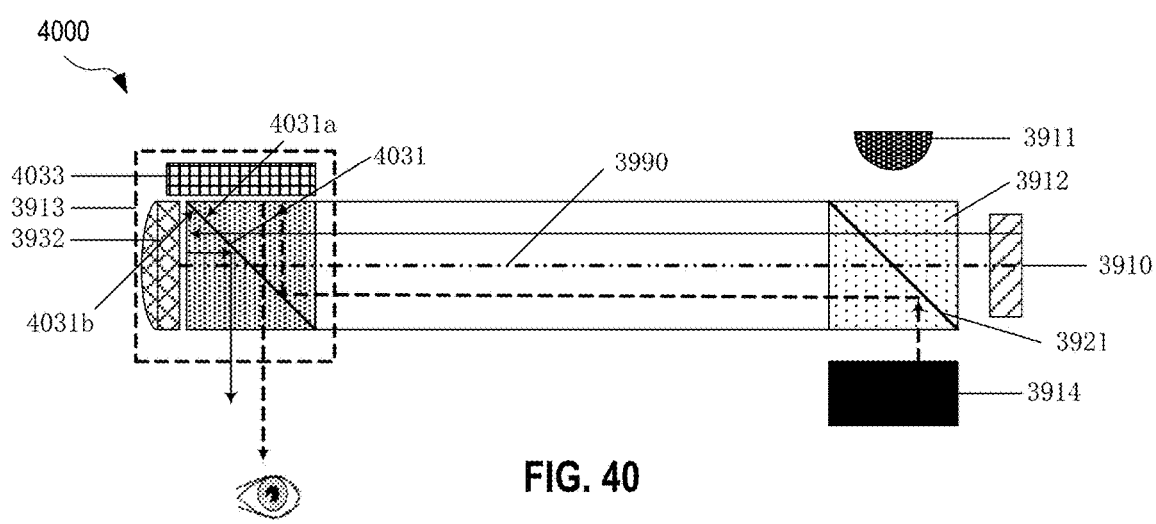
FIG. 40 diagrammatically illustrates a head-mounted display apparatus with coaxial eye imaging and including two beamsplitters and a reflector, according to an embodiment.

FIG. 40 illustrates one exemplary head-mounted display apparatus 4000 in accordance with an Embodiment 2. Head-mounted display apparatus 4000 is an embodiment of display device 300. With combined reference to FIGS. 39 and 40, head-mounted display apparatus 4000 differs from head-mounted display apparatus 3900 in the structure of the imaging optics unit 3913. In head-mounted display apparatus 4000, the imaging optics unit 3913 includes a second beamsplitter 4031 (an embodiment of beamsplitter interface 340), imaging lens 3932 (and embodiment of imaging objective 342) and a reflector 4033 (an embodiment of IR-band mirror 544). The second beamsplitter 4031 has a first surface 4031a and a second surface 4031b. The first surface 4031a allows the image from the microdisplay 3910 to pass therethrough and reflects the invisible light beam toward the reflector 4033. The first surface 4031a is further configured to allow the invisible light beam reflected from the reflector 4033 to pass therethrough into the eye of the user. The imaging lens 3932 is configured to reflect the image that has passed through the first surface 4031a toward the second surface 4031b which then reflects the image into the eye of the user, as shown in FIG. 40.

Without departing from the scope hereof, beamsplitter 4031 may be replaced by other forms of beamsplitter interfaces known in the art, such a polarizing beamsplitter interface or a non-polarizing 50%/50% beamsplitter interface. In embodiments, wherein beamsplitter 4031 is replaced by a polarizing beamsplitter interface, imaging optics unit 3913 may further include one or more quarterwave plates, for example as discussed above in reference to FIGS. 4-9.

Embodiment 3

Figure 41:
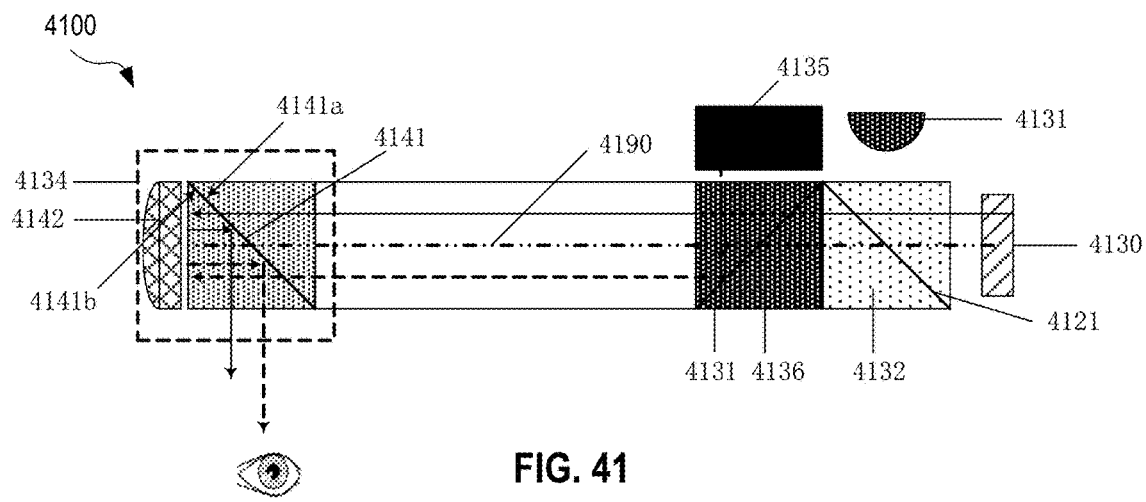
FIG. 41 diagrammatically illustrates a head-mounted display apparatus with coaxial eye imaging and including three beamsplitters, according to an embodiment.

FIG. 41 schematically illustrates one exemplary head-mounted display apparatus 4100 in accordance with an Embodiment 3. Head-mounted display apparatus 4100 is an embodiment of display device 300. As illustrated, head-mounted display apparatus 4100 includes: a reflective microdisplay 4130 (an embodiment of display 312), a visible light source 4131 (an embodiment of visible light source 314), a first illumination optics unit 4132 (implementing an embodiment of beamsplitter interface 310), a second illumination optics unit 4133 (implementing an embodiment of beamsplitter interface 230), an imaging optics unit 4134 (an embodiment of viewing unit 320) and an eye tracker module 4135 (an embodiment of eye imaging unit 220). The visible light source 4131 is configured to illuminate the microdisplay 1930. The first illumination optics unit 4132 is configured to direct visible light emanated from the visible light source 4131 into the microdisplay 4130 and to allow light reflected from the microdisplay 4130 carrying an image to pass through the first illumination optics unit 4132 and transmit along an optical axis 4190. The second illumination optics unit 4133 is disposed downstream to the first illumination optics unit 4132 along the optical axis 4190 and allows the image from the microdisplay 4130 to pass therethrough. The imaging optics unit 4134 is configured to project the image from the microdisplay 4130 into an eye of a user (as indicated by the arrowed solid lines in FIG. 41). The eye tracker module 4135 includes an invisible light source (an embodiment of IR illumination module 222) and a sensor (an embodiment of camera 224). The invisible light source is adapted to emanate an invisible light beam into the second illumination optics unit 4133 which then makes the invisible light beam travel along the optical axis 4190. The imaging optics unit 4134 is configured to receive and direct the invisible light beam into the eye of the user (as indicated by the arrowed dashed lines in FIG. 41). The sensor is configured to receive the invisible light beam reflected back from the eye of the user and to thereby capture an image of the eye. It is noted that the arrowed solid and dashed lines in FIG. 41 are intended solely to indicate directions of different light beams, and, in case of the directions being the same, the lines should coincide but are still presented in the figure as separate lines in order to show that they represent distinct light beams.

The eye tracker module 4135 further includes a processor for receiving the image of the eye from the sensor and for using an algorithm to calculate a position of the eye. This is analogous to an embodiment of display device 300, wherein eye imaging unit 220 implements a portion of control module 380. The image received by the sensor is a real image for aiding the sensor to monitor the position of the eye. The monitoring of the position of the eye allows knowing a direction and angle of the eye staring at the image from the microdisplay, based on which a portion of the image at which the eye is staring can be determined. This enables the control of the displayed image and the tracking of an object. In addition, without affecting the user at all, the invisible light beam emanated from the invisible light source, after passing through the second illumination optics unit 4133, travels coaxially with the visible light along the optical axis 4190, which results in an improvement in the accuracy of the object tracking. Further, the coaxial transmission of the beams establishes a known relationship between the sensor in the eye tracker module 4135 and the microdisplay 4130, thereby making the eye tracker module 4135 free of the need for calibration.

The reflective microdisplay 4130 is an LCoS display or a DLP display. The image from the microdisplay 4130 is a virtual image. The invisible light source is an LED light source.

In this embodiment, the first illumination optics unit 4132, the second illumination optics unit 4133 and the imaging optics unit 4134 are successively arranged along the optical axis 4190. Additionally, the eye tracker module 4135 is disposed on a first side of the second illumination optics unit 4133, and the visible light source 4131 on a first side of the first illumination optics unit 4132. The eye tracker module 4135 and the visible light source 4131 are disposed on a same side of the second illumination optics unit 4133 and the first illumination optics unit 4132, respectively. Moreover, the first illumination optics unit 4132 includes a first beamsplitter 4121 arranged with an angle of about 45 degrees relative to the optical axis 4190. Further, the second illumination optics unit 4133 includes a second beam splitter 4136 that is arranged with an angle of about 45 degrees relative to the optical axis 4190 and is orthogonal to the first beamsplitter 4121. Furthermore, the imaging optics unit 4134 includes a third beamsplitter 4141 (implementing an embodiment of beamsplitter interface 340) and an imaging lens 4142 (an embodiment of imaging objective 342), both arranged along the optical axis 1990. The third beamsplitter 4141 has a first surface 4141a and a second surface 4141b. The first surface 4141a is adapted for reception and passage therethrough of both the image from the microdisplay 4130 and the invisible light beam. The imaging lens 4142 is configured to reflect the image and the invisible light beam toward the second surface 4141b which then reflect the image and the invisible light beam further into the eye of the user.

Without departing from the scope hereof, beamsplitter 4141 may be replaced by other forms of beamsplitter interfaces known in the art, such a polarizing beamsplitter interface or a non-polarizing 50%/50% beamsplitter interface. In embodiments, wherein beamsplitter 4141 is replaced by a polarizing beamsplitter interface, imaging optics unit 4134 may further include one or more quarterwave plates, for example as discussed above in reference to FIGS. 4-9.

Embodiment 4

Figure 42:
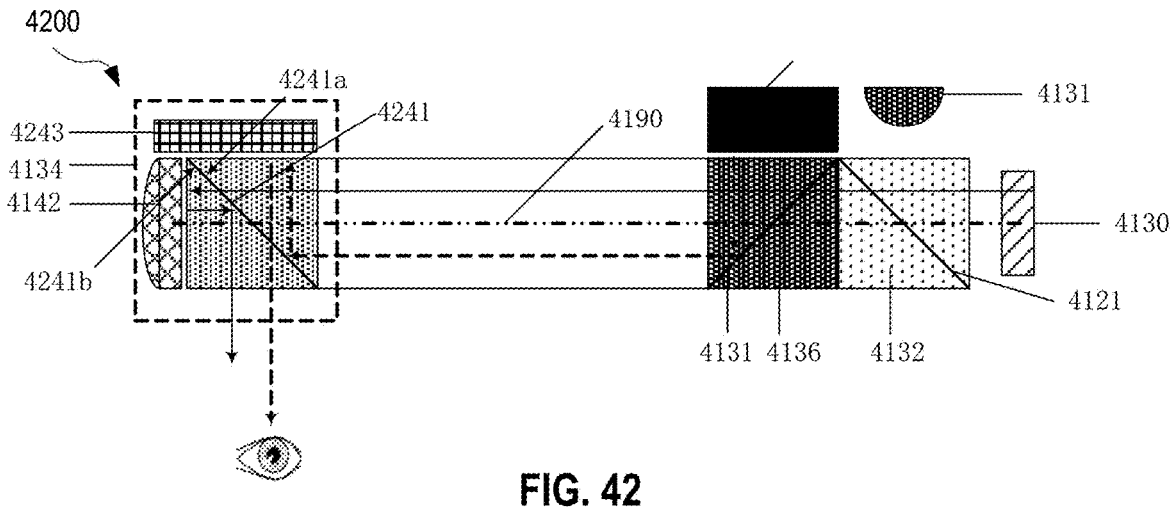
FIG. 42 diagrammatically illustrates a head-mounted display apparatus with coaxial eye imaging and including three beamsplitters and a reflector, according to an embodiment.

FIG. 42 diagrammatically illustrates one exemplary head-mounted display apparatus 4200 in accordance with an Embodiment 4. Head-mounted display apparatus 4200 is an embodiment of display device 300. With combined reference to FIGS. 41 and 42, head-mounted display apparatus 4200 differs from head-mounted display apparatus 4100 in the structure of the imaging optics unit 4134. In this embodiment, the imaging optics unit 4134 includes a third beamsplitter 4241 (implementing an embodiment of beamsplitter interface 340), an imaging lens 4142 and a reflector 4243 (an embodiment of IR-band mirror 544). The third beamsplitter 4241 has a first surface 4241a and a second surface 4241b. The first surface 4241a allows the image from the microdisplay 4130 to pass therethrough and reflects the invisible light beam toward the reflector 4143. The first surface 4241a is further configured to allow the invisible light beam reflected from the reflector 4143 to pass therethrough into the eye of the user. The imaging lens 4142 is configured to reflect the image that has passed through the first surface 4241a toward the second surface 4241b which then reflects the image into the eye of the user, as shown in FIG. 42.

Without departing from the scope hereof, beamsplitter 4241 may be replaced by other forms of beamsplitter interfaces known in the art, such a polarizing beamsplitter interface or a non-polarizing 50%/50% beamsplitter interface. In embodiments, wherein beamsplitter 4241 is replaced by a polarizing beamsplitter interface, imaging optics unit 4134 may further include one or more quarterwave plates, for example as discussed above in reference to FIGS. 4-9.

Embodiment 5

Figure 43:
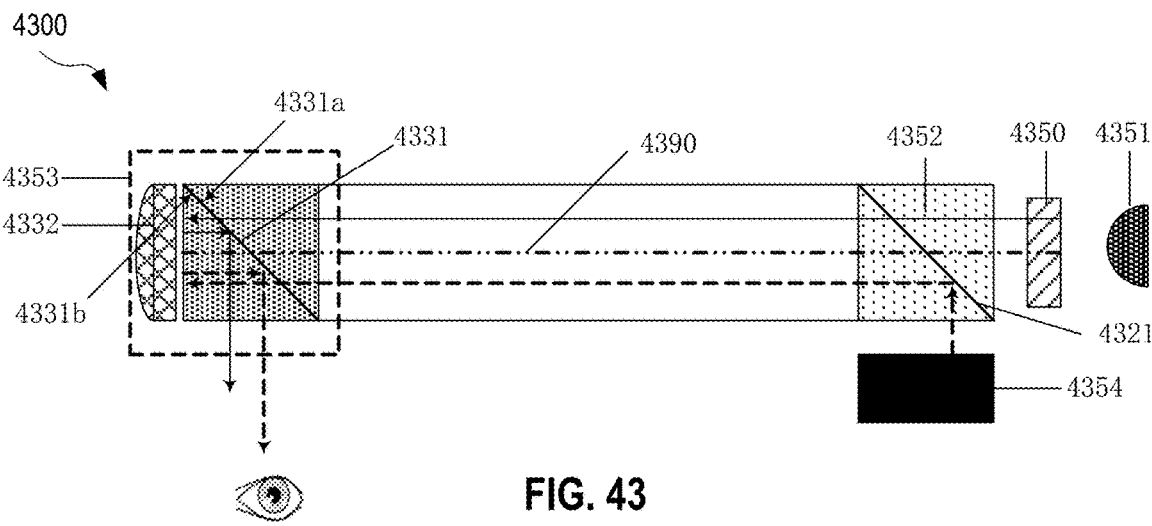
FIG. 43 diagrammatically illustrates a head-mounted display apparatus with coaxial eye imaging and including a backside illuminated display and two beamsplitters, according to an embodiment.

FIG. 43 schematically illustrates a head-mounted display apparatus 4300 in accordance with an Embodiment 5. As illustrated, head-mounted display apparatus 4300 includes: a transmissive microdisplay 4350 (an embodiment of display 312), a visible light source 4351 (an embodiment of visible light source 314), an illumination optics unit 4352 (implementing an embodiment of beamsplitter interface 230), an imaging optics unit 4353 (an embodiment of viewing unit 320) and an eye tracker module 4354 (an embodiment of eye imaging unit 220). The visible light source 4351 is configured to illuminate a back of the microdisplay 4350, such that light carrying an image is transmitted from a front of the microdisplay 4350 along an optical axis 4390. The illumination optics unit 4352 is configured to receive and allow the image from the microdisplay 4350 to pass through the illumination optics unit 4352. The imaging optics unit 4353 is configured to project the image from the microdisplay 4350 into an eye of a user (as indicated by the arrowed solid lines in FIG. 43). The eye tracker module 4354 includes an invisible light source (an embodiment of IR illumination module 222) and a sensor (an embodiment of camera 224). The invisible light source is adapted to emanate an invisible light beam into the illumination optics unit 4352 which then makes the invisible light beam travel along the optical axis 4390. The imaging optics unit 4353 is configured to receive and direct the invisible light beam into the eye of the user (as indicated by the arrowed dashed lines in FIG. 43). The sensor is configured to receive the invisible light beam reflected back from the eye of the user and to thereby capture an image of the eye. It is noted that the arrowed solid and dashed lines in FIG. 43 are intended merely to indicate directions of different light beams, and, in case of the directions being the same, the lines should coincide but are still presented in the figure as separate lines in order to show that they represent distinct light beams.

In this embodiment, the illumination optics unit 4352 includes a first beam splitter 4321 (implementing an embodiment of beamsplitter interface 230) that is arranged with an angle of about 45 degrees relative to the optical axis 4390. Additionally, the imaging optics unit 4353 includes a second beamsplitter 4331 (implementing an embodiment of beamsplitter interface 340) and an imaging lens 4332 (an embodiment of imaging objective 342), both arranged along the optical axis 4390. The second beamsplitter 4331 has a first surface 4331a for receiving and allowing both the image from the microdisplay 4350 and the invisible light beam to pass therethrough. The imaging lens 4332 is configured to reflect the image and the invisible light beam toward a second surface 4331b of the second beamsplitter 4331. The second surface 4331b is adapted to reflect the image and the invisible light beam into the eye of the user.

Without departing from the scope hereof, beamsplitter 4331 may be replaced by other forms of beamsplitter interfaces known in the art, such a polarizing beamsplitter interface or a non-polarizing 50%/50% beamsplitter interface. In embodiments, wherein beamsplitter 4331 is replaced by a polarizing beamsplitter interface, imaging optics unit 4353 may further include one or more quarterwave plates, for example as discussed above in reference to FIGS. 4-9.

With similarity to the foregoing embodiments, the eye tracker module 4354 further includes a processor for receiving the image of the eye from the sensor and for using an algorithm to calculate a position of the eye. This is analogous to an embodiment of display device 300, wherein a portion of control module 380 is implemented within eye imaging unit 220. The image received by the sensor is a real image for aiding the sensor to monitor the position of the eye. The monitoring of the position of the eye allows knowing a direction and angle of the eye staring at the image from the microdisplay, based on which a portion of the image at which the eye is staring can be determined. This enables the control of the displayed image and the tracking of an object. In addition, without affecting the user at all, the invisible light beam emanated from the invisible light source travels coaxially with the visible light along the optical axis 4390 after it has passed through imaging optics unit 4352, thereby resulting in an improvement in the accuracy of the object tracking. Further, the coaxial transmission of the beams establishes a known relationship between the sensor in the eye tracker module 4354 and the microdisplay 4350, thus making the eye tracker module 4354 free of the need for calibration.

Furthermore, the transmissive microdisplay 4350 is an LCoS display or a DLP display. The image from the microdisplay 4350 is a virtual image. The invisible light source is an LED light source.

Embodiment 6

Figure 44:
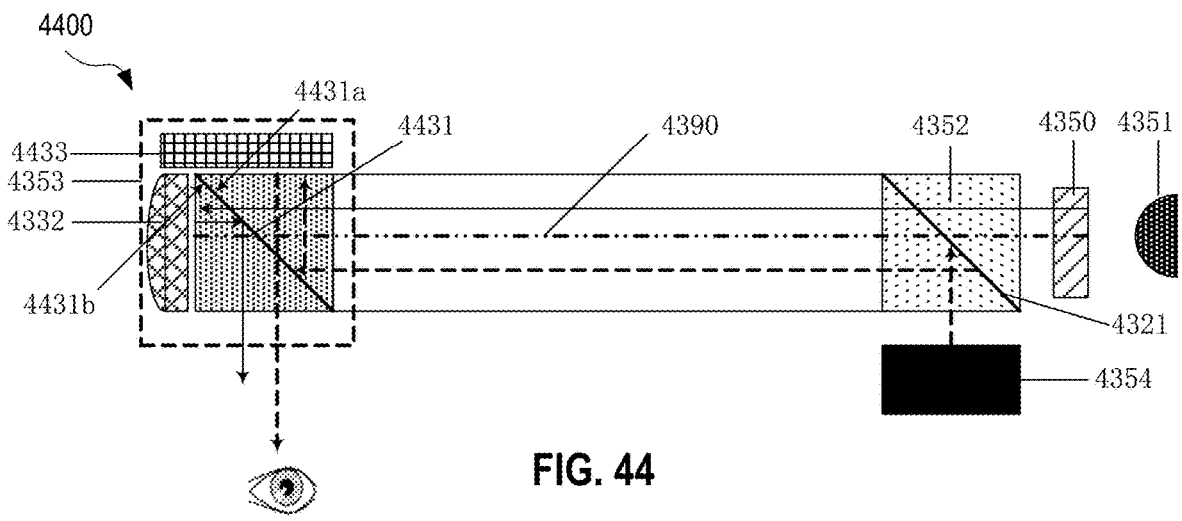
FIG. 44 diagrammatically illustrates a head-mounted display apparatus with coaxial eye imaging and including a backside illuminated display, two beamsplitters, and a reflector, according to an embodiment.

FIG. 44 illustrates one exemplary head-mounted display apparatus 4400 in accordance with an Embodiment 6. With combined reference to FIGS. 43 and 44, head-mounted display apparatus 4400 differs from head-mounted display apparatus 4300 in the structure of the imaging optics unit 4353. In head-mounted display apparatus 4400, the imaging optics unit 4353 includes a second beamsplitter 4431 (implementing an embodiment of beamsplitter interface 340), an imaging lens 4332 and a reflector 4433 (an embodiment of IR-band mirror 544). The second beamsplitter 4431 has a first surface 4431a which allows the image from the microdisplay 4450 to pass therethrough and reflects the invisible light beam toward the reflector 4433. The first surface 4431a is further configured to allow the invisible light beam reflected from the reflector 4433 to pass therethrough into the eye of the user. The imaging lens 4332 is configured to reflect the image that has passed through the first surface 4431a toward the second surface 4441b of the second beamsplitter 4431, which then reflects the image into the eye of the user, as shown in FIG. 44.

Without departing from the scope hereof, beamsplitter 4431 may be replaced by other forms of beamsplitter interfaces known in the art, such a polarizing beamsplitter interface or a non-polarizing 50%/50% beamsplitter interface. In embodiments, wherein beamsplitter 4431 is replaced by a polarizing beamsplitter interface, imaging optics unit 4453 may further include one or more quarterwave plates, for example as discussed above in reference to FIGS. 4-9.

As can be understood from the foregoing description, the head-mounted display apparatuses, constructed in the section "Additional Embodiments", are each provided with an eye tracker module including an invisible light source and a sensor. The invisible light source emanates an invisible light beam which is then received by an imaging optics unit and is directed thereby into an eye of the user. The sensor receives the invisible light beam reflected back from the eye of the user and thus captures an image of the eye, based of which a position of the eye is determinable by calculation. Monitoring the position of the eye allows obtaining a direction and an angle of the eye staring at an image. This makes it possible to control the displayed image and to track an object. In addition, the invisible light beam emanated from the invisible light source enters the illumination optics unit and thereby travels along an optical axis of the invisible light. This results in an improvement in the accuracy of the object tracking. Further, the invisible light beam does not have any impact on the user.

Combinations of Features

Features described above as well as those claimed below may be combined in various ways without departing from the scope hereof. For example, it will be appreciated that aspects of one near-eye display system, device, or method with described herein may incorporate or swap features of another near-eye display system, device, or method described herein. The following examples illustrate possible, non-limiting combinations of embodiments described above. It should be clear that many other changes and modifications may be made to the methods and device herein without departing from the spirit and scope of this invention:

(A1) A near-eye display device, with coaxial eye imaging, for mounting in field of view of an eye of a user may include a display unit for displaying a display image, a viewing unit for (i) presenting the display image to the eye based upon polarized visible light received from the display unit and (ii) transmitting ambient light from an ambient scene toward the eye, and an eye imaging unit with (a) an illumination module for generating infrared light, (b) a first polarizing beamsplitter interface, disposed between the display unit and the viewing unit, for (i) merging a polarized infrared component of the infrared light with the polarized visible light and (ii) separating from the polarized visible light a portion of the polarized infrared component reflected by the eye, and (c) a camera for forming an image of the eye based upon the portion of the polarized infrared component reflected by the eye.

(A2) In the near-eye display device denoted as (A1), the first polarizing beamsplitter interface may be configured to transmit the polarized visible light and reflect the polarized infrared component.

(A3) In either or both of the near-eye display devices denoted as (A1) and (A2), the display unit may be configured to emit the polarized visible light as p-polarized visible light.

(A4) In any of the near-eye display devices denoted as (A1) through (A3), the first polarizing beamsplitter interface may be configured to produce, by reflection, the polarized infrared component as s-polarized infrared light.

(A5) In any of the near-eye display devices denoted as (A1) through (A4), the viewing unit may include a second polarizing beam splitter interface configured for (i) transmitting the polarized visible light received from the display unit and (ii) reflecting the polarized infrared component received from the first polarizing beamsplitter interface.

(A6) In the near-eye display device denoted as (A5), the second polarizing beam splitter interface may be configured to reflect toward the ambient scene the polarized infrared component received from the first polarizing beamsplitter interface.

(A7) In the near-eye display device denoted as (A6), the viewing unit may further include (a) an infrared-band mirror disposed between the second polarizing beamsplitter interface and the ambient scene for retro-reflecting the polarized infrared component reflected toward the ambient scene by the second polarizing beamsplitter interface, and (b) an infrared-band quarter-wave plate for rotating polarization of the polarized infrared component to form, in cooperation with the infrared-band mirror, orthogonally polarized infrared light to be transmitted by the second polarizing beamsplitter interface toward the eye.

(A8) In any of the near-eye display devices denoted as (A5) through (A7), the viewing unit may include an imaging objective for focusing the polarized visible light to present the display image to the eye.

(A9) In the near-eye display device denoted as (A8), the imaging objective may be a reflective imaging objective.

(A10) In the near-eye display device denoted as (A9), the viewing unit may further include a visible-band quarter-wave plate disposed between the second polarizing beamsplitter interface and the imaging objective for rotating polarization of the polarized visible light to form, in cooperation with the imaging objective, orthogonally polarized visible light to be reflected by the second polarizing beamsplitter interface toward the eye.

(A11) Any of the near-eye display devices denoted as (A5) through (A10) may include (a) a first beamsplitter cube implementing the first polarizing beamsplitter interface and having a first face facing the viewing unit, (b) a second beamsplitter cube implementing the second polarizing beamsplitter interface and having a second face facing the first face, and (c) a solid light tunnel having (i) a first planar surface bonded to the first face and (ii) a second planar surface bonded to the second face.

(A12) In the near-eye display device denoted as (A11), the illumination module and the camera may be implemented in a package that is directly mounted to at least one of the first beamsplitter cube and the solid light tunnel.

(A13) In either or both of the near-eye display devices denoted as (A11) and (A12), the display unit may include a display and a third beamsplitter cube having (a) a third polarizing beamsplitter interface for transmitting the polarized visible light from the display toward the viewing unit and (b) a third face bonded to a fourth face of the first beamsplitter cube, the fourth face opposite the first face.

(A14) In any of the near-eye display devices denoted as (A1) through (A13), the display unit may include (a) a liquid-crystal-on-silicon display for displaying the display by generating the polarized visible light from polarized visible illumination light, (b) an illumination module for generating visible illumination light including the polarized illumination light, and (c) a third polarizing beam splitter interface for (i) reflecting, from the visible illumination light, only the polarized visible illumination light toward the liquid-crystal-on-silicon display and (ii) transmitting the polarized visible light from the liquid-crystal-on-silicon display.

(A15) In any of the near-eye display devices denoted as (A1) through (A14), the imaging unit further may include a control module, communicatively coupled with the illumination module, for activating the illumination module for a finite duration to illuminate the eye with at least a portion of the infrared light during the finite duration.

(A16) In the near-eye display device denoted as (A15), the control module may further be communicatively coupled with the camera and configured to induce capture of the image of the eye during the finite duration.

(B1) A method for performing coaxial eye imaging in a near-eye display device for mounting in field of view of an eye of a user may include (a) using a first polarizing beamsplitter interface to merge polarized infrared light with polarized visible display light from a display, (b) using a second polarizing beamsplitter interface to superimpose the polarized infrared light and the polarized visible light on ambient light from an ambient scene to (i) illuminate the eye with the polarized infrared light, (ii) present an image of the display to the eye, and (iii) allow the eye to view the ambient scene, and (c) imaging the eye through the second polarizing beamsplitter interface and the first polarizing beamsplitter interface based upon a portion of the polarized infrared light reflected by the eye.

(B2) In the method denoted as (B1), the step of imaging may include separating the portion of the polarized infrared light reflected by the eye from the ambient light using the second polarizing beamsplitter interface, and separating the portion of the polarized infrared light reflected by the eye from the polarized visible light using the first polarizing beamsplitter interface.

(B3) In either or both of the methods denoted as (B1) and (B2), the step of using a second polarizing beamsplitter interface may include (a) using the second polarizing beamsplitter interface to reflect toward the ambient scene the polarized infrared light received from the first polarizing beamsplitter interface, (b) retro-reflecting and rotating polarization of the polarized infrared light to produce orthogonally polarized infrared light, and (c) transmitting the orthogonally polarized infrared light through the second polarizing beamsplitter interface toward the eye to illuminate the eye.

(B4) In the method denoted as (B3), the step of retro-reflecting and rotating polarization may include (a) passing the polarized infrared light, reflected toward the scene by the second polarizing beamsplitter interface, through an infrared-band quarter-wave plate to rotate polarization of the polarized infrared light, (b) retro-reflecting on an infrared-band mirror the polarized infrared light passed through the infrared-band quarter-wave plate, and (c) passing the polarized infrared light, retro-reflected by the infrared-band mirror, through the infrared-band quarter-wave plate to further rotate the polarized infrared light so as to produce the orthogonally polarized infrared light.

(B5) Any of the methods denoted as (B1) through (B4) may further include (a) transmitting through the second polarizing beamsplitter interface the polarized visible light received from the first polarizing beamsplitter interface, (b) retro-reflecting and rotating polarization of the polarized visible light transmitted by the second polarizing beamsplitter interface to produce orthogonally polarized visible light, and (c) using the second polarizing beamsplitter interface to reflect the orthogonally polarized visible light toward the eye to present the image of the display to the eye.

(B6) In the method denoted as (B5), the step of retro-reflecting and rotating polarization may include retro-reflecting the polarized visible light on a curved mirror surface to present to the eye the image of the display as a virtual image located at a distance from the eye greater than light propagation distance from the display to the eye.

(B7) Any of the methods denoted as (B1) through (B6) may further include (a) generating infrared light using an illumination module mechanically coupled with at least one of (i) a first beamsplitter cube implementing the first polarizing beamsplitter interface and (ii) a light tunnel connecting the first beamsplitter cube with a second beamsplitter cube implementing the second polarizing beamsplitter interface, and (c) reflecting only one polarization component of the infrared light on the first polarizing beamsplitter interface to produce the polarized infrared light.

(B8) In the method denoted as (B7), the step of imaging may include imaging the eye using a camera mechanically coupled with at least one of the first beamsplitter cube and the light tunnel.

(B9) Any of the methods denoted as (B1) through (B8) may further include (a) generating visible illumination light, (b) using a third polarizing beamsplitter interface to reflect only a first polarization component of the visible illumination light toward the display to illuminate the display with polarized visible illumination light, (c) based upon the visible illumination light and settings of the display, emitting first visible display light from the display toward the third polarizing beamsplitter interface, and (d) transmitting only a second polarization component, orthogonal to the first polarization component, of the first visible light through the third polarizing beamsplitter interface and the first polarizing beamsplitter interface toward the second polarizing beamsplitter interface.

(C1) A near-eye display device, with coaxial eye tracking, for mounting in field of view of an eye of a user, may include (a) a display unit for displaying a display image, (b) a viewing unit for presenting the display image to the eye, based upon visible display light received from the display unit, and transmitting ambient light from an ambient scene toward the eye, and (c) an eye imaging unit including (i) an illumination module for generating at least three infrared light beams propagating along at least three different, non-coplanar directions, respectively, (ii) a first beamsplitter interface, disposed between the display unit and the viewing unit, for merging at least a portion of each of the infrared light beams with the visible light to direct each portion toward the eye via the viewing unit, and (iii) a camera for imaging, via the viewing unit and the first beamsplitter interface, pupil of the eye and reflections of the infrared light beams incident on the eye, to form one or more images indicative of gaze direction of the eye.

(C2) In the near-eye display device denoted as (C1), the illumination module may include a single light source for generating infrared light and a diffraction module for diffracting the infrared light to generate the infrared light beams.

(C3) In the near-eye display device denoted as (C2), the diffraction module may include a plurality of one-dimensional diffraction gratings coupled in series and positioned to transmit at least a portion of the infrared light to generate the infrared light beams.

(C4) In the near-eye display device denoted as (C3), the plurality of one-dimensional diffraction gratings may be configured to diffract the infrared light in a respective plurality of co-planar, mutually non-parallel diffraction dimensions.

(C5) In any of the near-eye display devices denoted as (C2) through (C4), the diffraction module may further include an aperture that is sized and positioned to transmit only diffraction orders of the infrared light respectively forming the infrared light beams.

(C6) In any of the near-eye display devices denoted as (C2) through (C5), the single light source may include a light emitting diode and power control circuitry adapted to operate the light emitting diode at two different power settings to generate the infrared light at a higher intensity and a lower intensity, respectively.

(C7) In any of the near-eye display devices denoted as (C1) through (C6), the first beamsplitter interface may be a polarizing beamsplitter interface configured to (a) transmit the visible display light toward the viewing unit and (b) reflect toward the viewing unit a polarized component of each of the infrared light beams.

(C8) In any of the near-eye display devices denoted as (C1) through (C7), the first beamsplitter interface may further be configured to separate from the visible display light a reflected portion of each of the infrared light beams, reflected by the eye, and direct each said reflected portion toward the camera for imaging of reflections of the infrared light beams incident on the eye.

(C9) In the near-eye display device denoted as (C8), the camera may further include a spectral filter configured to at least partly transmit the infrared light and a red portion of visible spectrum, such that the spectral filter (a) at least partly transmits each said reflected portion to allow imaging, by the camera, of reflections of the infrared light beams incident on the eye, (b) at least partly transmits red ambient light, reflected by the eye, to allow imaging of the pupil by the camera, and (c) substantially blocks visible light that is not red.

(C10) Any of the near-eye display devices denoted as (C1) through (C9) may further include a gaze evaluator for processing the images to determine the gaze direction.

(C11) In the near-eye display device denoted as (C10), the gaze evaluator may include a processor and a memory, wherein the memory includes machine-readable instructions that, upon execution by the processor, determines a first location of the pupil relative to reflections of the infrared light beams incident on the eye and derives the gaze direction at least in part from the first location.

(D1) A method for coaxial eye tracking in a near-eye display device mounted in field of view of an eye of a user may include (a) generating infrared light using a single light source, (b) diffracting the infrared light to generate at least three infrared light beams propagating along at least three different, non-coplanar directions, respectively, (c) on a first beamsplitter interface, merging the infrared light beams with visible display light from a display, (d) on a second beamsplitter interface, superimposing the infrared light beams and the visible display light on ambient light from an ambient scene to illuminate the eye with the infrared light beams and present an image of the display to the eye while allowing the eye to view the ambient scene, and (e) via second beamsplitter interface and the first beamsplitter interface, imaging pupil of the eye and reflections of the infrared light beams incident on the eye, to form one or more images indicative of gaze direction of the eye.

(D2) In the method denoted as (D1), the step of diffracting may include at least partly transmitting the infrared light through a plurality of one-dimensional diffraction gratings configured to diffract the infrared light in a respective plurality of co-planar, mutually non-parallel diffraction dimensions, to generate a plurality of diffraction orders of the infrared light.

(D3) The method denoted as (D2) may further include selecting at least three of the diffraction orders as the at least three infrared light beams, respectively.

(D4) Any of the methods denoted as (D1) through (D3) may further include using the first beamsplitter interface to separate from the visible display light (a) a reflected portion of each of the infrared light beams reflected by the eye and (b) a portion of visible light reflected by the eye.

(D5) In the method denoted as (D4), the step of imaging may include (a) forming an image of reflections of the infrared light beams incident on the eye based upon each said reflected portion received from the first beamsplitter interface, and (b) forming an image of the pupil based upon said portion of visible light received from the first beamsplitter interface.

(D6) In the method denoted as (D5), the step of imaging may further include spectrally filtering light to image each said reflected portion and only a red portion of visible spectrum.

(D7) Any of the methods denoted as (D1) through (D6) may include (a) in the step of generating, sequentially generating the infrared light at a first intensity and a second intensity, the second intensity being lower than the first intensity, and (b) in the step of imaging, (i) capturing a first image of the eye when the infrared light is at the first intensity and (ii) capturing a second image of the eye when the infrared light is at the second intensity.

(D8) The method denoted as (D7) may further include repeatedly performing the steps of generating and imaging to improve image quality.

(D9) The method denoted as (D7) may further include (a) processing the first and second images to determine (i) a first location of the pupil relative to reflections of the infrared light beams incident on the eye for the first intensity of the infrared light, and (ii) a second location of the pupil relative to reflections of the infrared light beams incident on the eye for the second intensity of the infrared light, (b) forming average of the first location and the second location, and (c) deriving the gaze direction from the average.

(D10) Any of the methods denoted as (D1) through (D9) may further include processing the images to determine first location of the pupil relative to reflections of the infrared light beams incident on the eye, and deriving the gaze direction at least in part from the first location of the pupil.

(D11) In the method denoted as (D10), the step of deriving may include comparing the first location to a second location of the pupil relative to reflections of the infrared light beams incident on the eye when the eye is in a calibration-associated gaze direction.

(D12) In the method denoted as (D11), the step of processing may include determining a first center of triangle formed in the images by reflections of the infrared light beams incident on the eye, and calculating the first location as a first vector between the pupil and the first center.

(D13) In the method denoted as (D12), the step of comparing may include comparing the first vector to a second vector between the second location of the pupil and a second center of triangle formed in the images by reflections of the infrared light beams incident on the eye when the eye is in a calibration-associated gaze direction.

(D14) Any of the methods denoted as (D11) through (D13) may further include (a) instructing the user to look in the calibration-associated gaze direction, (b) performing the steps of generating, diffracting, merging, superimposing, and imaging while the user looks in the calibration-associated gaze direction to determine, in the step of processing, a second location of the pupil relative to reflections of the infrared light beams incident on the eye when the eye has the calibration-associated gaze direction, (c) saving the second location to memory of the near-eye display device, and (d) in the step of deriving, deriving the gaze direction by comparing the first location to the second location.

Changes may be made in the above devices and methods without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present devices and methods, which, as a matter of language, might be said to fall therebetween.

What is claimed is:

1. A near-eye display device, with coaxial eye tracking, for mounting in field of view of an eye of a user, comprising:
    a display unit for displaying a display image;
    a viewing unit for presenting the display image to the eye, based upon visible display light received from the display unit, and transmitting ambient light from an ambient scene toward the eye; and
    an eye imaging unit including
        an illumination module for generating at least three infrared light beams propagating along at least three different, non-coplanar directions, respectively,
        a beamsplitter interface, disposed between the display unit and the viewing unit, for merging at least a portion of each of the infrared light beams with the visible light to direct each portion toward the eye via the viewing unit, and
        a camera for imaging, via the viewing unit and the beamsplitter interface, pupil of the eye and reflections of the infrared light beams incident on the eye, to form one or more images indicative of gaze direction of the eye.

2. The near-eye display device of claim 1, the illumination module comprising:
    a single light source for generating infrared light; and
    a diffraction module for diffracting the infrared light to generate the infrared light beams.

3. The near-eye display device of claim 2, the diffraction module comprising a plurality of one-dimensional diffraction gratings coupled in series and positioned to transmit at least a portion of the infrared light to generate the infrared light beams.

4. The near-eye display device of claim 3, the plurality of one-dimensional diffraction gratings being configured to diffract the infrared light in a respective plurality of co-planar, mutually non-parallel diffraction dimensions.

5. The near-eye display device of claim 2, the diffraction module further comprising an aperture sized and positioned to transmit only diffraction orders of the infrared light respectively forming the infrared light beams.

6. The near-eye display device of claim 2, the single light source comprising:
    a light emitting diode; and
    power control circuitry adapted to operate the light emitting diode at two different power settings to generate the infrared light at a higher intensity and a lower intensity, respectively.

7. The near-eye display device of claim 1, the beamsplitter interface being a polarizing beamsplitter interface configured to (a) transmit the visible display light toward the viewing unit and (b) reflect toward the viewing unit a polarized component of each of the infrared light beams.

8. The near-eye display device of claim 1, the beamsplitter interface further being configured to separate from the visible display light a reflected portion of each of the infrared light beams, reflected by the eye, and direct each said reflected portion toward the camera for imaging of reflections of the infrared light beams incident on the eye.

9. The near-eye display device of claim 8, the camera further comprising a spectral filter configured to at least partly transmit the infrared light and a red portion of visible spectrum, such that the spectral filter (a) at least partly transmits each said reflected portion to allow imaging, by the camera, of reflections of the infrared light beams incident on the eye, (b) at least partly transmits red ambient light, reflected by the eye, to allow imaging of the pupil by the camera, and (c) substantially blocks visible light that is not red.

10. The near-eye display device of claim 1, further comprising a gaze evaluator for processing the images to determine the gaze direction.

11. The near-eye display device of claim 10, the gaze evaluator comprising:
    a processor; and
    a memory including machine-readable instructions that, upon execution by the processor, determines a first location of the pupil relative to reflections of the infrared light beams incident on the eye and derives the gaze direction at least in part from the first location.

12. The system of claim 1, the three infrared light beams being spatially-separated and non-overlapping on the eye.

13. The system of claim 1, the illumination module being configured to generate the three infrared light beams simultaneously.

14. The system of claim 1, the display unit including a first beamsplitter cube, the viewing unit including a second beamsplitter cube, the beamsplitter interface being disposed between the first and second beamsplitter cubes.

15. The system of claim 14, the eye imaging unit implementing the beamsplitter interface in a third beamsplitter cube disposed between the first and second beamsplitter cubes.

* * * * *